(12) United States Patent
Buttgenbach et al.

(10) Patent No.: US 11,764,577 B2
(45) Date of Patent: Sep. 19, 2023

(54) SYSTEMS AND METHODS FOR A MOBILE MICRO UTILITY

(71) Applicant: 8ME NOVA, LLC, El Dorado Hills, CA (US)

(72) Inventors: Thomas Buttgenbach, Santa Monica, CA (US); Finbar Sheehy, San Francisco, CA (US); Alex Rozkin, Millbrae, CA (US); Charlie Patton, Del Mar, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/118,570

(22) Filed: Mar. 7, 2023

(65) Prior Publication Data

US 2023/0231378 A1    Jul. 20, 2023

Related U.S. Application Data

(63) Continuation-in-part of application No. 17/978,080, filed on Oct. 31, 2022, which is a continuation of application No. 17/850,502, filed on Jun. 27, 2022, now Pat. No. 11,489,337, which is a continuation of application No. 17/697,665, filed on Mar. 17, 2022, now Pat. No. 11,431,169.

(60) Provisional application No. 63/235,278, filed on Aug. 20, 2021.

(51) Int. Cl.
*H02J 3/00*      (2006.01)
*H02J 3/38*      (2006.01)

(52) U.S. Cl.
CPC .............. *H02J 3/003* (2020.01); *H02J 3/004* (2020.01); *H02J 3/381* (2013.01); *H02J 2203/10* (2020.01); *H02J 2300/24* (2020.01); *H02J 2300/28* (2020.01)

(58) Field of Classification Search
CPC .. H02J 3/003; H02J 3/004; H02J 3/381; H02J 3/382; H02J 3/383; H02J 2203/10; H02J 2300/24; H02J 2300/28; H02S 30/20; H02S 10/40
USPC ............................................ 307/38; 136/245
See application file for complete search history.

(56) References Cited

U.S. PATENT DOCUMENTS

| | | | |
|---|---|---|---|
| 7,230,819 B2* | 6/2007 | Muchow | F24S 25/70 361/825 |
| 11,398,729 B1 | 7/2022 | Upreti et al. | |
| 2006/0137348 A1* | 6/2006 | Pas | F03D 9/25 60/641.1 |

(Continued)

FOREIGN PATENT DOCUMENTS

WO    WO-2020203395 A1 *  10/2020    ......... E04B 1/34861

*Primary Examiner* — Hal Kaplan
(74) *Attorney, Agent, or Firm* — Foley & Lardner LLP

(57) ABSTRACT

A micro utility system. The micro utility system may include a portable container configured to house an energy storage system (ESS) and solar panel storage structures; a portable solar panel structure having two or more solar panels coupled to each other at one end, wherein the two or more solar panels are coupled to at least two wheels at a distal end of the portable solar panel structure; and circuitry configured to receive electrical power from the portable solar panel structure, wherein the circuitry includes a processor configured by machine-readable instructions to direct electrical energy from the portable solar panel structure or the ESS to a load.

18 Claims, 50 Drawing Sheets

(56) References Cited

U.S. PATENT DOCUMENTS

| | | | |
|---|---|---|---|
| 2006/0260672 A1* | 11/2006 | Niederer | H02S 10/12 |
| | | | 136/251 |
| 2015/0162865 A1* | 6/2015 | Cowham | H02S 30/20 |
| | | | 136/251 |
| 2018/0337632 A1* | 11/2018 | Byrnes | H02S 10/40 |
| 2019/0036340 A1 | 1/2019 | Meeker et al. | |
| 2020/0059192 A1* | 2/2020 | Orriols | G05F 1/66 |
| 2020/0144824 A1* | 5/2020 | Campus | G05B 19/042 |
| 2020/0252022 A1* | 8/2020 | Larsen | H02S 10/40 |

* cited by examiner

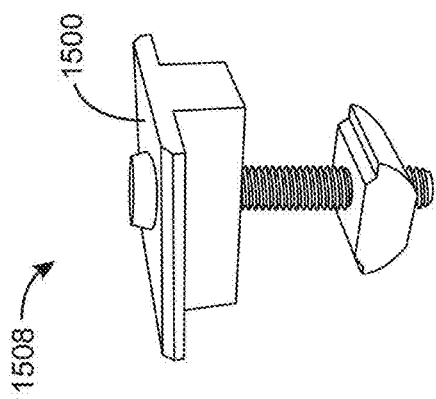
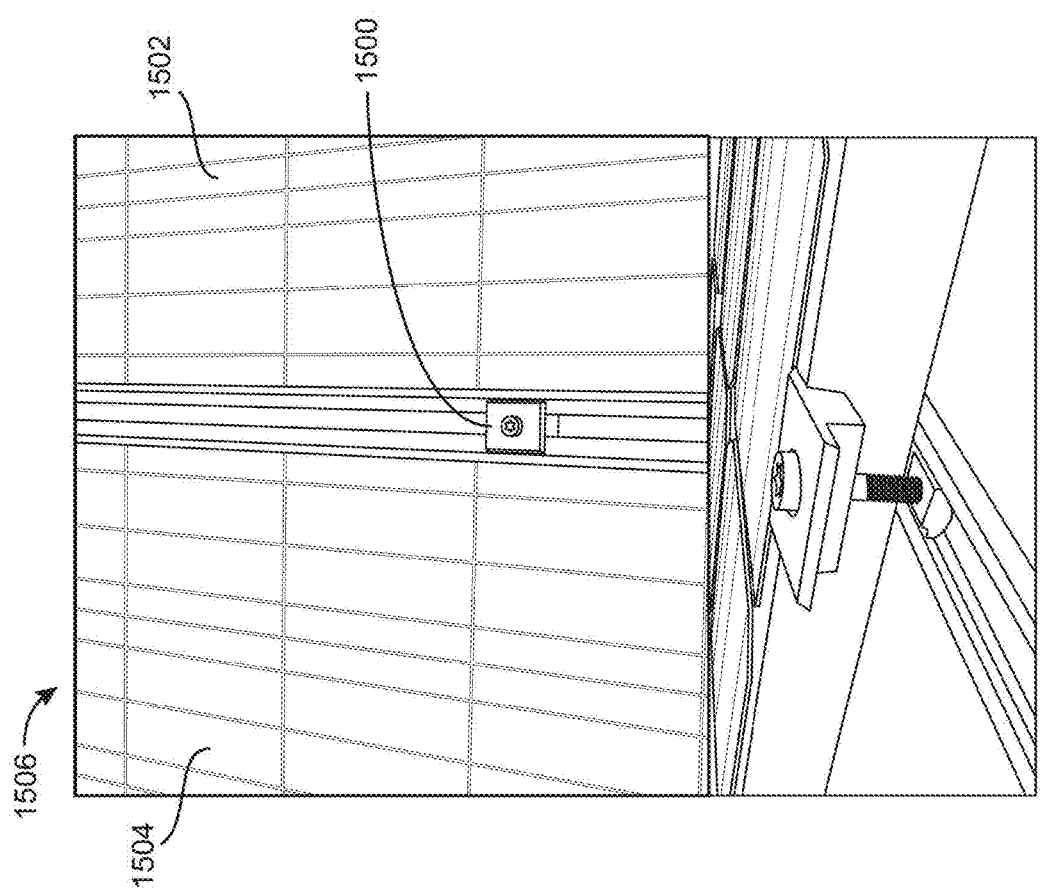
FIG. 15B
FIG. 15A

SYSTEMS AND METHODS FOR A MOBILE MICRO UTILITY

CROSS-REFERENCE TO RELATED APPLICATIONS

This application claims the benefit of priority of as a continuation-in-part of U.S. patent application Ser. No. 17/978,080, filed Oct. 31, 2022, which claims the benefit of priority as a continuation to U.S. patent application Ser. No. 17/850,502, filed Jun. 27, 2022 which is a continuation to U.S. patent application Ser. No. 17/697,665, filed Mar. 17, 2022, which claims the benefit of priority to U.S. Provisional Application No. 63/235,278, filed Aug. 20, 2021, the entirety of each of which is incorporated by reference herein.

BACKGROUND

Micro utilities are electricity generation and distribution systems generally serving a number of customers in a localized area, such as a residential community, a commercial or industrial electrical load, a refugee camp, a military base, etc. A micro utility may be islanded, i.e., entirely electrically self-contained, or may be connected to a larger electrical grid from which it can draw power if the electrical load on the micro utility exceeds its own generating capacity.

Renewable micro utilities have a significant portion of electrical generation from renewable resources. Because of the intermittent nature of renewable power sources such as solar or wind power, renewable micro utilities often have a means of supplementing the renewable generation when needed. The supplementation may be a fossil fuel-fired generator, a connection to a larger electrical grid, a storage, or a combination.

All-renewable islanded micro utilities are relatively uncommon because experience and analysis have shown very high cost would be incurred to serve a given load with near-perfect reliability compared to a renewable micro utility with means of supplementing the renewable generation. An alternative to supplementing the renewable generation could be to manage (e.g., curtail) the electrical loads on the grid to ensure they do not exceed the capacity of the energy resources. However, current renewable micro utilities lack the capability to meet a consumer demand by load management.

SUMMARY

In one aspect, the present disclosure provides a micro utility system. The micro utility system may include a portable container configured to house an energy storage system (ESS) and portable solar panel storage structures; a portable solar panel structure having two or more solar panels coupled to each other at one end (e.g., in an angled configuration), wherein the two or more solar panels are coupled to at least two wheels at distal ends of the two or more solar panels; and circuitry configured to receive electrical power from the portable solar panel structure, wherein the circuitry includes a processor configured by machine-readable instructions to direct electrical energy from the portable solar panel structure or the ESS to a load.

In some embodiments, the portable container includes rails mounted to interior faces of walls of the portable container, wherein the rails are configured to receive the portable solar panel structure. In some embodiments, the micro utility system further includes a plurality of portable solar panel structures including the portable solar panel structure, each respective portable solar panel structure of the plurality of portable solar panel structures coupled to two or more wheels at a distal end of the respective portable solar panel structure, the two or more wheels coupled (e.g., removably coupled or foldably coupled) to the respective portable solar panel structure. In some embodiments, the rails mounted to the interior faces of the walls of the portable container comprise a plurality of sets of rails, each set of rails comprising a pair of rails located across from each other on opposing interior faces of the walls of the portable solar panel structure, and each set of rails spaced apart from another set of rails by a distance set such that each of the plurality of portable solar panel structures can be inserted into the portable container with the two wheels of the respective portable solar panel structure removed or folded towards the portable solar panel structure, in some cases removed and attached to a clip between the portable solar panel structure and a second portable solar panel structure beneath the portable solar panel structure, but cannot be inserted into the portable container with the two wheels attached to the portable solar panel structure in a position substantially perpendicular to the portable solar panel structure (e.g., folded away from the portable solar panel structure). In some embodiments, the at least two wheels are removably or foldably coupled to the two or more solar panels. In some embodiments, the clip is coupled to a bottom face of a rail of one of the sets of rails.

In some embodiments, the portable container comprises one or more charging ports located on an exterior face of a wall of the portable container, a charging port of the one or more charging ports electrically connecting the portable solar panel structure to the ESS to facilitate charging of the ESS with the two or more solar panels of the portable solar panel structure. In some embodiments, the portable container comprises one or more discharging ports located on an exterior face of a wall of the portable container, a discharging port of the one or more discharging ports electrically connecting the ESS to the load and facilitating discharge of electrical energy from the ESS to the load.

In some embodiments, the portable container is a shipping container. In some embodiments, the portable container includes wheels and a connector configured for attachment to a vehicle. In some embodiments, the circuitry is configured to store in a memory an energy limit for the load; forecast an amount of electrical energy available from the portable solar panel structure and the ESS for a time period; and allocate an electrical energy amount to the load based on the energy limit and for the time period, wherein the circuitry is configured to direct the electrical energy from the portable solar panel structure or the ESS to the load according to the allocated electrical energy amount. In some embodiments, the allocated electrical energy amount indicates to direct the electrical energy from the portable solar panel structure or the ESS to the load 24 hours per day. In some embodiments, the processor is further configured by the machine-readable instructions to determine the forecast amount of electrical energy is not enough to allocate electrical energy to a second energy limit to a second load for the time period; and responsive to the determination, allocate an electrical energy amount of zero to each load of one or more loads with a priority lower than a priority of the second load.

In some embodiments, the processor is configured by the machine-readable instructions to allocate the electrical energy amount to the load by storing an indication of the electrical energy amount in the memory. In some embodiments, the processor is further configured by the machine-readable instructions to determine the forecast amount of electrical energy is not enough to allocate enough electrical energy to a second load for the time period; and reduce a previously assigned energy limit for each of one or more loads responsive to the determination. In some embodiments, the processor is configured by the machine-readable instructions to reduce the previously assigned energy limit for each of the one or more loads based on one or more priorities for the one or more loads.

In some embodiments, the two or more solar panels are coupled to a first set of two wheels at distal ends of the two or more solar panels and a second set of two wheels at proximal ends of the two or more solar panels. In some embodiments, the processor is configured by the machine-readable instructions to during the time period determine an amount of energy that has been directed to the load has reached the allocated electrical energy amount; and terminate distribution of energy to the load responsive to the determination. In some embodiments, the processor is configured by the machine-readable instructions to during the time period determine an amount of energy that has been directed to the load is within a threshold of the allocated electrical energy amount; and responsive to the determination, transmit a message to a device associated with a user of the load, the message comprising an indication indicating to utilize less energy for a remainder of the time period.

In one aspect, the present disclosure provides a method. The method may include storing in a memory an energy limit for a load, wherein the load is coupled to a portable container configured to house an energy storage system (ESS) and portable solar panel structures; forecasting an amount of electrical energy available from a portable solar panel structure and the ESS for a time period, wherein the portable solar panel structure includes two or more solar panels coupled to each other at one end (e.g., in an angled configuration), wherein the two or more solar panels are coupled to at least two wheels at a distal end; allocating an electrical energy amount to the load based on the energy limit and for the time period; and directing electrical energy from the portable solar panel structure or the ESS to the load according to the allocated electrical energy amount.

In one aspect, the present disclosure provides one or more non-transitory computer storage media storing instructions that are operable, when executed by one or more computers, to cause said one or more computers to perform operation. The operations may include storing in a memory an energy limit for a load, wherein the load is coupled to a portable container configured to house an energy storage system (ESS) and portable solar panel structures; forecasting an amount of electrical energy available from a portable solar panel structure and the ESS for a time period, wherein the portable solar panel structure includes two or more solar panels coupled to each other at one end (e.g., in an angled configuration), wherein the two or more solar panels are coupled to at least two wheels at a distal end; allocating an electrical energy amount to the load based on the energy limit and for the time period; and directing electrical energy from the portable solar panel structure or the ESS to the load according to the allocated electrical energy amount.

In one aspect present disclosure provides a micro utility system. The micro utility system may include a portable container housing a plurality of pairs of rails on opposing interior faces of walls of the portable container and an energy storage system (ESS); a plurality of portable solar panel structures each comprising two or more solar panels coupled to each other at one end in (e.g., in an angled configuration), each of the plurality of portable solar panel structures supported by a different pair of the plurality of pairs of rails; one or more charging ports located on an exterior face of a first wall of the portable container and electrically connected to the ESS; and one or more discharging ports located on the exterior face of the first wall or an exterior face of a second wall of the portable container and electrically connected to the ESS. In some embodiments, the one or more discharging ports are located on the exterior face of the second wall opposite the first wall. In some embodiments, each of the plurality of portable solar panel structures is coupled to at least two wheels at a distal end of the portable solar panel structure.

In some embodiments, the at least two wheels are removably or foldably coupled to the portable solar panel structure, and wherein each of the plurality of pairs of rails is spaced apart from another of the plurality of pairs of rails by a distance set such that each of the plurality of portable solar panel structures can be inserted into the portable container with the two wheels removed or folded towards the portable solar panel structure. The wheels may facilitate the positioning of the portable solar panel structure during deployment and recovery. In some embodiments, each of the plurality of pairs of rails is spaced apart from another of the plurality of pairs of rails by the distance set such that each of the plurality of portable solar panel structures cannot be inserted into the portable container with the at least two wheels of the portable solar panel structure attached to the portable solar panel structure in a position (e.g., orientation) substantially perpendicular to the portable solar panel structure.

In some embodiments, the micro utility system further includes a second portable solar panel structure electrically connected to a charging port of the one or more charging ports and supplying energy to the ESS through the charging port. In some embodiments, a load is electrically connected to a discharging port of the one or more discharging ports and receiving energy from the ESS through the discharging port.

In some embodiments, the micro utility system may further include an air conditioning unit attached on an exterior face of a wall of the portable container. In some embodiments, the air conditioning unit is attached, above the one or more discharging ports, on the exterior face of the first wall or the exterior face of a second wall of the portable container. In some embodiments, the micro utility system includes an air conditioning unit attached to an exterior surface of the portable container. In some embodiments, the micro utility system includes an air conditioning unit attached to an interior surface of the portable container. In some embodiments, the micro utility system further includes a processor coupled to memory and configured by machine-readable instructions to direct electrical energy from a portable solar panel structure or the ESS through a discharging port of the one or more discharging ports to a load connected to the discharging port.

In some embodiments, the plurality of pairs of rails are affixed, vertically adjacent to each other, to interior faces of opposing walls. In some embodiments, the portable container is a shipping container. In some embodiments, the ESS is mounted to a frame affixed to opposing interior faces of walls of the portable container and between a proximal end and a distal end of the portable container. In some embodiments, a first set of cables electrically connect the ESS to the one or more charging ports and a second set of cables electrically connect the ESS to the one or more discharging ports. In some embodiments, the ESS is mounted to a distal end of the portable container, and portable solar panel structures may be added and/or removed from the portable container from a proximal end of the portable container.

In one aspect, the present disclosure describes a micro utility system including a plurality of portable solar panel structures each comprising two or more solar panels coupled to each other at one end (e.g., in an angled configuration), wherein each of the plurality of portable solar panel structures is coupled to at least two wheels at a distal end of the portable solar panel structure, the at least two wheels may be foldably or removably coupled to the portable solar panel structure; and a portable container housing a plurality of pairs of rails on opposing interior walls of the portable container and an energy storage system (ESS), each of the plurality of portable solar panel structures supported by a different pair of the plurality of pairs of rails.

In some embodiments, each of the plurality of pairs of rails is spaced apart from another of the plurality of pairs of rails by a distance set such that each of the plurality of portable solar panel structures can be inserted into the portable container with the two wheels of the portable solar panel structure folded towards the portable solar panel structure or removed from the portable solar panel structure and, in some cases, inserted beneath the portable solar panel structure in an orientation substantially parallel to the portable solar panel structure, but at least one of the plurality of portable solar panel structures cannot be inserted into the portable container with the two wheels attached to the portable solar panel structure in a position substantially perpendicular to the portable solar panel structure.

In one aspect, the present disclosure provides a portable container. The portable container may include a plurality of walls; an energy storage system (ESS); one or more charging ports located on an exterior surface of a first wall of the plurality of walls and electrically connected to the ESS; and one or more discharging ports located on the exterior surface of the first wall or an exterior surface of a second wall of the plurality of walls and electrically connected to the ESS. In some embodiments, a load is electrically connected to a discharging port of the one or more discharging ports and receiving energy from the ESS through the discharging port.

In some embodiments, the ESS is mounted to a frame affixed to opposing interior faces of the plurality walls of the portable container and between a proximal end and a distal end of the portable container. In some embodiments, the portable container further includes a first plurality of pairs of rails on opposing interior walls on a first side of the portable container; and a second plurality of pairs of rails on opposing interior walls on a second side of the portable container, first side of the portable container separated from the second side of the portable container by the frame affixed to opposing interior faces of the plurality of walls of the portable container.

In one aspect, the present disclosure provides a system for managing electrical energy generated by a renewable micro utility. The system may comprise one or more computer processors operatively coupled to computer memory and configured by machine-readable instructions to store priorities for one or more consumer loads in the computer memory; forecast an amount of electrical energy available from a renewable energy system (RES) and an energy storage system (ESS) for a time period; allocate a first electrical energy amount to a first consumer load of the one or more consumer loads to a first energy limit of the first consumer load for the time period responsive to the first consumer load having the highest stored priority of the one or more consumer loads; responsive to the allocating the first electrical energy to the first consumer load to the first energy limit, determine more electrical energy is forecast to be available from the RES or the ESS for the time period; identify a second consumer load of the one or more consumer loads responsive to the second consumer load having a second highest priority of the one or more consumer loads; allocate a second electrical energy amount to the second consumer load for the time period responsive to the identification of the second consumer load and the determination that there is more electrical energy available from the RES or the ESS for the time period; and direct electrical energy from the RES or the ESS to the first and second consumer loads according to the allocations.

In some embodiments, the one or more computer processors are further configured by the machine-readable instructions to determine a priority for each of the one or more consumer loads based on prioritization criteria. In some embodiments, the one or more computer processors are configured by the machine-readable instructions to determine the priority for each of the one or more consumer loads by determining the priority based on pricing tiers, determinations of need, household/building size, type of home/building, geographic location of the home/building, demographic information, or other similar systems of each of the one or more consumer loads. In some embodiments, the one or more computer processors are configured by the machine-readable instruction to determine the priority for each of the one or more consumer loads by determining the priority based on a type of each of the one or more consumer loads.

In some embodiments, the one or more computer processors are configured by the machine-readable instruction to determine the priority for each of the one or more consumer loads by assigning consumer loads that correspond to medical facilities that contain temperature-sensitive medications or supplies a higher priority than all other consumer loads of the one or more consumer loads. In some embodiments, the one or more computer processors are further configured by the machine-readable instruction to determine the priority for each of the one or more consumer loads by assigning consumer loads that correspond to critical infrastructure as a next highest priority after the consumer loads that correspond to medical facilities that contain temperature-sensitive medications or supplies.

In some embodiments, the one or more computer processors are configured by the machine-readable instructions to determine the priority for each of the one or more consumer loads based on values that are associated with each of the one or more consumer loads. In some embodiments, the one or more computer processors are further configured by the machine-readable instructions to determine the forecast amount of electrical energy is not enough to allocate enough electrical energy to the second consumer load for the time period; and responsive to the determination, allocate an electrical energy amount of zero to each consumer load of the one or more consumer loads that has a priority that is lower than the priority of the second consumer load. In some embodiments, the one or more computer processors are configured by the machine-readable instructions to allocate the first electrical energy amount to the first consumer load by storing an indication of the first electrical energy amount in the computer memory.

In some embodiments, the one or more computer processors are further configured by the machine-readable instruction to determine a third priority for a third consumer load is identical to a fourth priority for a fourth consumer load; responsive to the determination that the third priority is identical to the fourth priority, calculate a third electrical energy amount that is equal to a fourth electrical energy amount; and allocate the third electrical energy amount to the third consumer load for the time period and the fourth electrical energy amount to the fourth consumer load for the time period.

In some embodiments, the one or more computer processors are further configured by the machine-readable instructions to determine the forecast amount of electrical energy is not enough to allocate enough electrical energy to the second consumer load for the time period; and reduce a previously assigned energy limit for each of the one or more consumer loads responsive to the determination. In some embodiments, the one or more computer processors are configured by the machine-readable instruction to reduce the previously assigned energy limit for each of the one or more consumer loads based on the priorities of the one or more consumer loads.

In some embodiments, the one or more computer processors are configured by the machine-readable instructions to, during the time period: determine the first energy limit is higher than an amount of energy the first consumer load will utilize during the time period; calculate an excess energy by calculating a difference between the first energy limit and the amount of energy the first consumer load will utilize during the time period; and allocate the excess energy to other consumer loads of the one or more consumer loads. In some embodiments, the one or more computer processors are configured by the machine-readable instructions to allocate the excess energy to other consumer loads by increasing the allocated second electrical energy amount until the second electrical energy amount reaches a second energy limit. In some embodiments, the one or more computer processors are configured by the machine-readable instructions to transmit a message to a device associated with a user of the first consumer load, the message comprising a string indicating the first consumer is on track to use less energy than the allocated first electrical energy amount.

In some embodiments, the one or more computer processors are configured by the machine-readable instructions to, during the time period: determine an amount of energy that has been directed to the first consumer load has reached the first energy limit; and terminate distribution of energy to the first consumer load responsive to the determination. In some embodiments, the one or more computer processors are configured by the machine-readable instructions to, during the time period: determine an amount of energy that has been directed to the first consumer load is within a threshold of the allocated first electrical energy amount; and responsive to the determination, transmit a message to a device associated with a user of the first consumer load, the message comprising a string indicating to utilize less energy for a remainder of the time period.

In one aspect, the present disclosure describes a method for managing electrical energy generated by a renewable micro utility comprising a renewable energy system ("RES") and an energy storage system ("ESS"). The method may comprise storing priorities for one or more consumer loads in a computer memory; forecasting an amount of electrical energy available from the RES and the ESS for a time period; allocating a first electrical energy amount to a first consumer load of the one or more consumer loads to a first energy limit of the first consumer load for the time period responsive to the first consumer load having a highest stored priority of the one or more consumer loads; responsive to the allocating the first electrical energy amount to the first consumer load to the first energy limit, determining more electrical energy is forecast to be available from the RES or the ESS for the time period; identifying a second consumer load of the one or more consumer loads responsive to the second consumer load having a second highest priority of the one or more consumer loads; allocating a second electrical energy amount to the second consumer load for the time period responsive to the identification of the second consumer load and the determination that there is more electrical energy available from the RES or the ESS for the time period; and directing electrical energy from the RES or the ESS to the first and second consumer loads according to the allocations.

In some embodiments, the method further comprises determining a priority for each of the one or more consumer loads based on prioritization criteria. In some embodiments, determining the priority for each of the one or more consumer loads comprises determining the priority based on a type of each of the one or more consumer loads.

In some embodiments, determining the priority for each of the one or more consumer loads comprises assigning consumer loads that correspond to medical facilities that contain temperature-sensitive medications or supplies a higher priority than all other consumer loads of the one or more consumer loads. In some embodiments, determining the priority for each of the one or more consumer loads comprises assigning consumer loads that correspond to critical infrastructure as a next highest priority after the consumer loads that correspond to medical facilities that contain temperature-sensitive medications or supplies. In some embodiments, determining the priority for each of the one or more consumer loads comprises determining the priority for each of the one or more consumer loads based on values that are associated with each of the one or more consumer loads.

In one aspect, the present disclosure describes one or more non-transitory computer storage media storing instructions that are operable, when executed by one or more computers, to cause said one or more computers to perform operations comprising storing priorities for one or more consumer loads in a computer memory; forecasting an amount of electrical energy available from a renewable energy system (RES) and an energy storage system (ESS) for a time period; allocating a first electrical energy amount to a first consumer load of the one or more consumer loads to a first energy limit of the first consumer load for the time period responsive to the first consumer load having a highest stored priority of the one or more consumer loads; responsive to the allocating the first electrical energy amount to the first consumer load to the first energy limit, determining more electrical energy is forecast to be available from the RES or the ESS for the time period; identifying a second consumer load of the one or more consumer loads responsive to the second consumer load having a second highest priority of the one or more consumer loads; allocating a second electrical energy amount to the second consumer load for the time period responsive to the identification of the second consumer load and the determination that there is more electrical energy available from the RES or the ESS for the time period; and directing electrical energy from the RES or the ESS to the first and second consumer loads according to the allocations.

The present disclosure provides systems and methods for managing electrical energy generated by a renewable microgrid. In some embodiments of the present disclosure, the system comprises a renewable energy system configured to generate electrical energy from a renewable energy source ("RES"). The RES may be a solar photovoltaic (PV) array comprising solar cells or a wind farm comprising wind turbines. The system may comprise an energy storage system ("ESS") configured to store energy from the RES. The ESS may be a battery energy storage system ("BESS"). The system may comprise an energy management system configured to direct electrical energy from the RES to one or more consumer loads, from the RES to the ESS, or from the ESS to the one or more consumer loads. The EMS may be configured to deliver energy from the RES and to or from the ESS depending on the electrical energy generation of the RES. The system may comprise one or more active meters communicatively coupled to the one or more consumer loads. As described herein, an active meter is a device (e.g., a device comprising a processor and memory) capable of measuring energy consumption and capable of processing and responding to that measurement, for example by determining that a piece of energy-consuming equipment is about to exceed its allocation limit and signaling to the equipment that it should shut down or limit its energy consumption. In another example, an active meter may cut off energy flow to the equipment (if the equipment is not capable of responding to signaling). The one or more active meters may be configured to monitor energy consumption of the one or more consumer loads. The one or more active meters may communicate information about the energy consumption of the one or more consumer loads to an energy forecast and allocation system ("EFAS"). The one or more active meters may be configured to disconnect energy flow to a consumer load. The one or more active meters may disconnect energy flow to one or more devices of a consumer load comprising a plurality of devices. The system may comprise an EFAS communicatively coupled to the EMS and one or more active meters. The EFAS may be programmed to: (i) forecast an amount of electrical energy available from the RES and ESS for a plurality of time periods, and (ii) allocate, for each of the plurality of time periods, a maximum energy limit available to each of the one or more consumer loads. The EFAS may forecast the energy consumption of the one or more consumer loads. The EFAS may determine when a consumer load is predicted to exceed or stay below a maximum energy limit. The EFAS may communicate with a user of a consumer load when the consumer load is predicted to exceed or stay below the maximum energy limit. The EFAS may communicate an energy reduction plan to a user of a consumer load when the consumer load is predicted to exceed the maximum energy limit. When a consumer load is predicted to stay below the maximum energy limit, the EFAS may allow the user of the consumer load to (i) offer the excess energy for sale to the renewable microgrid, or (ii) offer the excess energy for sale to other users of the one or more consumer loads.

The system described above can allow an islanded renewable microgrid to manage the electrical energy generated by a RES to sufficiently provide energy to consumers of the renewable microgrid without the need of a supplemental energy source. Monitoring the energy consumption of each of the consumer loads, coupled with the ability to disconnect or reduce energy flow to the consumer loads, allows the system to ensure that any one consumer load does not jeopardize the available energy left for the remaining consumer loads. The ability of the EFAS to communicate with users of the consumer loads provides a system of efficient energy management to ensure that consumer loads do not exceed their maximum energy limit. Thus, the system improves the efficiency of islanded renewable microgrids and allows them to provide energy to consumer loads reliably without the need of a supplemental energy supply.

In an aspect, the present disclosure provides a system for managing electrical energy generated by a renewable microgrid. The system comprises: an energy management system ("EMS") configured to direct electrical energy (1) from a renewable energy system ("RES") to one or more consumer loads, (2) from the RES to an energy storage system ("ESS"), or (3) from the ESS to the one or more consumer loads; and an energy forecasting and allocation system ("EFAS") communicatively coupled to the EMS and one or more active meters for monitoring energy consumption of the one or more consumer loads, wherein the EFAS is programmed to: forecast an amount of electrical energy available from the RES and the ESS for a plurality of time periods; and allocate, for each of the plurality of time periods, a maximum energy limit available to each of the one or more consumer loads.

In some embodiments, the RES is configured to generate the electrical energy from a renewable energy source comprising solar or wind. In some embodiments, the ESS comprises one or more batteries. In some embodiments, the ESS comprises a maximum charge limit, a minimum charge limit, and a state of charge. In some cases, the EMS is configured to reduce the electrical energy generation of the RES to match a demand from the one or more consumer loads when (i) electrical energy generation from the RES is greater than the demand from the one or more consumer loads, and (ii) the state of charge of the ESS is at the maximum charge limit. In some cases, when the state of charge of the ESS is not at the maximum charge limit, and the electrical energy generation from the RES is greater than a sum of (i) a demand from the one or more consumer loads and (ii) the maximum charge limit of the ESS in its current state of charge, the EMS is configured to reduce the electrical energy generation from the RES to match the sum. In some cases, when the state of charge of the ESS is not at the maximum charge limit, and the electrical energy generation from the RES is greater than a demand from the one or more consumer loads, but less than a sum of (i) the demand of the one or more consumer loads, and (ii) the maximum charge limit of the ESS in its current state of charge, the EMS is configured to deliver electrical energy from the RES to meet the demand from the one or more consumer loads and deliver any remaining electrical energy to the ESS. In some cases, when the electrical energy generation from the RES is less than a demand of the one or more consumer loads, and the state of charge of the ESS is above the minimum charge limit, the EMS is configured to deliver electrical energy from the RES and the ESS sufficient to meet the demand of the one or more consumer loads. In some cases, when the electrical energy generation from the RES is less than a demand of the one or more consumer loads, and the state of charge of the ESS is at or below the minimum charge limit, the EMS is configured to deliver electrical energy from the RES to the one or more consumer loads.

In some embodiments, the one or more active meters communicate information about the energy consumption of the one or more consumer loads to the EFAS in real time. In some embodiments, the one or more active meters are configured to disconnect energy flow to a consumer load if the consumer load reaches the maximum energy limit. In some cases, the consumer load is associated with a plurality of devices and the one or more active meters are configured to disconnect energy flow to one or more of the plurality of devices if the consumer load reaches the maximum energy limit. In some cases, the EFAS is configured to monitor the state of charge of the ESS such that the maximum energy limit for each of the one or more consumer loads does not lower the state of charge of the ESS below the minimum charge limit.

In some embodiments, the maximum energy limit is based at least in part on equal amounts of electrical energy being allocated to each of the one or more consumer loads. In some embodiments, the maximum energy limit is based at least in part on a priority system. In some cases, the maximum energy limit is based at least in part on a forecast of energy consumption by each of the one or more consumer loads. In some instances, the EFAS is programmed to communicate to a user of the one or more consumer loads an energy reduction plan to maintain the one or more consumer loads within the maximum energy limit when a user of the one or more consumer loads is expected to exceed the maximum energy limit. In some instances, the EFAS is configured to communicate to a user of the one or more consumer loads when the user is expected to stay below the maximum energy limit and accumulate excess energy. For example, the EFAS a user to (i) offer the excess energy for sale to the renewable microgrid, or (ii) offer the excess energy for sale to other users of the one or more consumer loads. In some embodiments, the renewable microgrid comprises an islanded renewable microgrid.

In another related yet separate aspect, a method is provided for managing electrical energy generated by a renewable microgrid comprising a renewable energy system ("RES"), an energy storage system ("ESS"), an energy management system ("ESS"), one or more active meters, and an energy forecasting and allocation system ("EFAS"). The method comprises: monitoring, via the one or more active meters, energy consumption of one or more consumer loads; forecasting, via the EFAS, an amount of electrical energy available from the RES and ESS for a plurality of time periods; allocating, via the EFAS, for each of the plurality of time periods, a maximum energy limit available to each of the one or more consumer loads; and directing, via the EMS, electrical energy flow from the RES to the one or more consumer loads, from the RES to the ESS, or from the ESS to the one or more consumer loads.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

FIGS. 15A-15B illustrate a clamp coupling two solar panels together, according to some embodiments;

DETAILED DESCRIPTION

While various embodiments of the disclosure have been shown and described herein, it will be obvious to those skilled in the art that such embodiments are provided by way of example. Numerous variations, changes, and substitutions may occur to those skilled in the art without departing from the disclosure. It should be understood that various alternatives to the embodiments of the disclosure described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Micro Utility System

Figure 1:
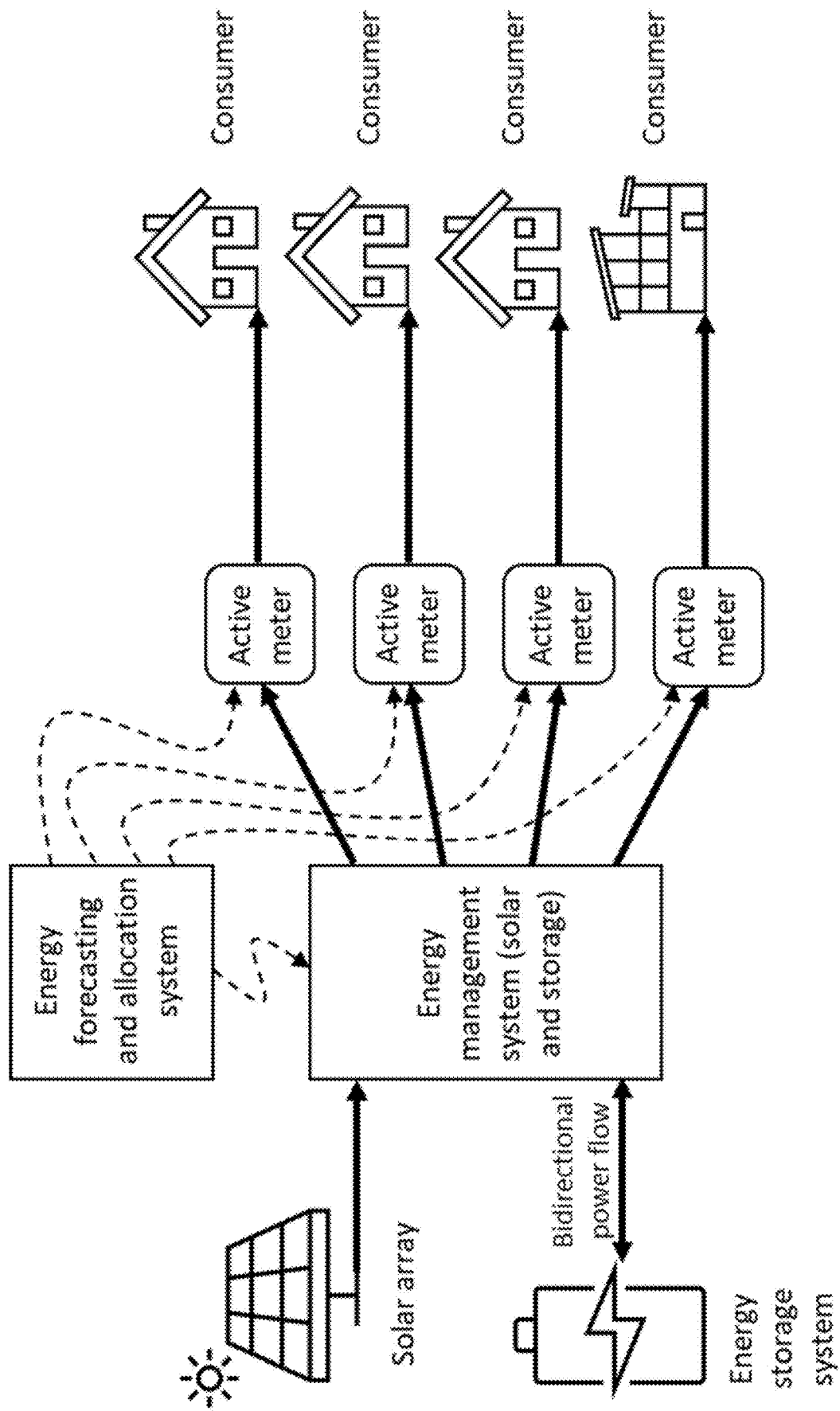
FIG. 1 schematically illustrates a renewable micro utility system for managing electrical energy generated by a renewable micro utility, in accordance with some embodiments.

FIG. 1 schematically illustrates a renewable micro utility system (e.g., a microgrid) for managing electrical energy generated by a renewable micro utility. The managing may include metering and allocating energy generated by a renewable micro utility. In some embodiments, the renewable micro utility may be islanded, meaning that the renewable micro utility does not have access to additional energy generation (e.g., from fossil fuel sources) to provide energy to consumers of the renewable micro utility. In other embodiments, the renewable micro utility need not be islanded, meaning the renewable micro utility has access to additional energy generation (e.g., from fossil fuel sources) to supplement the energy provided to consumers of the renewable micro utility. The renewable micro utility system may be or include a micro grid.

The system can comprise a renewable energy system configured to generate electrical energy from a renewable energy source (RES). As illustrated in FIG. 1, the RES may comprise a solar PV array comprising solar cells. In additional embodiments, the RES may comprise a wind farm comprising wind turbines. The renewable energy system may comprise a plurality of RES inverters. The RES inverters may convert the direct current (DC) electricity generated by the solar cells to alternating current (AC) electricity that can be used by the electrical grid. The RES inverters may have a first aggregate energy capacity.

The system can also comprise an energy storage system ("ESS") configured to store energy from the RES. As illustrated in FIG. 1, the ESS may be a battery energy storage system ("BESS"). The ESS may comprise a maximum charge limit, a minimum charge limit, and a state of charge. The ESS may comprise a plurality of ESS inverters. The ESS inverters may have a second aggregate energy capacity.

The first aggregate energy capacity of the plurality of RES inverters and the second aggregate energy capacity of the plurality of ESS inverters may be the same or they may be different. In some cases, the first aggregate energy capacity of the plurality of RES inverters (i.e., maximum potential energy output of the RES) may be larger than the maximum expected total electrical load on the system. This beneficially allows the renewable energy source to be capable to deliver enough energy to the electrical loads during adverse weather conditions. This also beneficially allows the renewable energy source to be capable to charge the ESS (e.g., a large ESS) while providing enough energy output to the electrical loads. When a solar RES is not able to deliver energy at night, the ESS may be controlled to deliver energy to the electrical loads to complement the RES. Alternatively or additionally, the ESS may deliver energy directly to the electrical load concurrently with the RES. For instance, during periods of moderately adverse weather when the production of the RES is below the maximum potential output of the RES or below the demand of the electrical load, the ESS may deliver the energy to the electrical loads.

The first aggregate energy capacity of the plurality of RES inverters and the second aggregate energy capacity of the plurality of ESS inverters may be configured to combine to be 50% or greater than a consumer energy demand of the renewable micro utility. The first aggregate energy capacity of the plurality of RES inverters and the second aggregate energy capacity of the plurality of ESS inverters may be configured to combine to be 100% or greater than the consumer energy demand of the renewable micro utility. The first aggregate energy capacity of the plurality of RES inverters and the second aggregate energy capacity of the plurality of ESS inverters may be configured to combine to be 150% or greater than the consumer energy demand of the renewable micro utility. The first aggregate energy capacity of the plurality of RES inverters and the second aggregate energy capacity of the plurality of ESS inverters may be configured to combine to be 200% or greater than the consumer energy demand of the renewable micro utility. The first aggregate energy capacity of the plurality of RES inverters and the second aggregate energy capacity of the plurality of ESS inverters may be configured to combine to be at least 5%, 10%, 15%, 20%, 25%, 30%, 35%, 40%, 45%, 50%, 55%, 60%, 65%, 70%, 75%, 80%, 85%, 90%, 95%, 100%, 200%, 300%, 400%, 500%, or greater than the consumer energy demand of the renewable micro utility.

The RES and ESS may further comprise equipment in addition to the plurality of inverters that help deliver electrical energy from the RES and ESS to the micro utility. For example, the RES and ESS may comprise one or more transformers, one or more cables, and one or more switchgears configured to help deliver electrical energy from the RES to the micro utility. In some cases, the one or more transformers, one or more cables, and one or more switchgears of the RES may be oversized such that the RES is able to deliver energy to the micro utility greater than the maximum consumer demand of the renewable micro utility. Such oversized RES beneficially allows for enough energy to be delivered during adverse weather conditions. For example, one or more internal transformers, one or more cables, and one or more switchgears of the RES may be oversized to increase the potential capacity of the RES while the output transformers, cabling and switchgears that take energy onto the micro utility may be sized to deliver energy to the micro utility at a level equal to the total consumer demand of the renewable micro utility. The one or more internal transformers, one or more cables, and one or more switchgears of the RES may be sized such that the RES has a capacity to deliver energy to the micro utility at a level at least 5%, 10%, 15%, 20%, 25%, 30%, 35%, 40%, 45%, 50%, 55%, 60%, 65%, 70%, 75%, 80%, 85%, 90%, 95%, 100%, 200%, 300%, 400%, 500%, or greater than the maximum consumer demand of the renewable micro utility. The one or more output transformers, one or more cables, and one or more switchgears of the RES may be sized to deliver energy to the micro utility at a level equal to about 5%, 10%, 15%, 20%, 25%, 30%, 35%, 40%, 45%, 50%, 55%, 60%, 65%, 70%, 75%, 80%, 85%, 90%, 95% or 100% of the total consumer demand of the renewable micro utility. In some embodiments, the ESS may not be oversized. Alternatively, the ESS may be oversized. For example, one or more internal transformers, one or more cables, and one or more switchgears of the ESS may be oversized such that the ESS has a potential capacity to deliver energy to the micro utility at a level equal to or greater than the total consumer demand of the renewable micro utility. The one or more output transformers, one or more cables, and one or more switchgears of the ESS may be sized to deliver energy to the micro utility at a level equal to the total consumer demand of the renewable micro utility. The one or more internal transformers, one or more cables, and one or more switchgears associated with the ESS may be sized such that the ESS is capable to deliver energy to the micro utility at a level at least about 5%, 10%, 15%, 20%, 25%, 30%, 35%, 40%, 45%, 50%, 55%, 60%, 65%, 70%, 75%, 80%, 85%, 90%, 95% or 100% greater than the total consumer demand of the renewable micro utility. The one or more output transformers, one or more cables, and one or more switchgears of the ESS may be sized to deliver energy to the micro utility at a level equal to about 5%, 10%, 15%, 20%, 25%, 30%, 35%, 40%, 45%, 50%, 55%, 60%, 65%, 70%, 75%, 80%, 85%, 90%, 95% or 100% of the total consumer demand of the renewable micro utility. The sizing of the RES and ESS can be configured to ensure the renewable micro utility can provide energy expected to be sufficient to the one or more consumers at all times and in a steady fashion. For example, the ESS can be sized to deliver energy to one or more consumer loads for as long as 24 or more hours, up to the time it would take to discharge the energy in the ESS from a fully-charged state at the maximum charge limit. The ESS can deliver this energy for as long as 1, 2, 3, 4, 5, 6, 7, 8, 9, 10, 11, 12, 13, 14, 15, 16, 17, 18, 19, 20 21, 22, or 23 or more hours, up to the time it would take to discharge the energy in the ESS from a fully-charged state at the maximum discharge limit.

However, relying on oversizing the energy source alone may not achieve satisfactory result. First, such approach may not guarantee that the loads can be served. For example, if the weather is worse than planned, or the underproduction by the renewable source is more severe than planned, the renewable source may fail to produce enough energy to serve the loads. In practice, the micro utility designer may need to determine how often it is acceptable for the system to fail to serve the load, in order to determine the required oversizing of the renewable source. Second, as the requirement for the load-service percentage increases, the required degree of oversizing may increase thus inducing increased cost of the micro utility. The system described herein may reduce the degree of oversizing the renewable source by combining it with the active meters and an energy forecasting and allocation system ("EFAS") as described later herein.

The system can also comprise an energy management system ("EMS") configured to direct electrical energy from the RES to one or more consumer loads, from the RES to the ESS, or from the ESS to the one or more consumer loads. A consumer load may be defined by the electrical energy demand from one or more consumers connected to the renewable micro utility. Electrical energy flow from the RES may be dynamic. For example, if the RES is a solar array, the electrical energy flow from the RES may vary as the time of day, weather, amount of sunlight, temperature, and other factors change. The electrical energy flow from the ESS may be controlled to complement the output of the RES, and may change as the state of charge of the ESS changes. For example, when the amount of electrical energy from the RES reduces, the ESS may be controlled to increase the output energy to provide enough total energy to the micro utility. The amount of electrical energy directed by the EMS from the RES and the ESS to the one or more consumer loads may vary. For example, the amount of electrical energy delivered to the one or more consumer loads may be 100% from the RES and 0% from the ESS, 90% from the RES and 10% from the ESS, 80% from the RES and 20% from the ESS, 70% from the RES and 30% from the ESS, 60% from the RES and 40% from the ESS, 50% from the RES and 50% from the ESS, 40% from the RES and 60% from the ESS, 30% from the RES and 70% from the ESS, 20% from the RES and 80% from the ESS, 10% from the RES and 90% from the ESS, or 0% from the RES and 100% from the ESS. The ratio of electrical energy delivered by the RES and ESS to the one or more consumer loads can be modulated in real time to achieve desired operating conditions and performance. The amount of electrical energy delivered by the RES to the one or more consumer loads may increase when renewable energy production is at a peak. For example, when the RES comprises a solar PV array, the RES may deliver 100% of the consumer energy demand during the middle of a day with ample sunlight. The amount of electrical energy delivered by the ESS to the one or more consumer loads may increase to compensate for the fluctuations in energy delivery from the RES. For example, the ESS can deliver 100% of the consumer energy demand during the night, when a RES comprising a solar PV array is unable to generate electrical energy. This change can be made in real time to ensure energy delivery to the one or more consumer loads remains constant, preventing power spikes and power outages. The EMS may ensure that the state of charge of the ESS remains above a minimum threshold.

Figure 4A:
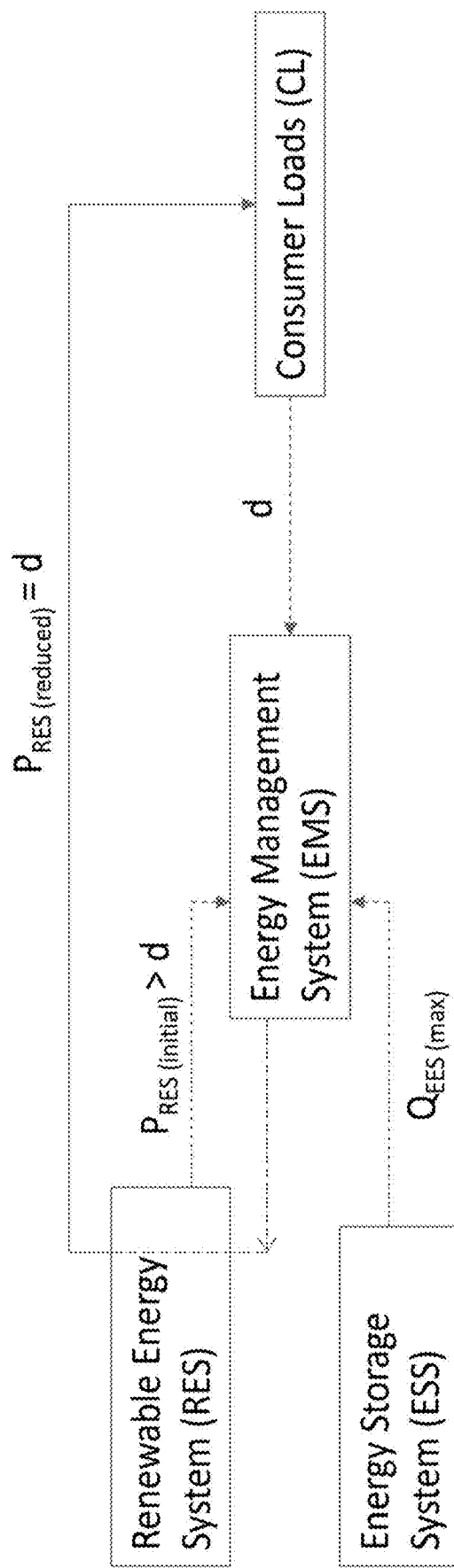
FIGS. 4A-4F are flow charts illustrating the flow of energy from the renewable energy system and the energy storage system ("ESS") to one or more consumer loads, in accordance with some embodiments.
Figure 4B:
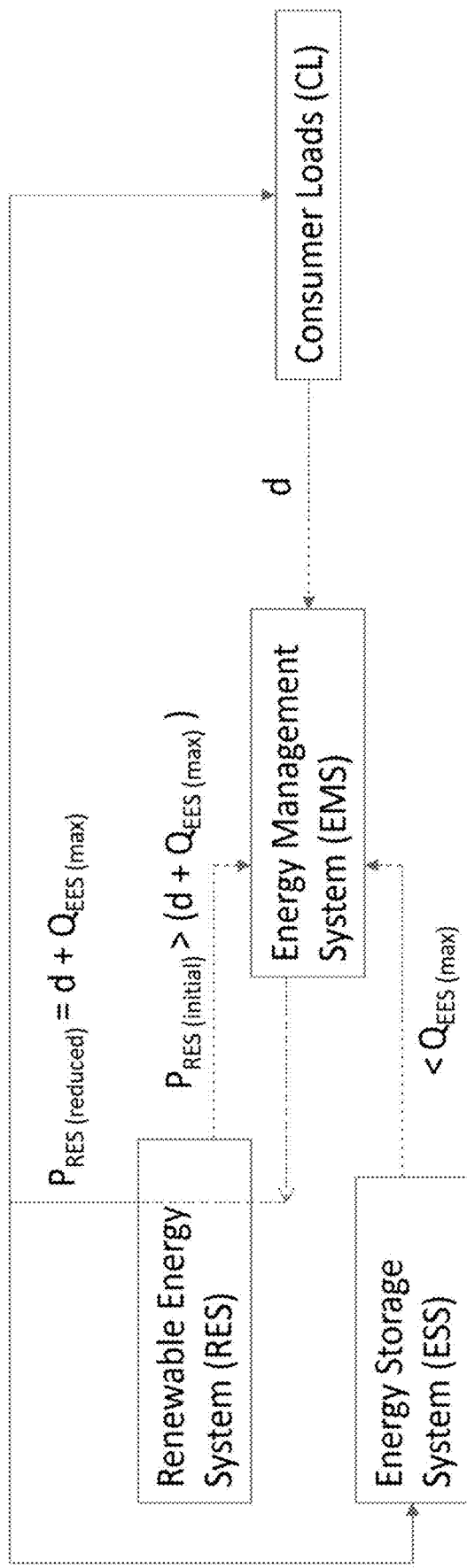
Figure 4C:
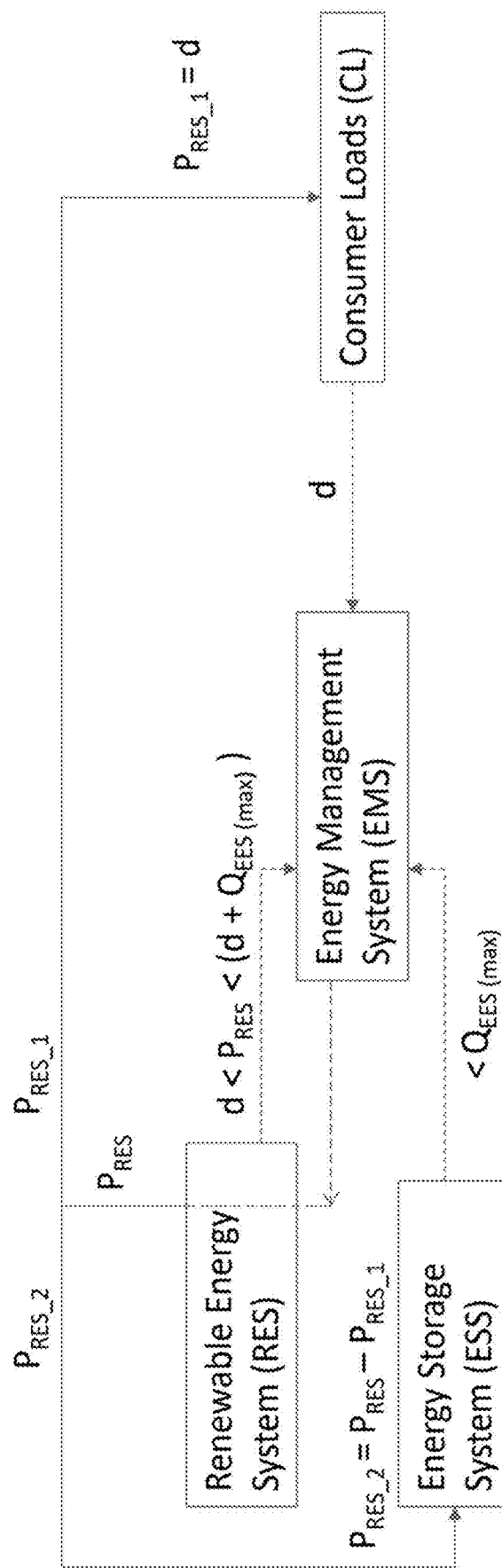
Figure 4D:
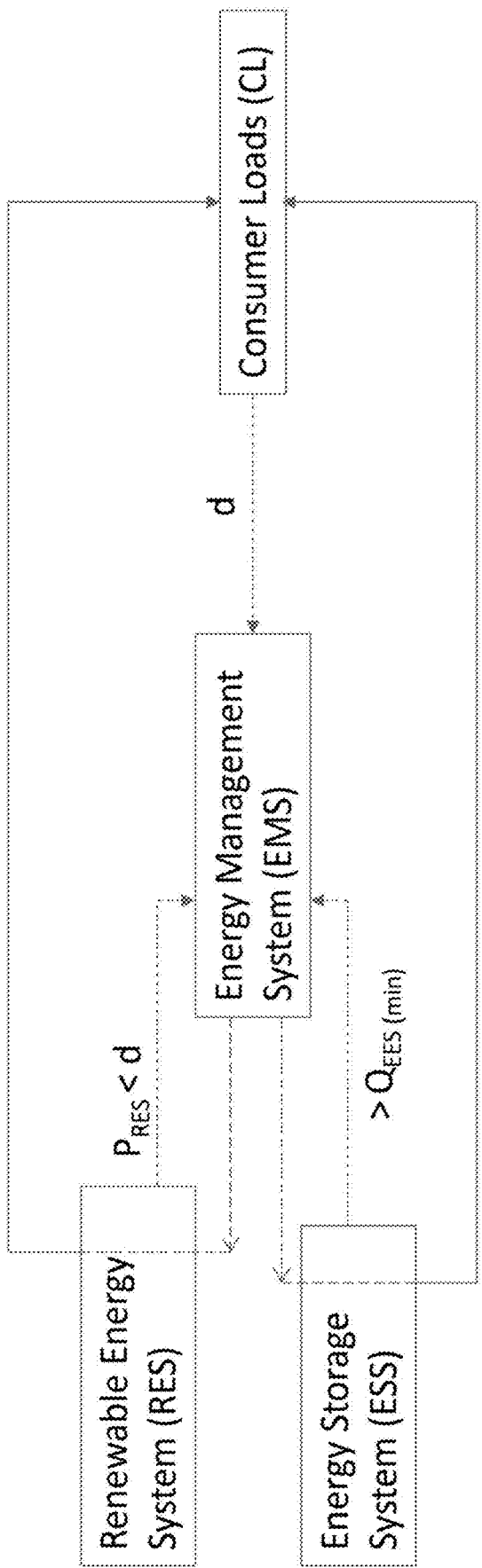
Figure 4E:
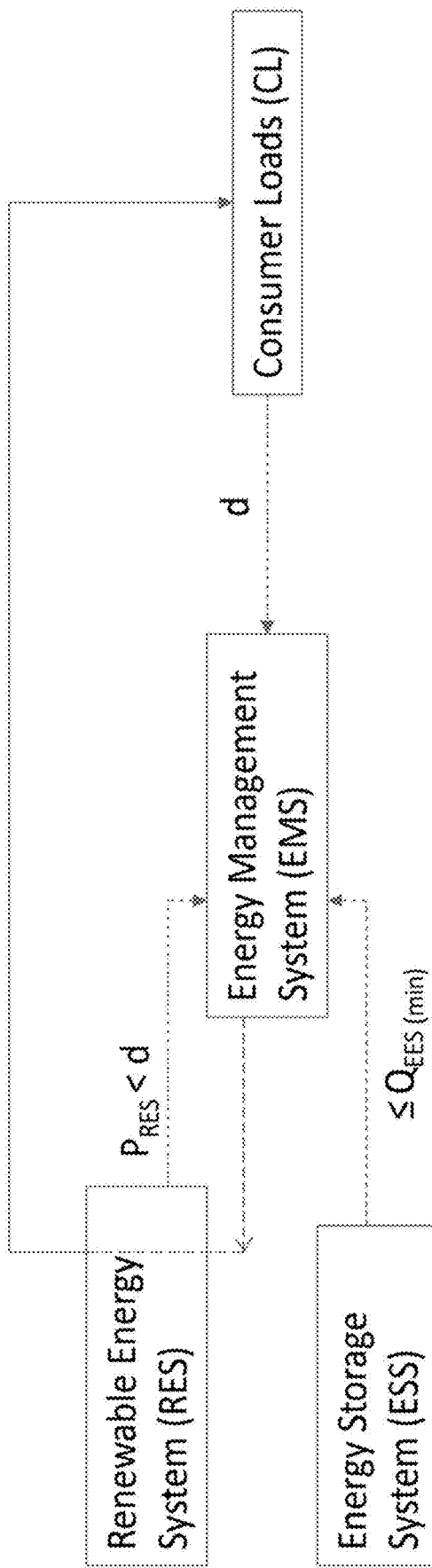
Figure 4F:
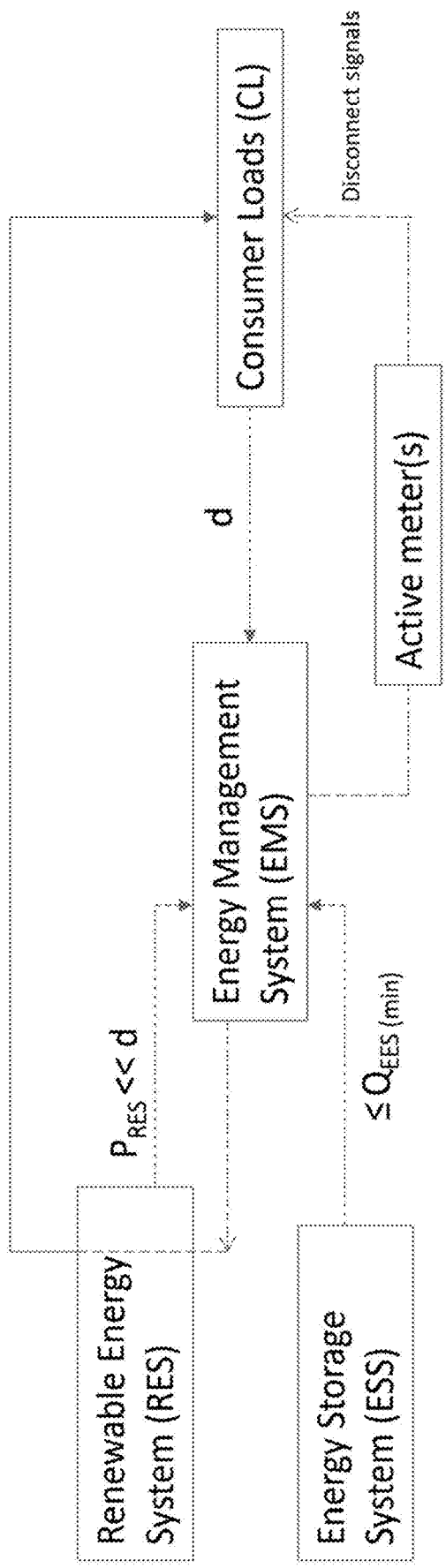

The EMS may direct energy either into the ESS, to charge the ESS, or out of the ESS, discharging the ESS to one or more consumer loads. In some embodiments, as illustrated in FIG. 4A, where (i) electrical energy generation from the RES is greater than the demand from one or more consumer loads, and (ii) the state of charge of the ESS is at the maximum charge limit, the EMS can reduce the electrical energy generation of the RES to match the demand of the one or more consumer loads. In some embodiments, as illustrated in FIG. 4B, where the ESS is not fully charged, and the energy that could be generated by the RES is greater than the sum of (i) a demand from one or more consumer loads, and (ii) the maximum charging limit of the ESS in its current state of charge, the EMS can reduce the electrical energy generation of the RES to match the sum of (i) and (ii). In some embodiments, as illustrated in FIG. 4C, where the ESS is not fully charged, and the energy that could be generated by the RES is greater than the demand of the one or more consumer loads, but less than the sum of (i) the demand of the one or more consumer loads, and (ii) the maximum charging limit of the ESS in its current state of charge, the EMS can deliver electrical energy from the RES to meet the demand from the one or more consumer loads and deliver the remaining electrical energy to the ESS. In some embodiments, as illustrated in FIG. 4D, where the electrical energy that could be generated by the RES is less than the demand of one or more consumer loads, and the state of charge of the ESS is above the minimum charge limit, the EMS can deliver electrical energy from the RES and ESS that is sufficient to meet the demand of the one or more consumer loads. In some embodiments, as illustrated in FIG. 4E, where the electrical energy that could be generated by the RES is less than the demand of one or more consumer loads, and the state of charge of the ESS is at or below the minimum charge limit, the EMS can deliver the available energy from the RES to the one or more consumer loads. As illustrated in FIG. 4F, when the electrical energy available from the RES and ESS is not sufficient to meet the demand of the one or more consumer loads, the system can disconnect a part, or an entire load, of a consumer load, as will be described herein.

The system can comprise one or more active meters communicatively coupled to one or more consumer loads. As illustrated in FIG. 1, the active meters can be communicatively coupled to the EMS, and an energy forecasting and allocation system ("EFAS"). The one or more active meters can be configured to monitor the energy consumption of the one or more consumer loads, and communicate the energy consumption to the EMS and EFAS. The one or more active meters can communicate the energy consumption information to the EMS and EFAS in real time, or near real time. As illustrated in FIG. 1, each of the one or more active meters can individually be connected to one consumer load. In other embodiments, each of the one or more active meters can be connected to multiple consumer loads. The one or more active meters can limit, or disconnect energy flow to a consumer load. The one or more active meters can further limit, or disconnect energy flow to one or more devices of a consumer load comprising a plurality of devices. As an example, the active meters can shut down the air conditioning system connected to a consumer's home, but not other electrical loads connected to the consumer's home. As an additional example, the active meters can shut down some, but not all, of the elevators in a consumer's office building. The one or more active meters can limit, or disconnect energy flow to a consumer load when, for example, a consumer load has reached a maximum energy limit, as will be described herein.

The system can comprise an EFAS communicatively coupled to the EMS and the one or more active meters. The EFAS can be configured to forecast an amount of electrical energy available from the RES and the ESS for a plurality of time periods. The EFAS can further be configured to allocate, for each of the plurality of time periods, a maximum energy limit available to each of the one or more consumer loads. The plurality of time periods together can comprise a forecast period. Each of the plurality of time periods can be about 1, 2, 3, 4, 5, 6, 7, 8, 9, 10, 15, 20, 25, 30, 35, 40, 45, 50, 55, or 60 minutes or more. In addition, the time periods can be about 1, 2, 3, 4, 5, 6, 7, 8, 9, 10, 11, 12, 13, 14, 15, 16, 17, 18, 19, 20, 21, 22, 23, or 24 hours or more. In addition, the time periods can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more. Each of the time periods in a forecast period may be equal in length, or they may have differing durations. As an example, for a renewable micro utility comprising a solar PV RES, a forecast period could end at a next time point at which total consumer energy demand from one or more consumer loads is less than the instantaneous electrical energy generation from the solar PV RES, after having been more than the instantaneous electrical energy generation from the solar PV RES for at least a minimum length of time (e.g., three hours, six hours, nine hours). This point in time could mark a point where the ESS would reach a state of charge at, or near, its minimum charge limit.

The EFAS can be configured to allocate, for each of the plurality of time periods, a maximum energy limit available to each of the one or more consumer loads. The maximum energy limit may be a maximum energy limit that can be drawn by the one or more consumer loads over an entire forecast period. The EFAS may ensure, using the forecast of the amount of electrical energy available from the RES and the ESS for a forecast period, that the maximum energy drawn by the one or more consumer loads does not lower the state of charge of the ESS below its minimum charge limit. The energy allocations can be determined such that an equal amount of energy is allocated to each of the one or more consumer loads. Alternatively, the energy allocations can be determined based on a priority system. The priority system may comprise a list of higher priority consumer loads and lower priority consumer loads. The priority system may be based on pricing tiers, determinations of need, household/building size, type of home/building, geographic location of the home/building, demographic information, or other similar systems. For example, some consumers may pay a higher price for energy than others, and the system may allocate a higher maximum energy limit to higher paying customers than lower paying customers. The system may also allocate the maximum energy limit based on the size of a consumer home or building. For example, consumer homes on the micro utility may vary in size (e.g., square footage). The system may allocate a higher maximum energy limit to consumers with higher square footage homes than those with lower square footage homes. The system may also allocate the maximum energy limit based on the type of consumer home or building. For example, energy consumption needs may vary if the consumer building is a home, a condominium, an apartment, an office building, or critical infrastructure such as a healthcare facility, etc. The system can allocate a higher maximum energy limit to buildings requiring higher energy consumption and a lower maximum energy limit to building requiring lower energy consumption. The system may also allocate the maximum energy limit based on the geographic location of the consumer loads. Some consumer loads may require higher energy consumption based on their geographic location. For example, during summer time, some consumer loads may be located in geographic areas that have higher temperatures than other geographic areas, and may thus require higher energy consumption (e.g., higher use of air conditioning). The system can allocate a higher maximum energy limit to geographic areas requiring higher energy consumption and allocate a lower maximum energy limit to geographic areas requiring a lower energy consumption.

The energy allocations may also be based on a forecast of energy consumptions of each of the one or more consumer loads. For example, the forecasts may be based on historical consumption patterns or physical models. The forecasts may also be based on data comprising information about days of the week, time of the year, and weather conditions including temperature, cloud coverage, rain, snow, etc. The forecast of energy consumption can ensure that the EFAS allocates energy to higher priority consumer loads first, and then allocates energy for the remaining lower-priority consumer loads.

The energy allocations may also be based on a forecast of the weather which influences the capability of the renewable energy sources. For example, the system may store pre-determined relationship about how weather influences on renewable generation and the forecast of the weather may be translated into the energy capacity or the production of the RES.

The EFAS can also be configured to communicate with the users of the one or more consumer loads. The communications may be sent via mobile phone app, text message, automatic voice response system, email, web site, or other similar technologies as described herein. The communications may come automatically, or may come at the request of a user of the one or more consumer loads, or may be triggered by an operator of the EFAS. The EFAS can be configured to use the forecast of energy consumption of each of the one or more consumer loads described above to determine whether the consumer loads attached to the active meters are expected to stay within the maximum energy limit allocated to them. The EFAS, for example, can be programmed to communicate to a user of the one or more consumer loads when the consumer load is expected to exceed the maximum energy limit. For example, the EFAS can communicate to a user when the user has used 70% or more of their maximum energy limit over a forecast period. The EFAS can communicate to a user when the user has used 80% or more of their maximum energy limit over a forecast period. The EFAS can communicate to a user when the user has used 90% or more of their maximum energy limit over a forecast period. The EFAS can communicate to a user when the user has used 10%, 20%, 30%, 40%, 50%, 60%, 70%, 80%, 90%, 95%, 96%, 97%, 98%, or 99% or more of their maximum energy limit over a forecast period. The EFAS also, for example, can be programmed to communicate to a user of the one or more consumer loads an energy reduction plan to maintain the one or more consumer loads within the maximum energy limit when the user of the one or more consumer loads is expected to exceed the maximum energy limit. The energy reduction plan can comprise an energy limit or power limit, that, if complied with, would ensure the user of the consumer load would stay within the maximum energy limit. For example, the communication can say "you are currently consuming 25 kW and we need to ask you to reduce your average consumption to 15 kW for the rest of today." The energy reduction plan may also comprise a comparison to expected energy consumption patterns. For example, the communication can say "you would usually consume 50 kWh during the next 12 hours; we need to ask you to reduce this to 35 kWh today." The energy reduction plan can include specific recommendations of how the consumer can stay within the maximum energy limit. In the example above asking the consumer to drop the average consumption to 15 kW for the rest of the day, the energy reduction plan may include a recommendation of how to succeed in dropping to 15 kW. For example, the energy reduction plan may include a recommendation to set a thermostat at a certain temperature to limit the amount of energy used by a heating or cooling system.

When a consumer load is forecast to exceed its maximum energy limit, the EFAS can communicate with the active meter connected to the consumer load and instruct the active meter to take action to keep the consumer load with the maximum energy limit. For example, the active meter can limit, or disconnect energy flow to the one or more consumer loads. As an additional example, the active meter can limit, or disconnect energy flow to one or more devices of a consumer load comprising a plurality of devices. The active meter can limit, or disconnect energy flow to lower priority devices. The active meter can also operate one or more devices in a reduced-service mode. The EFAS may communicate with a user of the consumer load before taking action. Alternatively, the EFAS may take action without communicating with a user of the consumer load. For example, the user of the consumer load may have a pre-arranged agreement with the renewable micro utility setting forth actions to take to keep the consumer load within the maximum energy limit. This may allow the EFAS to take action early enough to minimize impact to the user of the consumer load.

In some embodiments, a consumer load's energy allocation may be determined by an advance agreement between a user of the consumer load and the renewable micro utility. Based on the forecast of energy consumption of the consumer load, if the EFAS determines that the energy allocation of the consumer load can be increased without an adverse impact on the energy availability to other consumer loads on the renewable micro utility, the EFAS can communicate with the user of the consumer load offering to increase the energy allocation to the consumer load. The increased energy allocation can come with an additional payment from the user of the consumer load.

In some embodiments, based on the forecast of energy consumption of a consumer load, the EFAS may determine that a consumer load is forecast to stay below the maximum energy limit. The EFAS can communicate to the user of the consumer load that the user is expected to stay below the maximum energy limit and accumulate excess energy. Alternatively, a user of the consumer load may determine on their own that the maximum energy limit will exceed their energy requirements. When a consumer load is expected to stay below its maximum energy limit, the EFAS may allow the user to (i) offer the excess energy for sale back to the renewable micro utility, or (ii) offer the excess energy for sale to other users of the other consumer loads of the renewable micro utility. If a user of a consumer load sells energy to another user of another consumer load, then the EFAS can increase the maximum energy limit to the user buying the energy, and decrease the maximum energy limit to the user selling the energy.

Figure 5A:
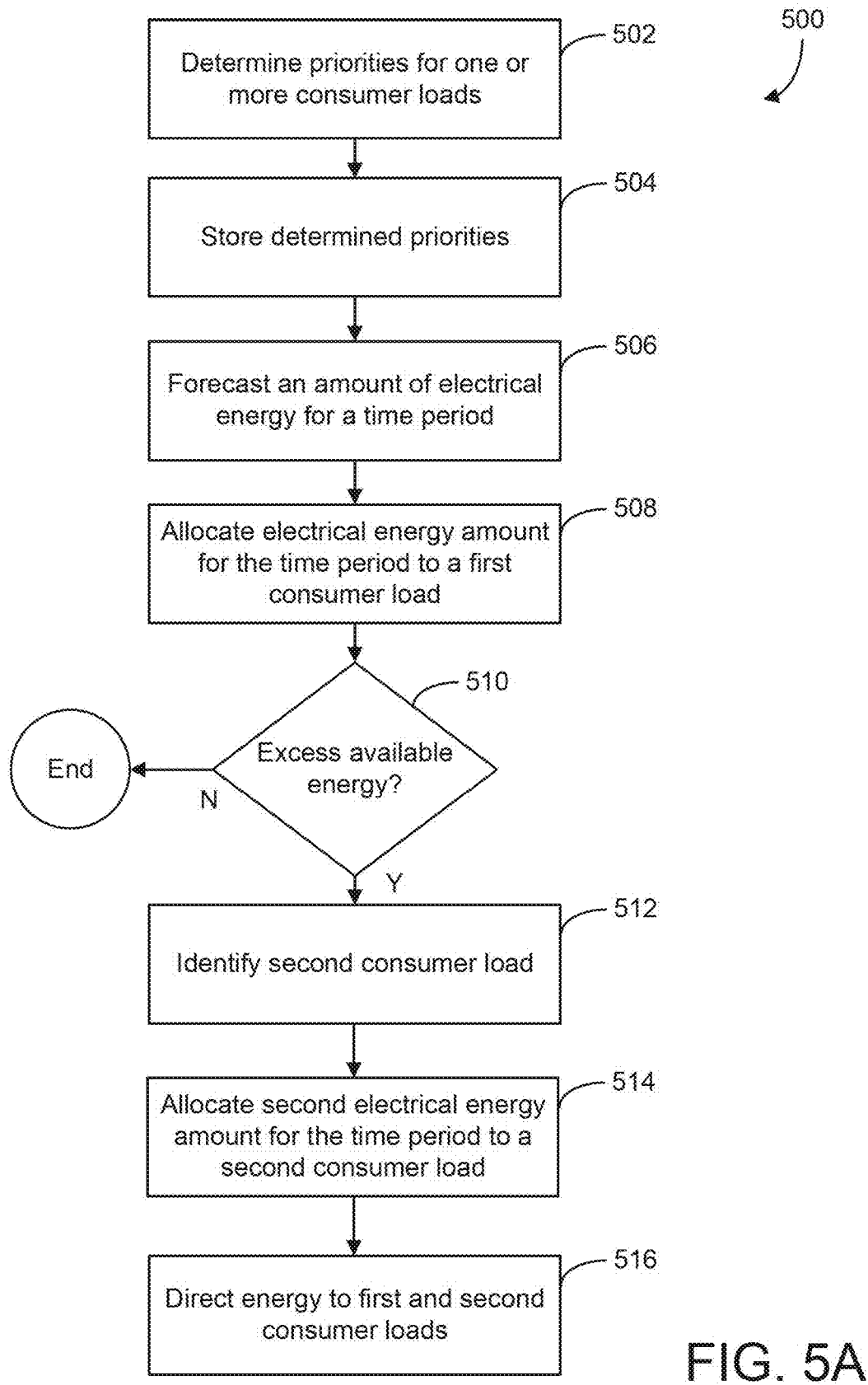
FIG. 5A illustrates a method for micro utility energy allocation, according to some embodiments.

FIG. 5A illustrates a method for micro utility energy allocation, according to some embodiments. Method 500 can be performed by a data processing system (e.g., a controller, a computer of computer system 201, shown and described with reference to FIG. 2, one or both of the controllers 824 or 826, shown and described with reference to FIG. 8, etc.). The data processing system may be a computer system that controls energy distribution of a micro utility and/or the micro utility itself. Method 500 may include more or fewer operations and the operations may be performed in any order. Performance of method 500 may enable the data processing system to allocate energy from an RES and/or a ESS of the micro utility to different consumer loads according to a range of criteria and ensure the consumer loads that need energy the most continue to receive energy, even in situations in which there is not enough energy to allocate energy to all consumer loads that are managed by the data processing system. Performance of method 500 may be particularly useful when controlling an islanded micro utility that has a limited and/or fluctuating energy supply based on how much energy the micro utility can generate from renewable energy sources.

At operation 502, the data processing system determines priorities for one or more consumer loads. The data processing system may determine the priorities for the one or more consumer loads based on prioritization criteria that the data processing system has stored in memory. The prioritization criteria may include one or more rules that indicate how to prioritize different consumer loads based on different types of data. In one example, the prioritization criteria may include a rule that indicates for the data processing system to prioritize consumer loads based on the historical energy utilization of the different loads (e.g., the data processing system may determine that consumer loads that historically utilize more energy have higher priorities consumer loads than consumer loads that historically utilize less energy). In this example, the data processing system may maintain a list of historical energy utilization (which the data processing system may receive from meters at the respective loads) for each consumer load in memory and compare the historical energy utilization for each consumer load with each other. The data processing system may determine the priorities for the consumer loads to have an ascending or descending order based on the historical energy utilization between the consumer loads. In another example, the prioritization criteria may include a rule that indicates for the data processing system to assign priorities based on a value (e.g., a paid energy price) of the respective consumer loads. The data processing system may store the values and associations between the values and identifications of the different consumer loads and determine the priorities for the consumer loads to have an ascending or descending order by comparing the values for the consumer loads and determining the priorities accordingly.

In another example, the data processing system may determine the priorities for the consumer loads based on the types of the consumer loads. For example, the data processing system may store a type (e.g., a consumer load type) for each consumer load to which the data processing system directs energy in memory. Examples of different types include, but are not limited to, medical facilities that contain temperature-sensitive medications or supplies (e.g., refrigerators containing vaccines or blood), electrical loads at designated critical infrastructure including medical facilities, public security facilities, public cooling/warming facilities, etc.

The data processing system may store level designations for each type of consumer load that indicate how the data processing system should prioritize the different types of consumer loads. For example, the temperature-sensitive medications or supplies may be the most important and therefore be at the highest level. The designated critical infrastructure including medical facilities, public security facilities, and/or public cooling/warming facilities types may be less important and therefore be at the next highest level. Any further types may be even less important and similarly structured into descending levels. The levels may include any type and/or number of consumer loads. The data processing system can store any number of levels. Accordingly, when determining the priorities for different consumer loads, the data processing system may identify the levels associated with the consumer loads' types and assign the priorities based on the levels (e.g., assign consumer loads with types in the highest level the highest priority, consumer loads with types in the next highest level the next highest priority, etc.). In this way, the data processing system may ensure the micro utility provides energy to consumer loads for which energy is most vital to operate even in instances in which the micro utility is not able to generate sufficient energy from renewable sources to provide energy to all the connected consumer loads.

In embodiments in which the data processing system determines priorities for consumer loads based on levels in which the data processing system grouped the types, the data processing system may determine priorities to consumer loads within the levels based on further rules. For example, when determining priorities, the data processing system may identify the consumer loads that are within the highest level. The data processing system may then determine priorities for the consumer loads within the level based on historical energy usage, value associations, consumer load sub-types, or any other type of data about the consumer loads compared to the other consumer loads within the level. The data processing system may compare such data for consumer loads within each level in an iterative process to determine priorities for the consumer loads as compared to each other within the respective levels. Thus, the data processing system may enable a further degree of customization for determining priorities for consumer loads.

The prioritization criteria may include any number of rules. For example, the prioritization criteria may include a rule in which energy users may pay a fixed fee to be assigned a higher priority rating for a period of time (regardless of how much energy they use). In another example, the data processing system may assign consumer loads higher priority ratings based on other public policy priorities. Such rules may be used alone or in combination with any other rules to allow an administrator to customize which consumer loads to prioritize.

At operation 504, the data processing system stores the determined priorities. The data processing system may store the determined priorities in memory. To do so, the data processing system may identify the location of the consumer loads for which the priorities were determined in memory and store associations between the priorities and respective consumer loads in the memory. For example, the data processing system may store identifications of the consumer loads in a relational database. The data processing system may store relationships between the priorities and the consumer loads in the relational database (e.g., store the priorities and their respective consumer loads in the same rows within the relational database). Accordingly, the data processing system may establish a priority order that indicates which consumer load to prioritize when allocating energy to the different consumer loads.

At operation 506, the data processing system forecasts an amount of electrical energy available from the renewable energy system and an energy storage system for a time period. The data processing system may forecast the amount of electrical energy for the time period based on a weather forecast (or any other type of forecast) that the data processing system receives from a weather forecast provider and based on the renewable energy sources (e.g., windmills or solar panels) that generate energy from the weather. In some embodiments, the data processing system generates the forecast of predicted energy production based on historical energy generation by the micro utility. In one example, the data processing system may identify the actual energy production of the micro utility at a corresponding time period to the time period of the forecast of predicted energy production (e.g., if the forecast of predicted energy production is from 1 pm to 2 pm on Tuesday, the data processing system may identify the actual energy production from 1 pm to 2 pm on the preceding Monday and determine the forecast of predicted energy production from 1 pm to 2 pm on Tuesday will be identical to the actual energy production from the 1 pm to 2 pm on Monday). In another example, the data processing system may determine the forecast of predicted energy production for the time period is an average of actual energy production in the same time frames of previous days or time periods. The data processing system may determine the forecast of energy production based on any rule or historical energy production values.

In some embodiments, the data processing system may forecast an amount of electrical energy available from a portable solar panel structure (e.g., the portable solar panel structure 1300, shown and described with reference to FIG. 13) and an energy storage system for a time period. To do so, the data processing system may forecast the amount of energy the portable solar panel structure will generate (or multiple portable solar panel structures will generate) in manner similar to the manner described above. The data processing system may do so by determining the amount of energy the solar panels of the portable solar panel structure will generate according to the weather forecast. The data processing system may also determine how much energy will be stored in the energy storage system at the beginning of the time period. The data processing system may do so, for example, by identifying the current amount of energy the data processing system has stored in the energy storage system and determining how much energy the portable solar panel structure will generate and direct to the energy storage system between the current time and the beginning of the time period. The data processing system may aggregate the forecast the amount of electrical energy that will be available from the portable solar panel structure and the energy storage system by aggregated the calculated values for the amount of energy the energy storage system will have stored at the beginning of the time period with the forecast amount of energy the portable solar panel structure will generate during the time period.

At operation 508, the data processing system allocates a first electrical energy amount to a first consumer load. The data processing system may allocate the first electrical energy amount to the first consumer load in response to determining the first consumer load has a highest stored priority of the consumer loads to which the data processing system directs energy. For example, the data processing system may retrieve the priorities of the consumer loads to which the data processing system directs energy and compare the priorities with each other. The data processing system may determine the first consumer load has the highest priority based on the comparison. The data processing system may then allocate the first electrical energy amount to the first consumer load.

In some embodiments, when allocating the first electrical energy amount to the first consumer load, the data processing system may allocate an amount of electrical energy that is equal to a first energy limit of the first consumer load. The first energy limit may indicate a maximum amount of energy that the consumer load may receive during the time period or an amount of energy that the first consumer load is required to receive during the time period according to a standard energy schedule. For example, the data processing system may store the first energy limit in memory. The data processing system may retrieve the first energy limit from the memory and compare the first energy limit to the forecast amount of energy that will be available to deliver to the first consumer load. If the forecast amount of energy that will be available is equal to or exceeds the first energy limit, the data processing system may allocate an amount of energy equal to the first energy limit to the first consumer load. Thus, the data processing system may ensure the highest prioritized consumer load is allocated enough energy to operate throughout the time period.

At operation 510, the data processing system may determine if there is forecast to be any excess available energy that can be distributed to other consumer loads. For example, the data processing system determines if the forecast available amount of energy exceeds the first energy limit or otherwise if there will be more available energy that can be distributed after allocating energy to the first consumer load. If the data processing system determines there will not be more available energy that can be distributed, the data processing system may stop performing method 500 as no more energy can be allocated.

However, if the data processing system determines more energy can be allocated to consumer loads, at operation 512, the data processing system identifies a second consumer load to allocate energy. The data processing system may identify the second consumer load responsive to determining the second consumer load has the second highest priority of the consumer loads to which the data processing system directs energy using similar methods to the above. At operation 514, the data processing system allocates a second electrical energy amount to the second consumer load. The data processing may allocate the second electrical energy amount to the second consumer load in a similar manner to how the data processing system allocates the first electrical energy amount to the first consumer load. The data processing system may repeat operations 508-514 to allocate electrical energy amounts to any number of consumer loads until either each consumer load to which the data processing system directs energy from the micro utility is allocated an amount of energy equal to the consumer loads' respective energy limits or there is not any excess available energy to allocate.

In some embodiments, the data processing system may allocate an electrical energy amount of zero to consumer loads upon determining there is not enough forecast available energy to reach an energy limit for a consumer load. For example, the second consumer load may have a second energy limit. After the data processing system allocates the first electrical energy amount to the first consumer load, the data processing system may determine there is not enough excess forecast available electrical energy to allocate to the second consumer load (e.g., determine the excess forecast available electrical energy is less than the second energy limit). After making this determination, the data processing system may allocate the remaining forecast available electrical energy to the second consumer load as the second electrical amount and allocate electrical energy amounts of zero to the remaining consumer loads to which the data processing system directs energy. Accordingly, the data processing system may ensure the higher prioritized consumer loads receive enough energy to operate, even at the expense of not providing energy to other consumer loads.

In some cases, the data processing system may determine two consumer loads have the same or identical priorities. When the data processing system does so, the data processing system may allocate equal or identical amounts of energy to the two consumer loads. For example, the data processing system may allocate the first electrical energy amount to the first energy limit and the second electrical energy amount to the second energy limit. The data processing system may then identify third and fourth consumer loads responsive to the third and fourth consumer loads having equal and the highest priorities after the second consumer load. The data processing system may identify a third energy limit of the third consumer load and a fourth energy limit of the fourth consumer load. The data processing system may identify the excess amount of energy that can be allocated and compare the excess amount to a sum of the third energy limit and the fourth energy limit. Responsive to determining the excess amount of energy is greater than the sum, the data processing system may allocate the energy to the third and fourth consumer loads to their respective limits and continue allocating energy to lower prioritized consumer loads.

However, responsive to determining the excess amount of energy is less than the sum of the third energy limit and the fourth energy limit, the data processing system may divide the excess amount of energy in half. The data processing system may allocate the divided energy to the third and fourth consumer loads. If the divided consumer load is higher than either the third energy limit or the fourth energy limit, the data processing system may allocate the divided consumer load to the respective limit, and then allocate the remaining divided consumer load to the other consumer load. Thus, the data processing system may equally allocate energy to consumer loads of equal priority.

In some embodiments, instead of allocating equal amounts of energy to consumer loads with the same priority, the data processing system may allocate amounts of energy to the consumer loads proportionally based on their energy limits as compared with each other. For example, one consumer load may have an energy limit of 90 kWh for a day (or another time period), and another consumer load may have an energy limit of 10 kWh for a day. The data processing system may identify the two energy limits and determine the ratio of the energy limits is nine to one. If the two consumer loads have equal priority and there is at least 100 kWh of energy forecast to be available from the RES or the ESS, the data processing system may allocate 90 kWh of energy to the consumer load with the energy limit of 90 kWh and 10 kWh of energy to the consumer load with the energy limit of 10 kWh. The data processing system may then allocate any excess energy to consumer loads with lower priorities. However, if there is only 90 kWh of energy that is forecast to be available and the two priority loads have equal priority, the data processing system may allocate the forecast energy to the two consumer loads according to the nine to one ratio of their energy limits (e.g., the data processing system may allocate 81 kWh of energy to the consumer load with the energy limit of 90 kWh and 9 kWh of energy to the consumer load with the energy limit of 10 kWh). In this instance, there would not be any excess energy, so the data processing system may not allocate any energy to consumer loads with lower priorities. Accordingly, the data processing system may allocate energy to the two consumer loads with equal priority so that either both consumer loads are allocated energy up to their respective energy limits or both consumer loads are allocated energy to an equal percentage of their respective energy limits.

In summary, in some embodiments, the data processing system may allocate energy to consumer loads according to the following rules: (1) if a forecast (e.g., the forecast available amount of energy for the time period) shows that there will not be sufficient energy to supply even the needs of the highest-priority load through the forecast horizon, supply (e.g., direct) all energy to the highest-priority load and no energy to any other load, (2) if the forecast shows that there will be just sufficient energy to supply the needs of the highest-priority load through the forecast horizon, supply all energy to the highest-priority load and no energy to any other load; (3) if the forecast shows that there will be more than sufficient energy to supply the needs of the highest-priority load, but not sufficient to supply both the needs of the highest-priority load and the next-highest-priority load, then supply energy to the highest-priority load throughout the forecast period, and allocate the remaining energy to the next-highest-priority load, with no energy going to any other load; (4) if the forecast shows that there will be just sufficient energy to supply the needs of both the highest-priority load and the next-highest-priority load, then supply energy to the highest-priority load and the next-highest-priority load throughout the forecast period, with no energy going to any other load; (5) in general if the forecast shows that there will be more than sufficient energy to supply the needs of the N highest-priority loads (where N is a natural number), but not sufficient to supply both the needs of the N highest-priority loads and the (N+1th)-highest-priority load, then supply energy to the N highest-priority loads throughout the forecast period, and allocate the remaining energy to the (N+1th)-highest-priority load, with no energy going to any other load; and (6) in general if the forecast shows that there will be just sufficient energy to supply the needs of the N highest-priority loads (where N is a natural number), then supply energy to the N highest-priority loads throughout the forecast period, with no energy going to any other load.

In some embodiments, in cases in which the data processing system determines there is not enough excess forecast available amount of energy to allocate to a consumer load, the data processing system may reduce the energy limits that were previously assigned to each of the consumer loads and re-allocate the energy amounts. For example, upon determining there is not enough forecast available energy to allocate to the second consumer load to reach a second limit for the second consumer load, the data processing system may reduce the energy limits of each of the consumer loads such that the data processing system may allocate energy to more or all of the consumer loads to which the data processing system directs energy.

For instance, when there is not sufficient energy to meet the normal allocations of all the consumer loads, the data processing system can reduce the energy limits of every consumer load, but with larger-percentage reductions to the lower-priorities, and smaller-percentage reductions to the higher-priorities. To give a representative example, the data processing system may store N consumer loads with N priorities, with 1 being the highest priority. The normal energy allocations or energy limits are $E_1, E_2 \ldots E_N$. The forecast energy available for delivery to the consumer loads may be EA. If $EA > Sum(E_1, E_2 \ldots E_N)$ (e.g., the available energy exceeds the sum of the normal energy allocations to all the priorities), energy can be delivered to all the consumer loads. However, if $EA < Sum(E_1, E_2 \ldots E_N)$, the energy allocated to each consumer load for the time period may be recalculated as $K_i \times E_i$ where $K_i$ is a multiplication factor applied to the ith priority (where i is a number between 1 and N) and $E_i$ is the normal energy allocation to the ith priority; $K_j < K_i$ if $j > i$—that is, the multiplication factor applied to a lower priority (where j is larger than i, j denotes a lower priority than i) would be smaller than the multiplication factor applied to a higher priority; and $EA = Sum(K_1 \times E_1, K_2 \times E_2 \ldots K_N \times E_N)$.

In one example of this approach, the multipliers $K_i$ could be calculated as $K_i = 2^{(-Q \times i)}$ where Q is a positive constant and i is any natural number between 1 and N. If Q is zero, then Ki=1 for all i, and this would be appropriate when EA>=Sum(E1, E2 . . . EN). In the case where EA<Sum (E1, E2 . . . EN), the choice of an appropriate value of Q will solve the equation EA=Sum($2^{-Q}$×E1, $2^{(-2Q)}$×E2 . . . $2^{(-N×Q)}$×EN). In a numerical example, if there are 3 priorities (N=3) and E1=E2=E3=100 kWh, and EA=150 kWh, then setting Q to 0.532378 would give allocations of 69 kWh (priority 1), 48 kWh (priority 2) and 33 kWh (priority 3), approximately.

In another approach, the data processing system may allocate energy to consumer loads using the function Ki=$2^{\{-Q×(2i-1)\}}$. In an example of using this function in which EA=150 kWh, Q=0.375919. The data processing system may use the function to determine the adjusted allocations of 77 kWh (priority 1), 46 kWh (priority 2) and 27 kWh (priority 3). This function would have the benefits of preserving more energy to be delivered to the consumer load with the top priority and reduces the energy that would be delivered to the lower priority consumer loads. Ki can be determined using any function, equation, or approach.

At operation 516, the data processing system directs the energy to the consumer loads to which the data processing system allocated energy. The data processing system may direct the energy to the consumer loads during the time period for which the data processing system allocated the electrical energy amounts. For example, the data processing system may control the renewable energy system (e.g., the portable solar panel structure 1300) and/or the energy storage system of the micro utility to transmit energy from the two systems to the different consumer loads over the course of the time period according to the allocated energy amounts that the data processing system has stored in memory. In this way, the data processing system may control how much energy is delivered to each consumer load to ensure the highest priority consumer loads receive enough energy to operate, even when the energy that can be generated from renewable sources is low.

Figure 5B:
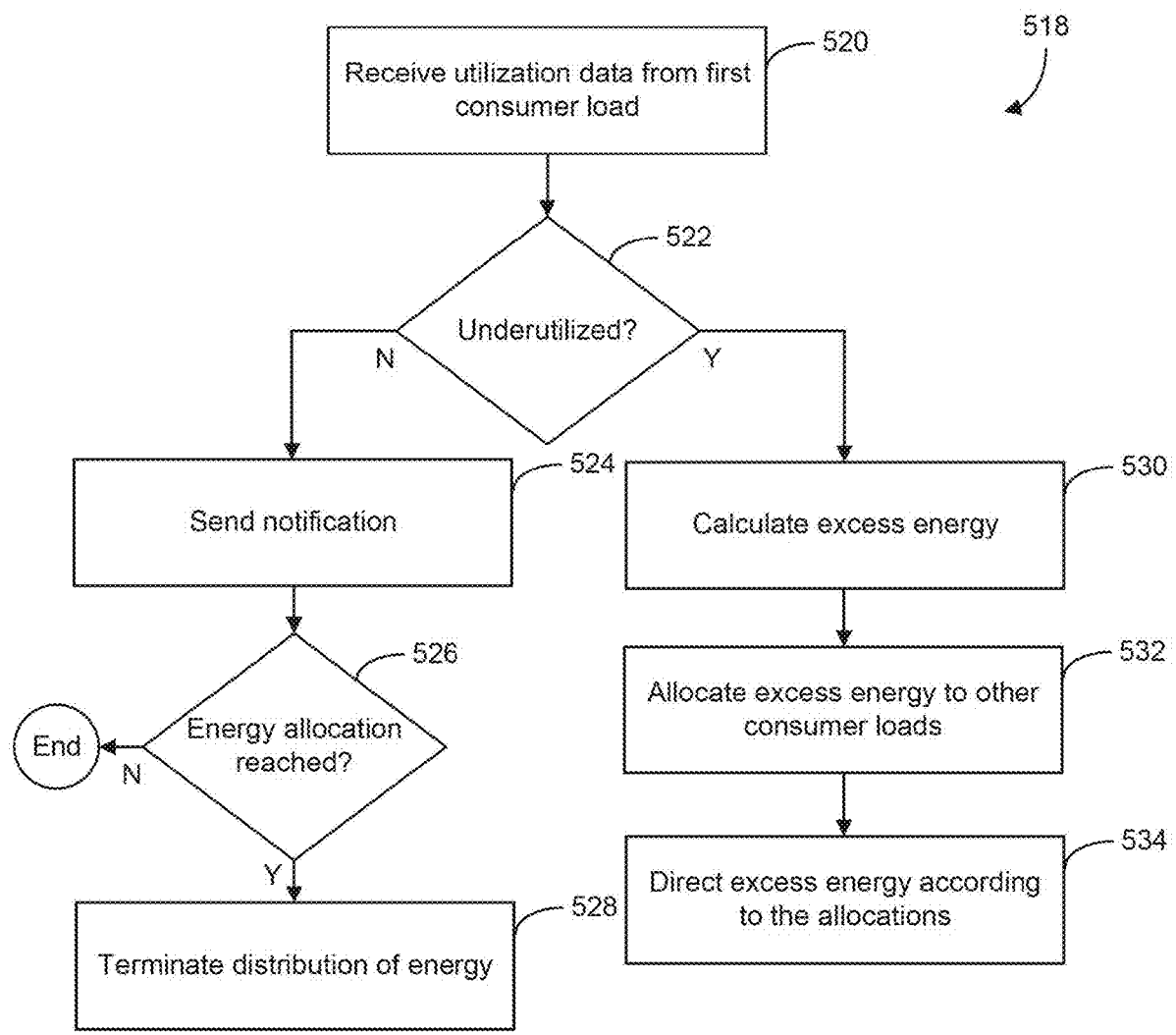
FIG. 5B illustrates another method for micro utility energy allocation, according to some embodiments.

FIG. 5B illustrates another method 518 for micro utility energy allocation, according to some embodiments. Method 518 can be performed by a data processing system (e.g., a controller, a computer of computer system 201, shown and described with reference to FIG. 2, one or both of the controllers 824 or 826, shown and described with reference to FIG. 8, etc.) (e.g., a data processing system of a micro utility). Method 518 may include more or fewer operations and the operations may be performed in any order. Performance of method 518 may enable the data processing system to manage energy allocation from a micro utility to different consumer loads in real-time based on data that the data processing system receives that indicates the energy usage at the different consumer loads. The data processing system may perform method 518 after performing method 500 and/or while directing energy to consumer loads in operation 516 of method 500.

At operation 520, the data processing system receives utilization data from the first consumer load. The data processing system may receive the utilization data from an energy meter (e.g., a smart meter) that is connected to the data processing system as well as the first consumer load and that monitors energy usage by the first consumer load. The utilization data may indicate how much energy the first consumer load has used throughout the time period. The data processing system may receive the energy utilization data and maintain a count of the amount of energy the first consumer load has used throughout the time period by incrementing the counter each instance the data processing system receives meter data indicating energy utilization data at the first consumer load. The data processing system may increment the counter by the amount of energy the meter detected the first consumer load used.

At operation 522, the data processing system determines if the first consumer load is underutilizing or overutilizing the energy that the data processing system directs to the first consumer load. The data processing system may determine the first consumer load is underutilizing or overutilizing the energy by comparing the current energy usage by the first consumer load to an expected energy usage by the first consumer load at a specified time within the time period according to an energy allocation schedule for the time period. For example, the data processing system may allocate 100 kWh to the first consumer load for the time period. Upon doing so, the data processing system may store indications of the amount of energy the first consumer load will consume at different times within the time period (e.g., 10 kWh one hour into the time period, 25 kWh three hours into the time period, and 100 kWh at the end of the time period). The data processing system may determine and store such expected amounts of energy based on historical energy usage (e.g., allocate an amount by a time that matches or is proportional to an amount of energy the first consumer load had previously used for that time or that the first consumer load uses on average for that time) and/or by evenly distributing the energy usage throughout the time period. The data processing system may retrieve the current energy usage for the first consumer load at a point in time and compare the retrieved current energy usage to the expected energy usage at the point in time. If the current energy usage is higher than the expected energy usage, the data processing system may determine the first consumer load is overutilizing energy that the data processing system directs to the first consumer load. However, if the data processing system determines the current energy usage is lower than the expected energy usage, the data processing system may determine the first consumer load is underutilizing energy that the data processing system directs to the first consumer load.

In some embodiments, the data processing system may determine whether the first consumer load will overutilize or underutilize energy based on an energy usage pattern by the first consumer load. The energy usage pattern may be the same as or similar to the energy allocation schedule described above. For example, the data processing system may store an energy usage pattern for the first consumer for a day (or any other time period). The energy usage pattern may be a schedule that indicates how much energy the first consumer is expected to use or have used by certain times throughout the day. The data processing system may direct energy to the first consumer load over the course of the day and monitor the energy utilization of the first consumer load throughout the day. The data processing system may compare the energy utilization to the expected amount of energy the first consumer load is expected to use at the different times during the day according to the stored energy usage pattern. In this way, the data processing system can determine if the first consumer load is overutilizing or underutilizing energy compared to the first consumer load's allocation.

Upon determining the first consumer load has utilized excess energy (e.g., determining the first consumer load has utilized energy above an expected amount for the current time based on the energy usage pattern or the energy allocation schedule), the data processing system may identify a time during the time period in which, if the first consumer load returns to energy utilization levels according to its "normal" energy usage pattern, the first consumer load would utilize an amount of energy to stay within the first consumer load's allocated amount of energy. The data processing system may do so, for example, by determining an overutilization rate of the first consumer load (which the data processing system may do by calculating the current energy overutilization compared to the energy usage pattern and dividing the current energy overutilization by the amount of time that has already passed of the time period). The data processing system may then predict the amount of energy the first consumer load is expected to utilize through future set time points of the time period by multiplying the overutilization rate by the expected energy usage for different time points of the time period to determine a predicted energy usage for each time point.

The data processing system may predict the energy usage by the first consumer load for the time point (e.g., total amount of energy the first consumer load utilized by the time point) that is the furthest from the current time and before the end of the time period. The data processing system may calculate a projected overall predicted energy usage of the time period if the consumer load returned to normal operation at the time point. The data processing system may do so by aggregating the normal energy usage of the first consumer load between the time point and the end of the time period according to the energy usage pattern with the predicted energy usage at the time point. The data processing system may compare the projected overall predicted energy usage with the allocated energy for the first consumer load. If the projected overall predicted energy usage is more than the allocated energy for the first consumer load, the data processing system may identify a time point immediately before the further time point on the energy usage pattern and repeat the process. The data processing system may repeat the process until identifying the latest time at which the first consumer load needs to revert to normal operation to remain below the allocated energy for the first consumer load.

Upon identifying a time, the data processing system may generate an alert. The alert may include the time by which the first consumer load needs to return to normal operation for the first consumer load to remain within its allocated amount of energy. The data processing system may transmit the alert to a device of a user associated with (e.g., located at) the first consumer load.

In some embodiments, the data processing system may adjust the energy usage pattern for the first consumer load for the time period based on outside factors, such as a predicted weather pattern. For instance, the data processing system may store coefficients for different types of weather (e.g., sunny, rainy, dark, cloudy, etc.). The data processing system may assign the coefficients to the expected energy usage of the first consumer load at different time points according to the predicted weather at the time points. For example, the energy usage pattern for the first consumer load may indicate that the first consumer load will use energy from 1 PM to 3 PM at a 1 kW rate. A predicted weather pattern for the time period may indicate that the weather will be rainy in the area from 1 PM to 3 PM. Accordingly, the data processing system may retrieve the coefficient from memory that is associated with rainy weather and multiply the coefficient by the "normal" energy utilization between 1 PM and 3 PM to obtain a new energy usage pattern for the time period. The data processing system may similarly assign coefficients to different time frames of the time period to adjust the expected energy of each of the time frames. In this way, the data processing system may account for outside factors to determine whether, and to what extent, the first consumer load will overutilize or underutilize energy during the time period.

In some cases, a consumer load's energy usage may be relatively unpredictable (e.g., sporadic). In these cases, the data processing system may track cumulative energy consumption during the time period and fit a curve (e.g., linear, polynomial, etc.) to the cumulative energy consumption. The data processing system may project whether the first energy load's usage will remain within the allocated amount of energy by calculating a sum of the amount of energy the first consumer load will utilize from the points on the curve. The data processing system may generate fitted curves at set times throughout the time period to monitor if the first consumer load is predicted to overutilize or underutilize energy during the time period (e.g., determine if the total amount of energy that the first consumer load is predicted to utilize for the time period at the end of the curve exceeds the allocation for the first consumer load at each of the set times). If at any of the set times the data processing system determines the total amount of energy exceeds the allocation for the time period for the first consumer load, the data processing system may determine the first consumer load is predicted to overutilize energy that the data processing system directs to the first consumer load.

Upon determining that the first consumer load is on track to exceed its allocation, at operation 524, the data processing system may transmit an alert indicating the overutilization to a device of a user that is associated with the first consumer load. In some embodiments, the data processing system may transmit the alert immediately upon determining the first consumer load is on track to exceed its allocation. In some embodiments, instead of immediately transmitting the alert, the data processing system may wait for a period of time to determine if the high usage is an anomaly and usage will revert to normal. The data processing system may continue monitoring the energy utilization of the first consumer load throughout a time frame within the time period using the methods described above. If the data processing system determines the first consumer load is still on track to overutilize energy directed to it by the data processing system at the end of the time frame, the data processing system may determine an expected amount of overutilization if the first consumer load's energy usage were to continue at the same rate (or the same trajectory in the case of a fitted curve). The data processing system may do so, for example, by multiplying the time left in the time period by the utilization rate to determine a remaining expected energy usage and adding the remaining expected energy usage to the current energy usage of the first consumer load during the time period.

In some embodiments, in addition to or instead of determining the expected amount of overutilization, the data processing system may determine a time that the first consumer load will utilize an aggregate amount of energy to reach the amount of energy that was allocated to the first consumer load. The data processing system may do so by subtracting the current energy usage for the time period from the first energy limit to obtain a remaining allocated energy. The data processing system may then divide the remaining allocated energy by the determined rate at which the first consumer load is utilizing energy to determine a remaining utilization time that the first consumer load has until it utilizes energy to the first energy limit. The data processing system may add the remaining utilization time to the current time to determine an overutilization time at which the first consumer load will use all of its allocated amount of energy.

The data processing system may generate an alert that includes an indication that the first consumer load is on track to overutilize the energy that the data processing system is directing to the first consumer load, an indication of the expected amount of overutilization of the first consumer load, and/or the overutilization time at which the first consumer load will reach the first energy limit. In some embodiments, the alert includes an indication (e.g., a string, an auditory indication, or a graphical indication) indicating to utilize less energy for a remainder of the time period. The data processing system may include the data for the alert in a body of a message and transmit the message to the device of the user that is associated with the first consumer load.

In another example, the data processing system may determine if the first consumer load is on track to underutilize or overutilize the energy that the data processing system directs to the first consumer load. For instance, the first consumer load might begin to use energy at a 2 kW rate during the mid-morning, when there are still 21 hours of the day remaining. Assuming the first consumer load has consumed 3 kWh in the earlier hours, the first consumer load would now be on track to consume 45 kWh during the course of the full day, well in excess of its allocation. The data processing system may use any method to determine if a consumer load has or is on track to overutilize or underutilize the energy that the data processing system directs to the consumer load.

At operation 526, the data processing system may determine if the energy allocation is reached. The data processing system may determine if the energy allocation is reached for the first consumer load at multiples times throughout the time period. The data processing system may do so by comparing the current energy usage of the first consumer load to the energy allocation at set intervals until the end of the time period. If the data processing system determines the first consumer load does not utilize enough energy to reach its energy allocation, the data processing system may end performance of method 518 or proceed to operation 530. However, if the data processing system determines the first consumer load utilizes enough energy to reach or exceed the energy allocation for the first consumer load, at operation 528, the data processing system may terminate distribution of energy to the first consumer load. The data processing system may do so by stopping directing energy to the first consumer load (e.g., control the micro utility to stop delivering energy to the first consumer load or disconnecting the first consumer load from the micro utility).

If at operation 522 the data processing system determines the first consumer load underutilizes energy compared to the amount of energy the data processing system allocated the first consumer load, at operation 530, the data processing system calculates an excess amount of energy. The data processing system may calculate the excess amount of energy by first determining an expected amount of energy that the first consumer load will utilize during the time period. The data processing system may do so using similar methods to those described above. The data processing system may then calculate the excess energy as the difference between the expected energy and the amount of energy the data processing system allocated to the first consumer load (e.g., subtract the expected amount of energy that the first consumer load will utilize from the allocated amount of energy).

In some embodiments, the data processing system may generate an alert that includes an indication that the first consumer load is on track to underutilize the energy that the data processing system is directing to the first consumer load, and/or an indication of the expected amount of underutilization (e.g., the excess amount of energy) of the first consumer load. The data processing system may include the data for the alert in a body of a message and transmit the message to the device of the user that is associated with the first consumer load.

At operation 532, the data processing system allocates the excess energy to other consumer loads to which the data processing system directs energy. The data processing system may allocate the excess energy by increasing the amounts of energy that the data processing system had previously allocated to the other consumer loads for the time period. The data processing system may allocate the excess energy using a few methods. In one method, the data processing system may implement a re-sharing mechanism based on a ratio of the excess energy to the energy allocation of another consumer load (e.g., the second consumer load). For example, the data processing system may allocate the excess energy to other consumer loads according to the equation:

((recipient consumer load's energy allocation for the time period)+(excess energy being allocated))/ (recipient consumer load's energy allocation for the time period).

This approach could be applied if, for example, a user associated with the first consumer load sold the excess energy to a user of another consumer load.

In another example, the data processing system may allocate the excess energy by dividing the excess energy between two or more users. In some cases, the data processing system may do so in proportion to each consumer load's energy allocation (e.g., increase the allocations of consumer loads with a high allocation by a larger amount than allocations of consumer loads with a low allocation). In some cases, the data processing system may do based on how much the users of the individual consumer loads wish to purchase.

In another example, in a situation in which multiple consumer loads were assigned different priorities, the energy allocation method may follow a priority-based energy allocation method similar to the initial energy allocation described above. In this example, the data processing system may not provide any of the excess energy to the consumer loads for which the data processing system allocated enough energy to reach the energy limit associated with the respective consumer loads. Instead, the data processing system may allocate the excess energy to the consumer loads for which the data processing system allocated less energy than the energy limits of the consumer loads similar to the above (e.g., identify and allocate the excess energy to the highest priority consumer load that was not allocated an energy load to its energy limit, identify and allocate remaining excess energy to the next highest priority consumer load, etc.).

At operation 534, the data processing system may direct the excess energy to the consumer loads according to their allocations. The data processing system may do so similar to how the data processing system directed energy to the consumer loads in operation 516, shown and described with reference to FIG. 5A, but with the updated allocations.

In some implementations, the data processing system may be configured to dynamically change the energy allocations to the consumer loads based on a change in expected weather (or any other reason for a change in energy generation) for the time period. For example, in some cases, the renewable energy sources of the micro utility may generate less energy than expected during the time period as a result of a change in weather (e.g., a sudden cloudy day when the data processing system forecast energy generation based on a sunny day). The data processing system may detect less energy is being generated by monitoring the renewable energy sources to determine if the renewable energy sources generated the amount of energy that was expected during the time period. At predefined points in time of the time period, the data processing system may compare the amount of energy that has been generated to the forecast amount for that point in time. If the data processing system determines less energy has been generated, the data processing system may reduce the energy allocations to the consumer loads in reverse order based on the priorities of the consumer loads.

For example, upon detecting less energy has been generated than forecast, the data processing system may determine how much less energy has been generated by comparing the total amount generated to the expected amount generated. The data processing system may determine a difference (or a deficiency) based on the comparison. The data processing system may identify the consumer load with the lowest priority that was allocated energy and lower the allocation by the determined difference. If lowering the allocation by the difference causes the allocation to be zero and there is allocated energy that still needs to be lowered (e.g., the difference was higher than the previously allocated energy for the consumer load), the data processing system may identify the next lowest priority consumer load that was allocated energy and lower the allocation by the remaining difference. The data processing may continue this process until the data processing system has accounted for the all of the difference between the amount of energy that was expected to be generated by the time point and the actual amount of energy that was generated. The data processing system may perform this process at each of the set points in time for which the renewable energy sources generate less energy than predicted throughout the time period, thus ensuring the highest prioritized consumer loads receive enough energy to operate.

The data processing system may similarly increase allocations of energy if the data processing system determines the renewable energy sources have generated more energy than expected by the different points in time. In doing so, the data processing system may determine an amount of extra energy the data processing system has generated by a point in time compared to the amount of energy that was expected to be generated by the point in time. The data processing system may then increase the energy allocations to the consumer loads according to their priorities beginning with the highest priority consumer load that was not allocated an amount of energy to its limit. The data processing system may do so using the systems and methods described herein until there is not any extra energy to allocate. The data processing system may perform this reallocation process for each point in time for which the renewable energy sources generate more energy than predicted. Thus, the data processing system can ensure all of the energy that the renewable energy sources generate is allocated.

Accordingly, by implementing the systems and methods described herein, a data processing system may control the energy output of a micro utility to power different consumer loads to make sure the consumer loads with the highest priority are powered despite variations in how much energy the renewable sources that energize the micro utility (in some cases as an island) can generate. An operator may customize the configuration of the data processing system to implement sets of rules to prioritize different consumer loads depending on the operator's preferences. Further, the data processing system may adjust energy distribution from the micro utility in real-time as the data processing system determines overutilization and underutilization at different consumer loads to account for unpredictable usage patterns at the consumer loads and/or unpredictable weather events.

In the above description, it is assumed that the energy generated by the RES, plus any energy that is available from the ESS, is available to be delivered to loads at any time. Some issues may arise based on this assumption. One, it is assumed that the ESS always has available capacity to store energy. Second, there are round-trip losses in the ESS: if the RES energy needs to be delivered to the load at a later time, it needs to be available from the ESS, and there will be energy lost in the round trip. Because the amount of energy that will go through the ESS may not be known in advance, this introduces some uncertainty in the amount of energy available. Third, if energy needs to be delivered in the short term, and exceeds the energy available from the ESS (and the amount of energy that will be generated by the RES in the short term), the system might be unable to deliver the energy when needed.

Various design techniques can be used to address the each of these issues. First, the ESS may be configured to store enough energy to provide energy to each consumer load and, additionally, to handle energy lost during the round-trip. Second, for computational purposes, it may be assumed that all of the energy that is generated by the RES will be stored in the ESS so the round-trip losses affect all generated energy. In practice, this may usually not be the case and this approach may be overly conservative. However, it is a design technique that could be used to make computations more efficient for the processor allocating energy. Third, a method can be used to minimize energy allocations to the various loads. The method may include: (1) forecasting the state of charge of the ESS through the forecast period (e.g., the time period); (2) identifying whether the ESS is forecast to reach a zero state of charge at any time; (3) determining when the ESS will again begin to charge; and (4) dividing the forecast period into two parts, with the separating time being the time determined at operation (3), and then running the energy allocation system for each of those parts separately (it may be necessary to iterate if the ESS would reach zero charge more than once). This should reduce energy allocations to the various loads, so that together they never exceed the energy available during each sub-period.

Portable Micro Utility

A problem micro utilities often face is that they are stationary and/or immobile. For example, a conventional micro utility may be constructed similar to any other energy power plant without a feasible method of moving such a micro utility. The lack of mobility may reduce the utility of micro utilities when power generation or consumption moves from one location to another. Additionally or alternatively, micro utilities may be needed on a temporary basis for people that occupy a fixed location and temporarily need power when there is a failure with the main electrical grid or another emergency. While stationary micro utilities can be built at each location, doing so may incur a substantial amount of labor and material costs. Further, managing each micro utility may require a significant amount of maintenance and personnel.

To overcome the aforementioned technical deficiencies, the systems and methods described herein provide for a portable micro utility system. The portable micro utility system may include a portable container, such as a shipping container, that can be moved between different locations without substantial set up or take down efforts or costs at any of the locations. The portable container may include rails coupled or affixed to walls of the portable container that are configured to support portable solar panel structures (e.g., support a stack of portable solar panel structures, such as in a manner analogous to trays in a baker's oven). Portable solar panel structures may be portable solar panel module structures. Portable solar panel structures may be removed from the portable container and set up outside in the sunlight to generate energy. The portable solar panel structures may direct the generated energy to one or more charging ports of the portable container. The charging ports can direct the energy to an ESS stored in the portable container. Loads can connect to discharging ports of the portable container to receive energy from the ESS. Upon completion of any event for which the micro utility was generating and providing energy to different loads, the portable solar panel structures may be loaded back onto the rails in the portable container and shipped to another location to repeat this process. In this way, the portable micro utility system may be mobile and non-stationary and may operate to generate and provide energy to loads at a variety of locations.

The portable solar panel structures may be configured to be mobile in addition to or instead of the portable container. For example, each portable solar panel structure may include a pair of wheels on one or both ends of the portable solar panel structure. The wheels may allow operators to move the portable solar panel structures after removal from the portable container. The wheels may be foldably coupled to the portable solar panel structures to reduce the vertical space the portable solar panel structures take up in storage inside of the portable container (e.g., the wheels can be folded inwards towards the portable solar panel structures when stored in the portable container and folded outwards upon removal from the portable container for transport to another location to generate energy). The portable solar panel structures may additionally be configured to have one or more solar panels on each of two halves of the portable solar panel structure. In some embodiments, the two halves may be connected at an angled configuration (e.g., an angle less than 180 degrees). The angle configuration may optimize or improve the amount of sunlight the solar panels on each half of the portable solar panel structure receive. The portable solar panel structure may include discharging ports that discharge energy. The portable solar panel structure may discharge energy to the charging ports of the portable container for storage in the ESS stored in the portable container.

Figure 6:
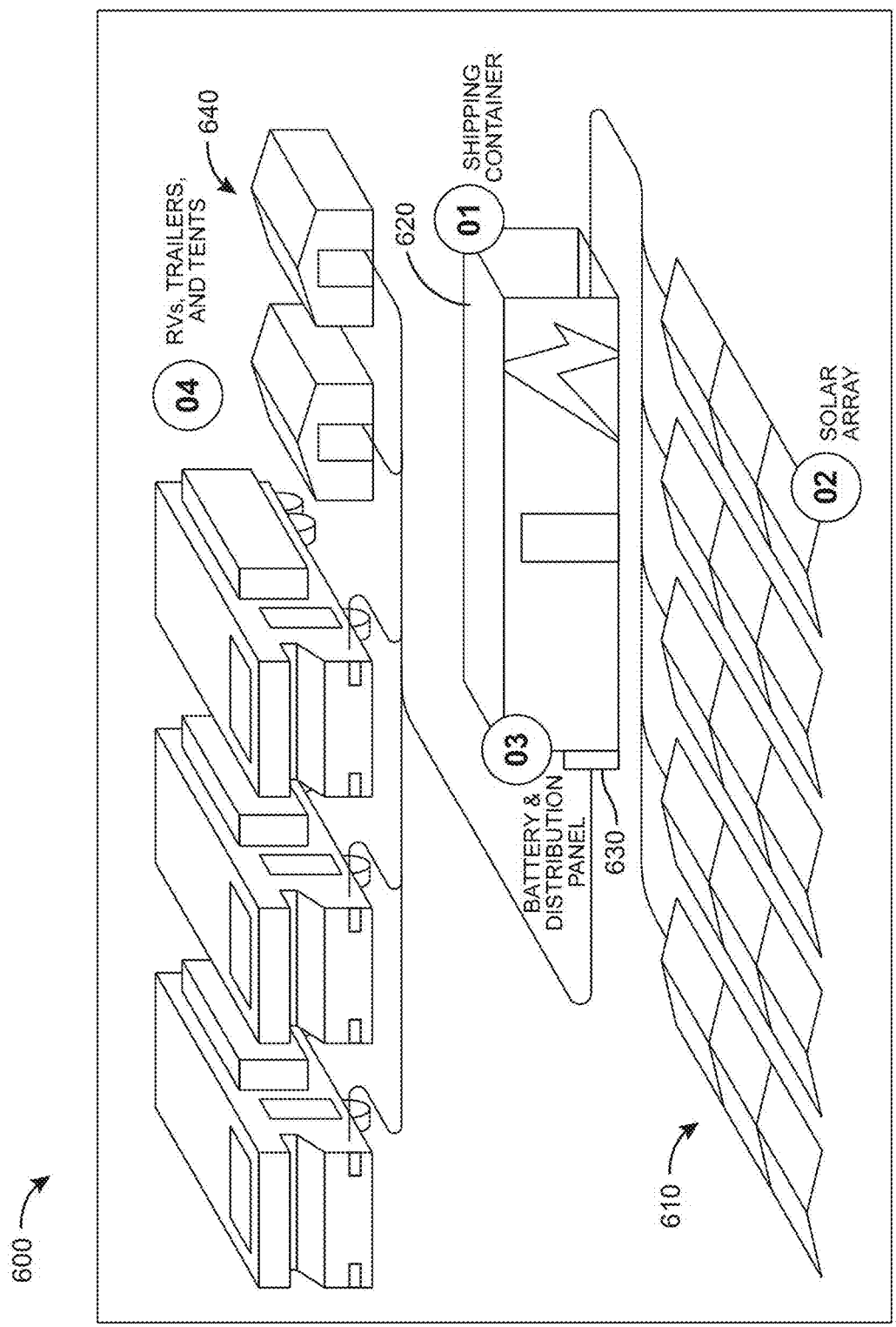
FIG. 6 illustrates a micro utility system, according to some embodiments.

FIG. 6 illustrates a micro utility system 600 having portable solar panel structures 610 configured to be removed from a portable container 620 and arranged to receive sunlight, according to some embodiments. The micro utility system 600 can be the same as or similar to the micro utility system shown and described with reference to FIGS. 1-5. The portable solar panel structures 610 can each have a "tent shape" designed to maximize exposure to sunlight at different times of the day. In an example embodiment, the portable solar panel structures 610 are connected to the portable container 620 by cables that carry electricity from the portable solar panel structures 610 to the portable container 620. The portable solar panel structures 610 may direct power to charging ports affixed to an external surface of the portable container 620 and/or affixed to an internal surface of the portable container 620. The portable container 620 can be configured to house batteries or storage systems (e.g., an ESS) 630 that store electrical power from the portable solar panel structures 610. The portable container 620 can also be configured with circuitry to deliver electrical power to devices or loads 640 connected to the portable container 620.

Figure 7:
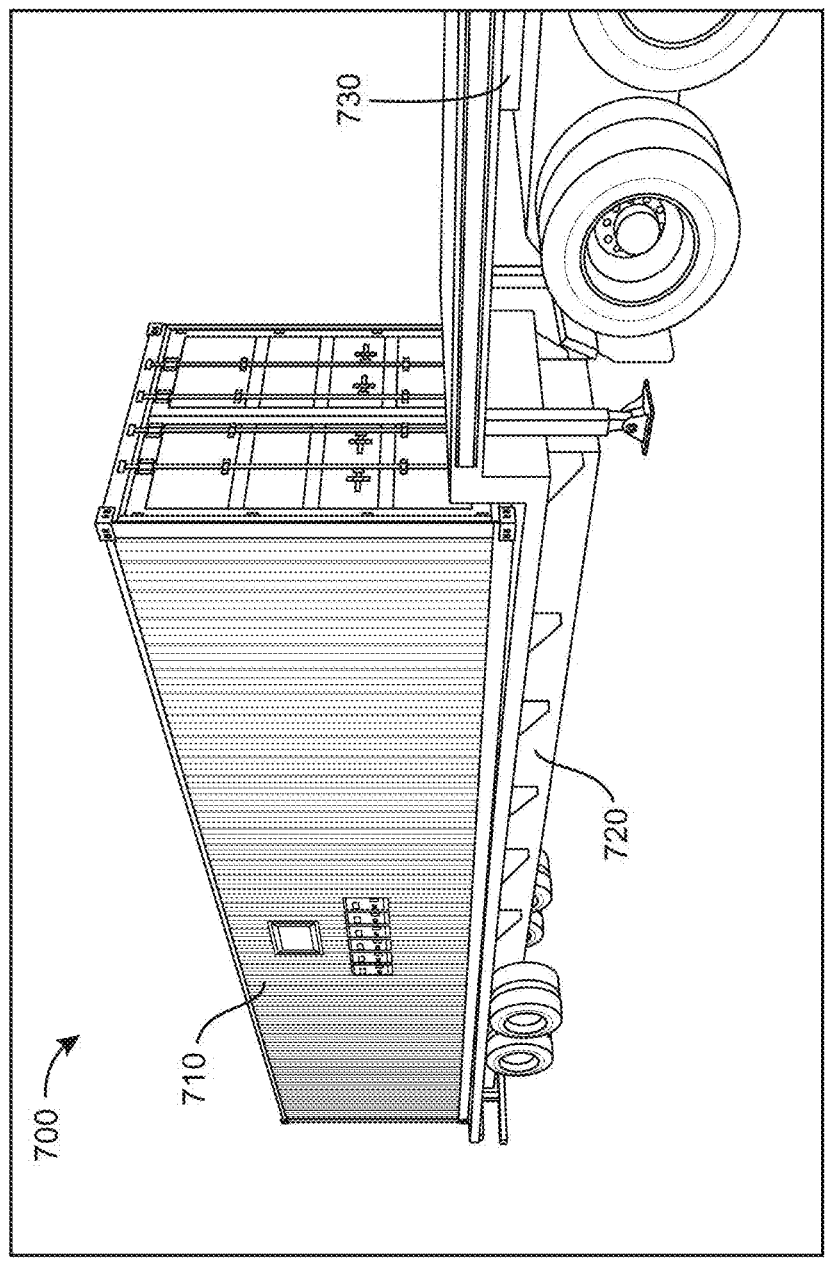
FIG. 7 illustrates a portable container of a micro utility system being transported on a bed of a truck, according to some embodiments.

FIG. 7 illustrates a micro utility system 700 including a portable container 710 supported by a bed 720 of a truck 730, according to some embodiments. The portable container 710 can be or include a shipping container (e.g., a container configured to be transported on ships or boats across the ocean and/or on truck beds). The portable container 710 can include four walls (e.g., two sides, a top, and a bottom) with a door at a proximal end and a door at a distal end. In some embodiments, the portable container 710 can include five walls (e.g., two sides, a top, a bottom, and a distal end) and a door at a proximal end. The walls and/or doors can each include a corrugated surface. The portable container 710 can comprise metal, wood, or fiberglass material that enables the portable container 710 to withstand pressure and bending or disfigurement during transport. A transportation company can lift the portable container 710 onto the bed 720 of the truck 730 such as by using a crane or another shipping container lifting system. In some embodiments, the portable container is coupled to wheels on the bottom of the portable container 710. In some embodiments, the portable container 710 is coupled with a connector configured for attachment to a vehicle. The connector may be coupled or affixed to the portable container 710 at a bottom edge of an end of the portable container 710. Because the portable container 710 can be a transportable shipping container, the portable container 710 can be transported to different locations to generate and provide power to loads in different areas.

For example, the portable container 710 can be shipped to a first location (e.g., a camping site) that includes multiple campers. At the first location, portable solar panel structures (e.g., the portable solar panel structures 610 of FIG. 6) can be removed from the portable container 710 and connected to an energy storage system of the portable container. The portable solar panel structures can generate electricity from solar energy and charge the energy storage system with the generated electricity. At the same location (e.g., without moving) or at a different location, an operator may connect one or more loads to the energy storage system of the portable container 710. For example, upon connection, the loads may receive power from the energy storage system of the portable container 710 and/or from the portable panel structures 610 that provide energy to the portable container 710. The energy storage system may discharge energy to the load. The portable container 710 may then be lifted onto a truck bed (e.g., the truck bed 720) while storing the portable solar panel structures and transported to a second location. At the second location, the portable solar panel structures can again be removed from the portable container 710 and connected to the energy storage system of the portable container 710. The portable solar panel structures can charge the energy storage system of the portable container at the second location. The operator may connect one or more loads at the second location or at a different location to the energy storage system of the portable container 710 to receive power from the energy storage system and/or the portable panel structures 610 connected to the portable container 710. The energy storage system may discharge energy to the one or more loads. In this way, the portable container 710 can operate as a portable micro utility that can generate, store, and discharge energy to different loads at different locations.

Figure 8A:
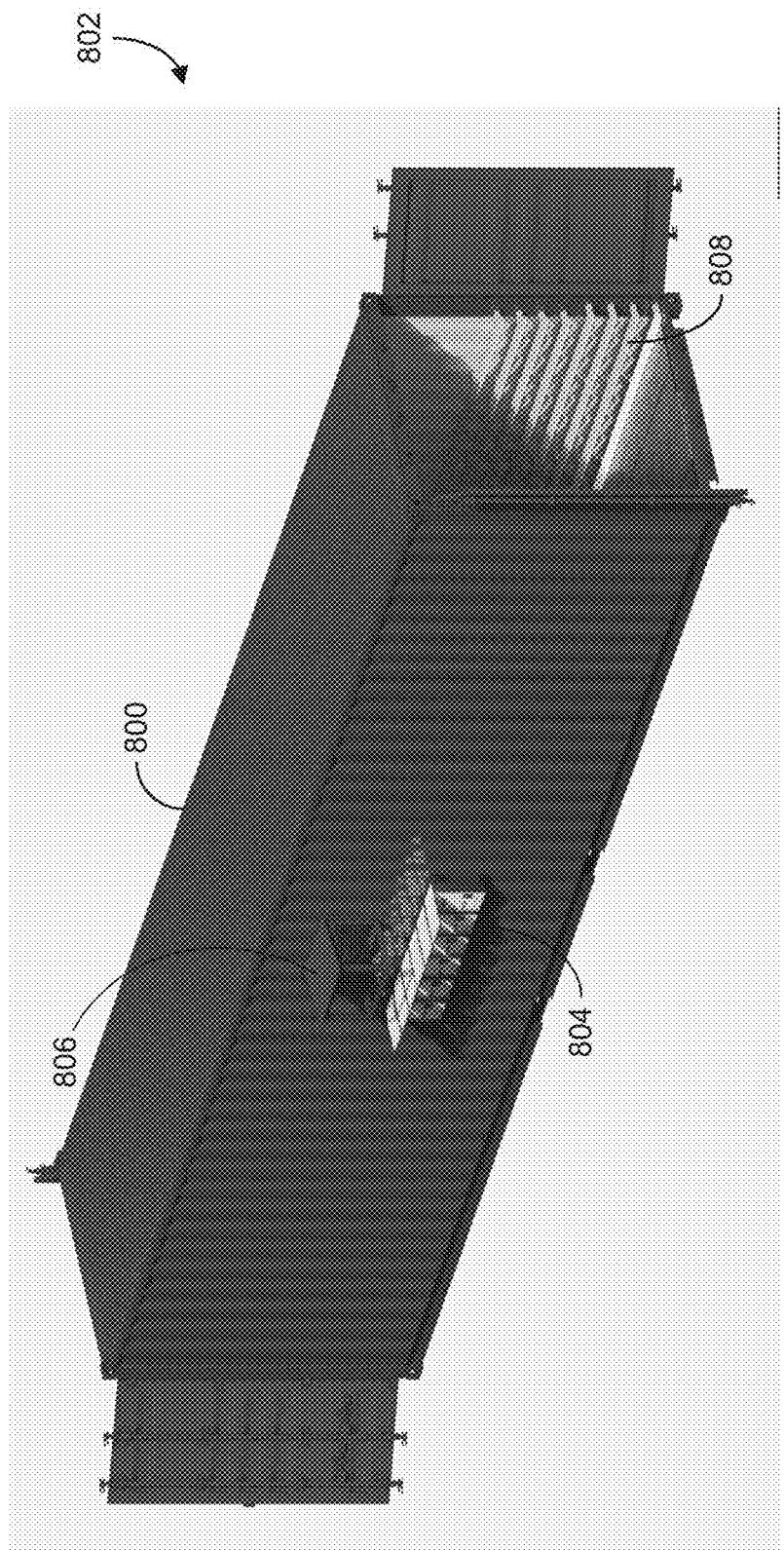
FIGS. 8A-8C illustrate views of a portable container of a micro utility system, according to some embodiments.
Figure 8B:
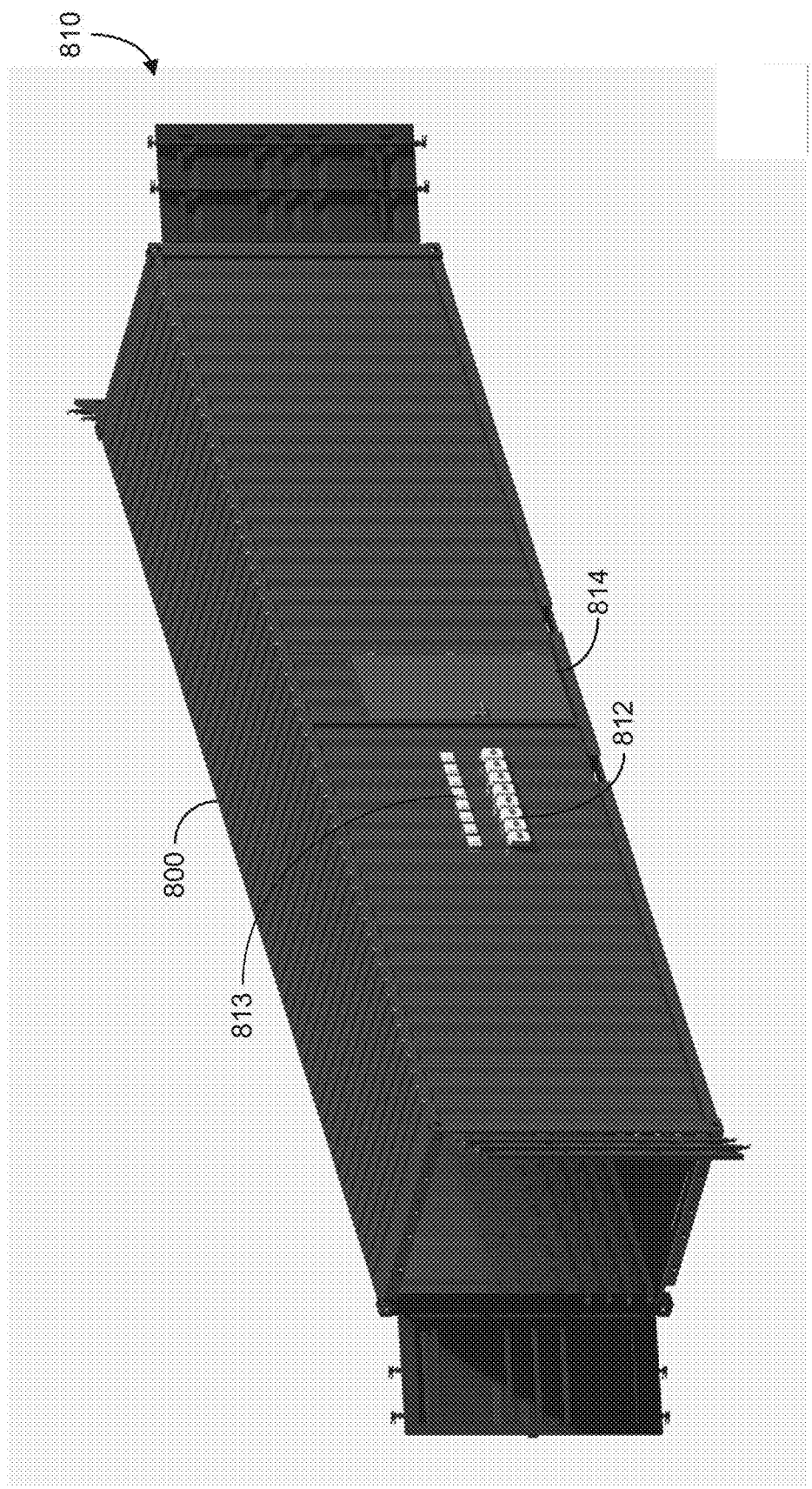
Figure 8C:
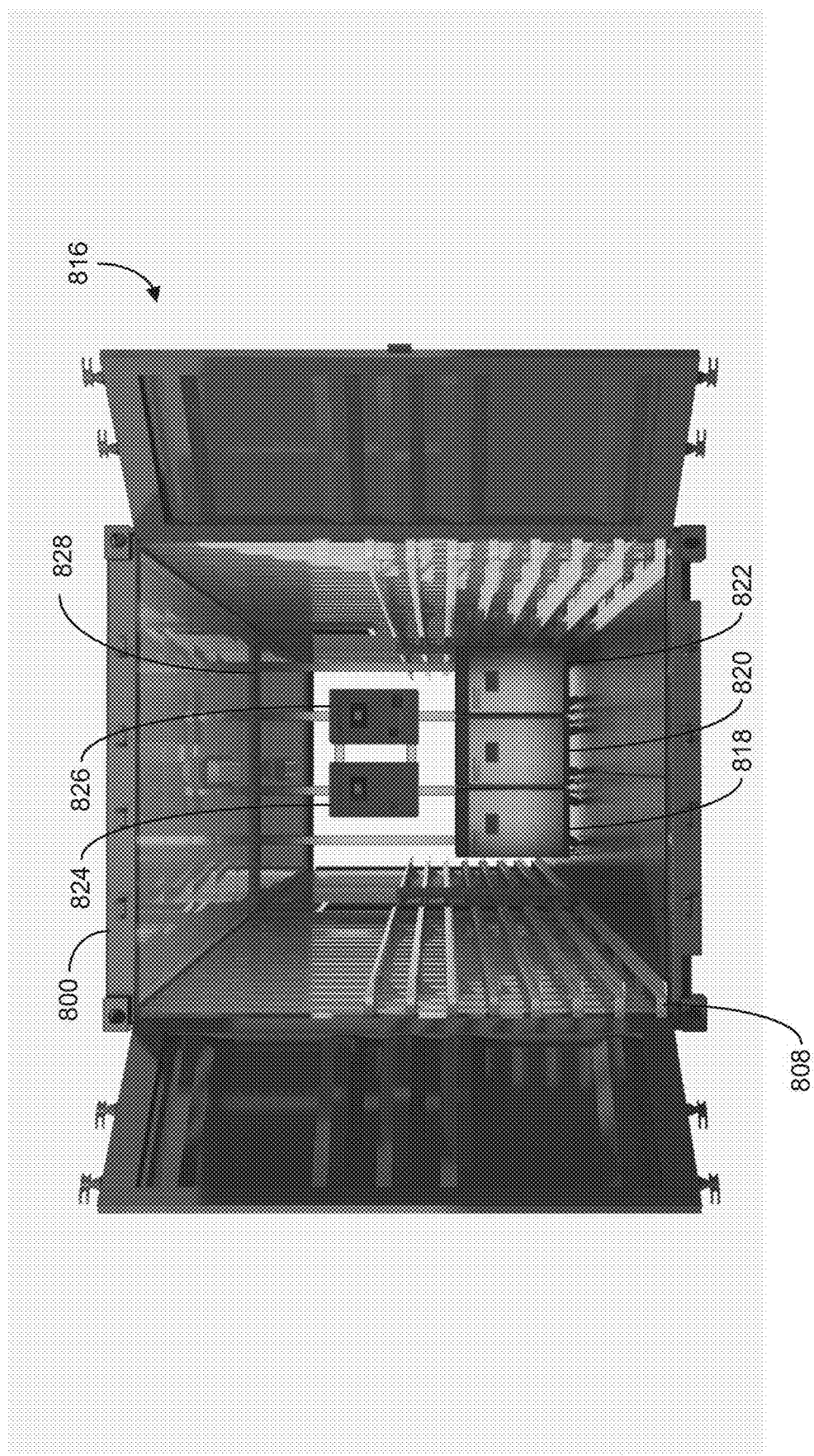

FIGS. 8A-8C illustrate views of a portable container 800 of a micro utility system (e.g., the micro utility system 600 of FIG. 6), according to some embodiments. The portable container 800 may be the same as or similar to the portable container 620 of FIG. 6. FIG. 8A illustrates a left perspective view 802 of the portable container 800. As illustrated in the left perspective view 802, the portable container 800 may include multiple discharging ports 804, an air conditioning cage 806, and a plurality of sets of rails 808. The discharging ports 804 may be located (e.g., affixed to or embedded in) at an external surface of a wall of the portable container 800. The discharging ports 804 may be connected or coupled to an ESS located inside the portable container 800 via one or more cables. In some embodiments, the discharging ports 804 may be connected or coupled to an energy grid within the portable container 800 that includes one or more wires or cords connecting the ESS to the discharging ports 804 and/or charging ports 812 and/or the discharging ports 804 to the charging ports 812. The discharging ports 804 can be connected or coupled to one or more loads via one or more cables (e.g., different cables from the cables that connect the discharging ports 804 to the ESS or the energy grid within the portable container 800). A processor of a controller may control the ESS to discharge energy to the discharging ports 804 and then to the loads connected or coupled to the discharging ports 804. Accordingly, via the discharging ports 804, the portable container 800 and the ESS located in the portable container 800 can power or discharge energy to one or multiple loads.

The air conditioning cage 806 may be affixed to or abut from the portable container 800. The air conditioning cage 806 may house an air conditioning unit. The air conditioning unit may be configured to cool, control, or otherwise maintain the temperature of the ESS within the portable container 800. The air conditioning cage 806 may be located at a position above or vertically adjacent to the discharging ports 804. The air conditioning cage 806 may include a frame that supports the air conditioning unit. The frame can facilitate the air conditioning unit receiving air from the environment outside of the portable container 800, cooling the air, and sending the cooled air into the portable container 800. By controlling the temperature of the portable container 800, the air conditioning unit can minimize any inefficiencies or energy loss in energy storage or energy transfer to and/or from the ESS inside the portable container 800.

The rails 808 may be located and/or affixed to interior surfaces of opposing walls of the portable container 800. The rails 808 may be or include shelves that are affixed to the opposing walls with flat surfaces extending towards the walls opposite the walls of the portable container 800 on which the rails 808 are affixed. The rails 808 may be affixed to the walls in sets (e.g., pairs) such that one rail of the set is affixed to one wall of the portable container 800 and another rail of the set is affixed to the opposite or opposing wall of the portable container 800 at the same or substantially the same vertical location of the opposing wall (e.g., sets of rails may be level with each other on the interior surfaces of walls of the portable container 800 that are opposite from each other). The rails 808 may be affixed to the interior faces of the portable container 800 as cantilevers such that individual solar panel structures may rest or be otherwise supported by different sets of the rails 808. In some embodiments, the rails 808 may each include cushioning (e.g., shock cushioning) on a top surface of the rails 808. Additionally, or alternatively, the cushioning may be under the rails 808 and/or between the rails 808 and the attachments attaching the rails 808 to walls of the portable container 800. The cushioning may reduce the stress placed on portable solar panel structures during transport, reducing breaking and/or micro-cracks that may occur in the portable solar panel structures during transport. A lubricant (e.g., a dry graphite lubricant) may be spread onto the rails 808 to increase the ability to slide portable solar panel structures onto the rails 808.

The portable container 800 can be a dual-sided loading container in which each side can open and close. Accordingly, solar panel structures can be loaded into the portable container 800 from both sides of the portable container 800.

FIG. 8B illustrates a right perspective view 810 of the portable container 800, according to some embodiments. As illustrated in the right perspective view 810, the portable container 800 may include multiple charging ports 812 and a door 814. The charging ports 812 and the door 814 may be located (e.g., affixed to or embedded in) at an exterior surface of a wall (e.g., a wall opposite or opposing the wall to which the discharging ports 804 of the portable container 800 are located). The charging ports 812 may be located (e.g., affixed to or embedded in) at an exterior surface (e.g., face) of a wall of the portable container 800. The charging ports 812 may be configured to electrically connect to portable solar panel structures via cables. For example, a plurality of portable solar panel structures may be removed from the portable container 800 and placed across the ground facing the sky (e.g., in view of the sun). The portable solar panel structures may receive sunlight and convert the sunlight into electricity. The portable solar panel structures may direct the electricity to the charging ports 812 via cables that electrically connect or couple the portable solar panel structures with the charging ports 812 of the portable container 800. Cables located inside the portable container 800 may be connected to the charging ports 812 and an ESS inside the portable container 800. The energy the charging ports 812 receive from the portable solar panel structures may travel across the cables located inside the portable container 800 to the ESS. Accordingly, the solar panels of the portable solar panel structures may charge the ESS through the charging ports 812.

The charging ports 812 can be or include disconnects. The disconnects can be switches that can stop or otherwise interrupt the flow of current from solar panels to the ESS in the portable container 800. The charging ports 812 can connect to the ESS within the portable container 800 through transition plates 813. The transition plates 813 may cover holes in the portable container 800 that facilitate wiring from the charging ports 812 entering the portable container 800. Cables connected to the charging ports 812 can travel through the transition plates 813 to enter the portable container 800 and connect to the ESS within the portable container.

The door 814 may enable individuals or operators to enter and/or leave the portable container 800. The door 814 may do so to facilitate loading portable solar panel structures into the portable container 800. For example, when loading a portable solar panel structure into the portable container 800, a user may enter the portable container 800 through the door 814 and lift the portable solar panel structure onto one of the sets of rails 808 to guide the portable solar panel structure onto the set of rails 808.

FIG. 8C illustrates a front view 816 of the portable container 800, according to some embodiments. As illustrated in the front view 816, the portable container 800 may include the rails 808, an ESS including ESS units 818, 820, and 822, controllers 824 and 826, and a frame 828. The ESS units 818, 820, and 822 may be individual energy storage containers (e.g., batteries or battery cells). The ESS units 818, 820, and 822 can be coupled to the charging ports 812 of the portable container 800 by cables such that the ESS units 818, 820, and 822 can be charged by portable solar panel structures coupled to the charging ports 812 that are generating energy from light or the sun. The ESS units 818, 820, and 822 can additionally be coupled to the discharging ports 804 of the portable container 800 through cables such that the ESS units 818, 820, and 822 can discharge energy to loads connected to the discharging ports 804.

The ESS units 818, 820, and 822 may include wheels coupled to a bottom surface of the ESS units 818, 820, and 822. The wheels may enable operators to easily move the ESS units 818, 820, and 822 into and out of the portable container 800. The ESS units 818, 820, and 822 may be heavy, so the wheels make the ESS units 818, 820, and 822 more portable. Upon being placed in the portable container 800, legs located at corners of the ESS units 818, 820, and 822 may extend and contact the bottom of the portable container 800. In doing so, the legs may lift the ESS units 818, 820, and 822 such that the wheels are lifted off of the ground and are no longer in direct contact with the portable container 800. In some embodiments, fixtures (e.g., screw, nails, brackets, etc.) may couple the ESS units 818, 820, and 822 to the frame 828 to mount the ESS units 818, 820, and 822 to the frame 828. The wheels may or may not contact the bottom of the portable container when the ESS units 818, 820, and 822 are mounted to the frame 828. Accordingly, the ESS units 818, 820, and 822 may remain stationary relative to the portable container 800 during transport.

In some embodiments, the portable container 800 can include switches between the ESS units 818, 820, and 822 and the discharging ports 804. The switches can control whether or not the discharging ports 804 can discharge energy to loads. Each of the switches can correspond to a different individual discharging port 804. The switches can override any control signals a controller of the portable container 800 sends to discharge energy to a load. For example, the controller may control the ESS of the portable container 800 to discharge energy through discharging port A of the discharging ports 804 to a load. Upon doing so, one or more of the ESS units 818, 820, and 822 may begin discharging energy through the discharging port A to the load. While discharging energy through the discharging port A, an operator may flip (e.g., manually flip, remotely flip via a command transmitted across a network, or automatically flip) a switch of the switches that corresponds to the discharging port A. Doing so may open the circuit and stop the discharge of energy to the load. Operators may similarly control each of the discharging ports 804 to enable or disable discharging energy through the discharging ports 804. Thus, operators may have manual, remote, or automated override capabilities when discharging energy to various loads.

The controllers 824 and 826 can be connected and/or otherwise control the ESS units 818, 820, and 822. The controllers 824 and 826 may each include a processor and be the same as or similar to the data processing system described with reference to FIGS. 5A and 5B. The controllers 824 and 826 can control how much energy to charge or discharge from the ESS units 818, 820, and 822. The controllers 824 and 826 can do so, for example, by allocating amounts of energy to discharge to different loads based on energy forecasts by implementing the systems and methods described herein.

In some embodiments, the controller 824 controls the controller 826 (e.g., in a parent-child relationship). For example, the controller 824 may store a state of charge schedule for the ESS units 818, 820, and 822. The controller 824 may communicate with one or more of the ESS units 818, 820, and 822 to cause the ESS units 818, 820, and 822 to charge and/or discharge according to the charge or discharge schedule. For any of the ESS units 818, 820, or 822 that the controller 824 does not control (e.g., does not directly control), the controller 824 may control the controller 826 to cause the controller 826 to control such ESS units 818, 820, or 822 to charge or discharge according to the charging/discharging schedule.

The controllers 824 and 826 can each be or include inverters. The controllers 824 and 826 can be electrically connected to the ESS units 818, 820, or 822 and the charging ports 812. The controllers 824 and 826 can receive AC power from the charging ports 812 (e.g., AC power generated by solar panels) and convert the AC power into DC power via the inverters. The controllers 824 and 826 can then direct the converted DC power to the ESS units 818, 820, or 822 for storage.

The frame 828 may be a configuration of structural elements (e.g., pipes, I-beams, angles, etc.). The structure elements may have spaces between them that facilitate airflow throughout the portable container 800, thus facilitating temperature control of the ESS units 818, 820, and 822. The frame 828 may additionally be off-center within the portable container such that there is space on the side of the portable container 800 that includes the door 814 to facilitate entry. The controllers 824 and 826 and/or the ESS units 818, 820, and 822 can be coupled or affixed to the frame 828. The controllers 824 and 826 and/or the ESS units 818, 820, and 822 can be coupled or affixed to the frame 828 by a fastening mechanism such as a screw or a nail. By doing so, the controllers 824 and 826 and/or the ESS units 818, 820, and 822 can be transported to different locations with or while inside the portable container 800 without being jostled around, thus enabling faster set up and system integrity.

The frame 828 may divide the portable container 800 in half and/or into two portions such that the rails 808 can be on both sides of the portable container 800. The rails 808 can be in the same configuration on both sides of the portable container 800, thus enabling solar panel structures to be stored and removed from separate rails on opposite sides of the frame 828 within the portable container 800. Dividing the contents of the portable container 800 in half in this manner can reduce the weight that is placed on any one rail (e.g., the division can reduce the number of solar panels that the rails 808 individually support) and can facilitate storage and provide a space for ESS units and controllers within the portable container 800.

Figure 9A:
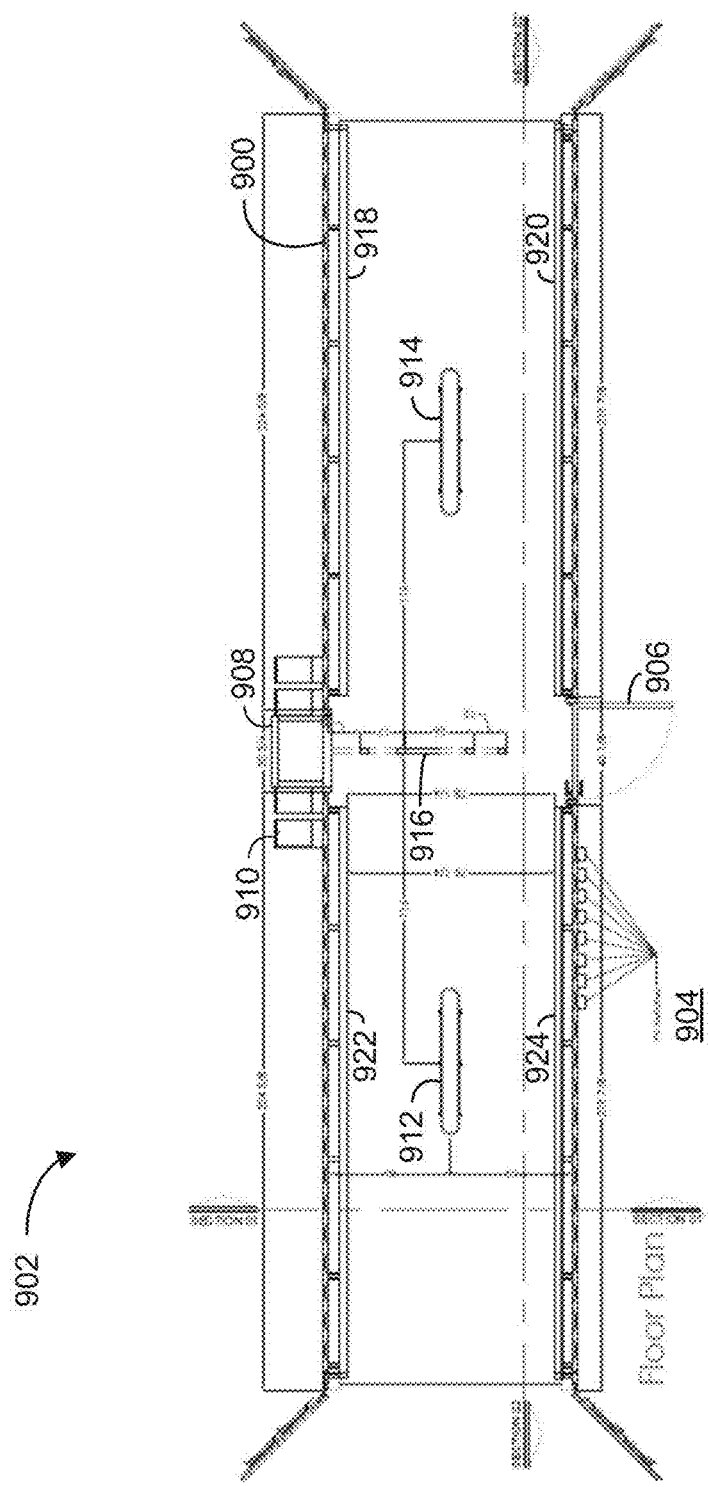
FIGS. 9A-9L illustrate views of a portable container of a micro utility system, according to some embodiments.

FIGS. 9A-9L illustrate views of a portable container 900 of a micro utility system (e.g., the micro utility system 600 of FIG. 6), according to some embodiments. The portable container 900 may be the same as or similar to the portable container 620 of FIG. 6. FIG. 9A illustrates a plan view 902 of the portable container 900. As illustrated in the plan view 902, the portable container 900 may include multiple charging ports 904 (e.g., photovoltaic (PV) switches), a door 906, an air conditioning cage 908, discharging ports 910, lights 912 and 914, a frame 916 (e.g., a divider frame), and rails 918, 920, 922, and 924. The lights 912 and 914 may facilitate loading and unloading of portable solar panel structures from the portable container 900 in the dark or at night. The portable container 900 may be configured to store portable solar panel structures such that ends of the portable solar panel structures rest or are otherwise supported by sets of the rails 918, 920, 922, and 924. The lights 912 and 914 may be powered by an ESS stored in the portable container 900.

Figure 9B:
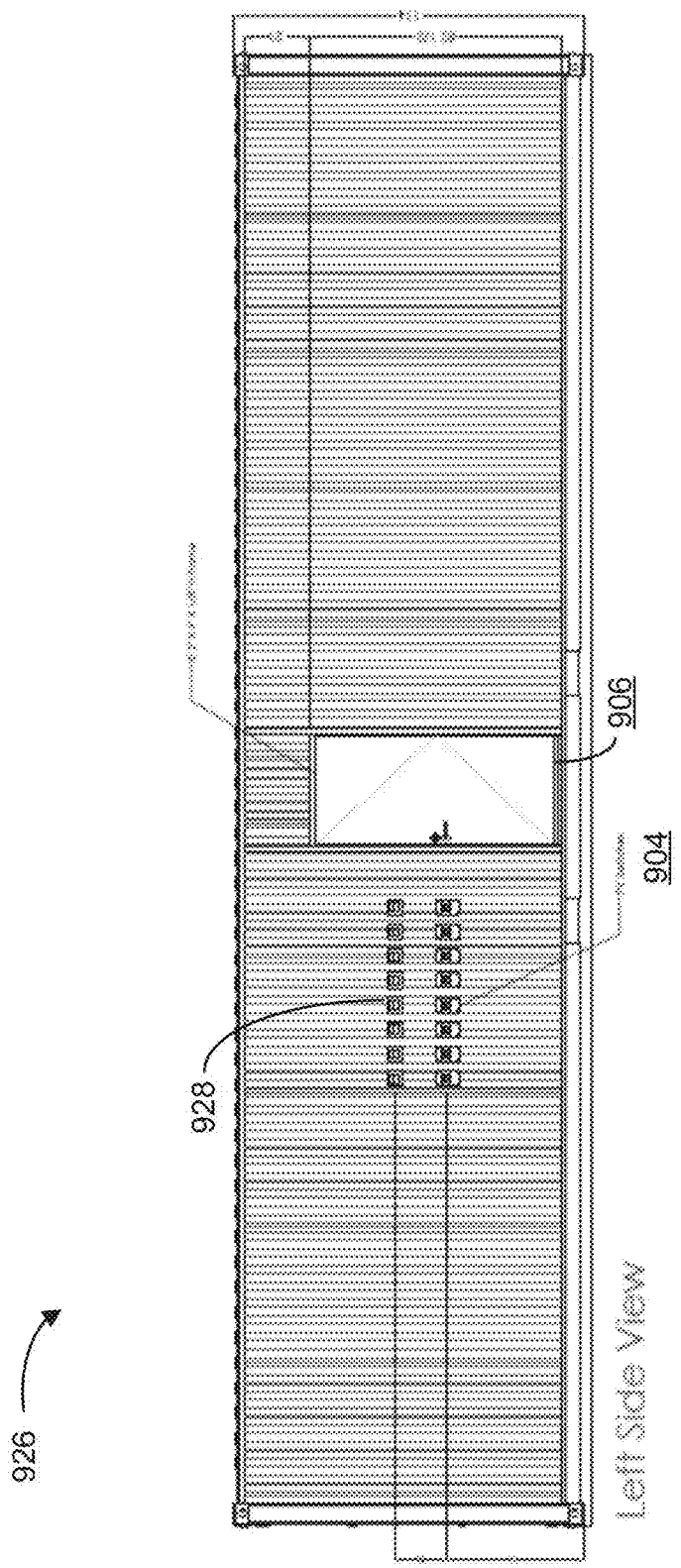

FIG. 9B illustrates a left side view 926 of the portable container 900, according to some embodiments. As illustrated in the side view 926, the portable container 900 may include the charging ports 904, the door 906, and transition plates 928. Portable solar panel structures can be electrically connected to the charging ports 904 via cables. The charging ports 904 can electrically connect to an ESS within the portable container 900 through the transition plates 928.

Figure 9C:
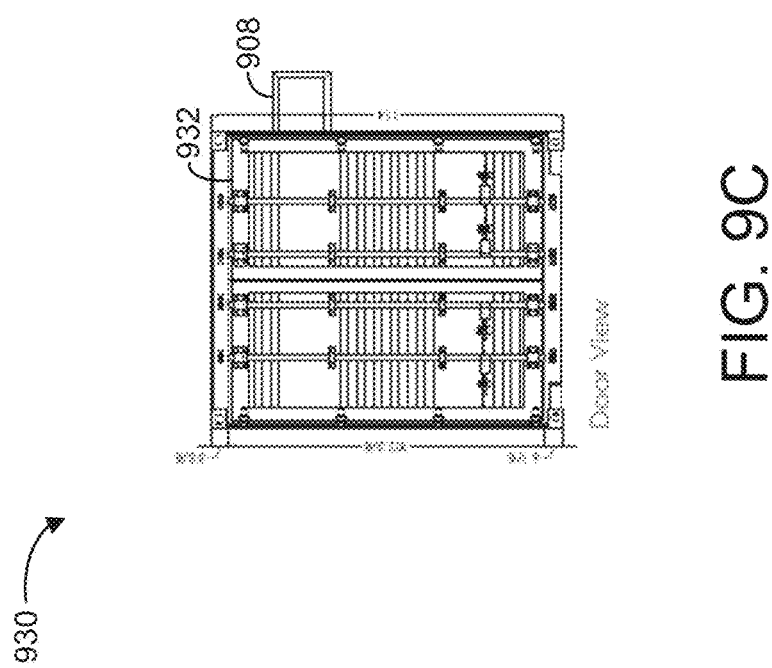

FIG. 9C illustrates a front view 930 of the portable container 900, according to some embodiments. As illustrated in the front view 930, the portable container 900 may include the air conditioning cage 908 and a door 932. The door 932 may open to facilitate loading portable solar panel structures into the portable container 900.

Figure 9D:
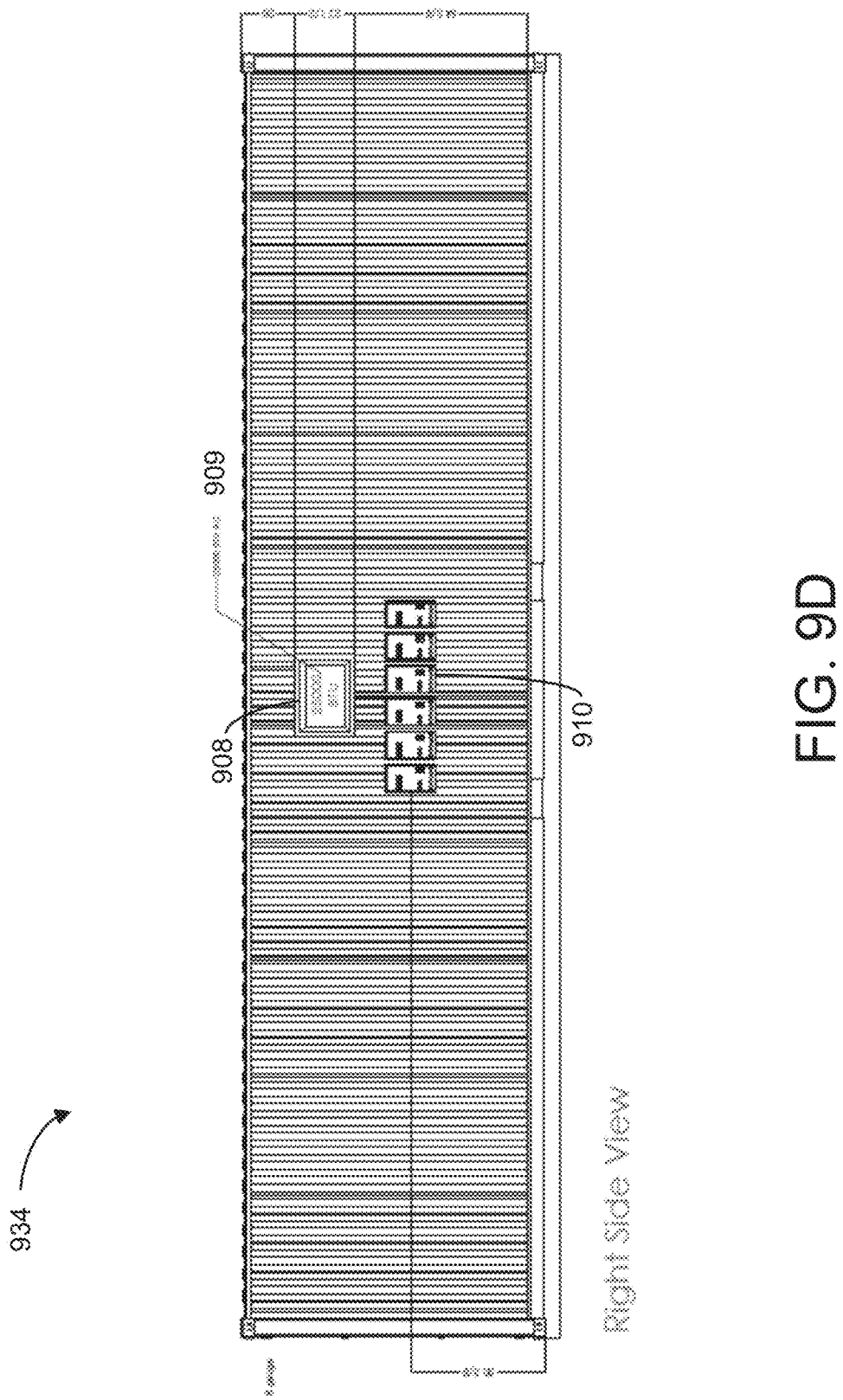

FIG. 9D illustrates a right side view 934 of the portable container 900, according to some embodiments. As illustrated in the side view 934, the portable container 900 may include the air conditioning cage 908 and the discharging ports 910. The discharging ports 910 may be electrically connected to the ESS within the portable container 900. The discharging ports 910 may each include one or more outlets rated for different voltages and/or currents. For example, one or more of the discharging ports 910 may each include a 50 A outlet, a 30 A outlet, and a 20 A outlet. The discharging ports 910 may additionally include discharging ports rated for charging smaller devices, such as cellular phones or laptops. Depending on the specifications for the loads, different loads may connect to the discharging ports 910. A controller (e.g., the controller 824 or the controller 826) may control the ESS storing energy in the portable container 900 to discharge the energy to the loads connected to the discharging ports 910. The air conditioning cage 908 may be located in the middle or substantially the middle of the portable container 900 near the ESS such that an air conditioning unit 909 (e.g., an air conditioning unit having a 25000 BTU rating) supported by the air conditioning cage 908 can blow air onto the ESS. The discharging ports 910 may be covered by weatherproof material (e.g., rubber) to avoid any dripping from the overhead air conditioning and/or any other weather elements affecting the discharging ports 910.

The air conditioning unit 909 may attach to any surface of the portable container 900. For example, the air conditioning unit 909 may be mounted to an external surface of the roof and blow air into the portable container 900 from the roof. The air conditioning unit 909 may be mounted to an interior surface (e.g., an interior surface of the wall, floor, or roof) of the portable container 900 with a vent to the outside. This would enable the portable container 900 to be shipped next to other containers in a conventional stacking arrangement. The air conditioning unit 909 mounting might change depending on the state of the portable container 900. For example, the air conditioning unit 909 may be mounted on a movable mount so that during transportation the air conditioning unit 909 is internal to the portable container 900 (e.g., attached to an internal surface of the portable container 900), thus enabling container stacking. During use, some or all of the air conditioning unit 909 may be attached or mounted to an external surface of the portable container 900, thus improving the efficiency of heat exchange with the outside air. The air conditioning unit 909 may be mounted near the ESS because the ESS may provide power to the air conditioning unit 909. In some embodiments, the air conditioning unit 909 may be mounted near the discharging ports 910 because the air conditioning unit 909 may connect to a discharging port 910 and receive power from the ESS through the discharging port 910.

The charging ports 904 and the discharging ports 910 may be located on, affixed to, or embedded in exterior faces of opposing walls of the portable container 900. Doing so may reduce the amount of wiring that is ever in an area in front of a single wall of the portable container 900. For example, the charging ports 904 may be on an exterior face of one wall of the portable container 900 such that portable solar panel structures may be placed in front of the exterior face to receive energy and direct energy to the charging ports 904. Recreational vehicles (RVs) or trailers may be in front of an exterior face of the opposite wall of the portable container 900. The cords to the charging ports 904 and the discharging ports 910 may not overlap in this configuration. In some embodiments, the charging ports 904 and the discharging ports 910 may be recessed inside the portable container 900. Such may be beneficial for shipping by train or by sea. In some embodiments, the charging ports 904 and the discharging ports 910 can be located at the same or a common exterior surface of the portable container 900.

In some embodiments, the charging ports 904 and the discharging ports 910 may be directly coupled with each other (e.g., cords may run directly from the charging ports 904 to the discharging ports 910). In such embodiments, the portable solar panel structures may directly provide power to loads without directing power to any ESS within the portable container 900. In some cases, an inverter (e.g., a controller located within the portable container 900) may be between the charging ports 904 and the discharging ports 910 to convert AC power the portable solar panel structures generate to DC power. In some cases, such an inverter may be between the discharging ports 910 and the loads.

Figure 9E:
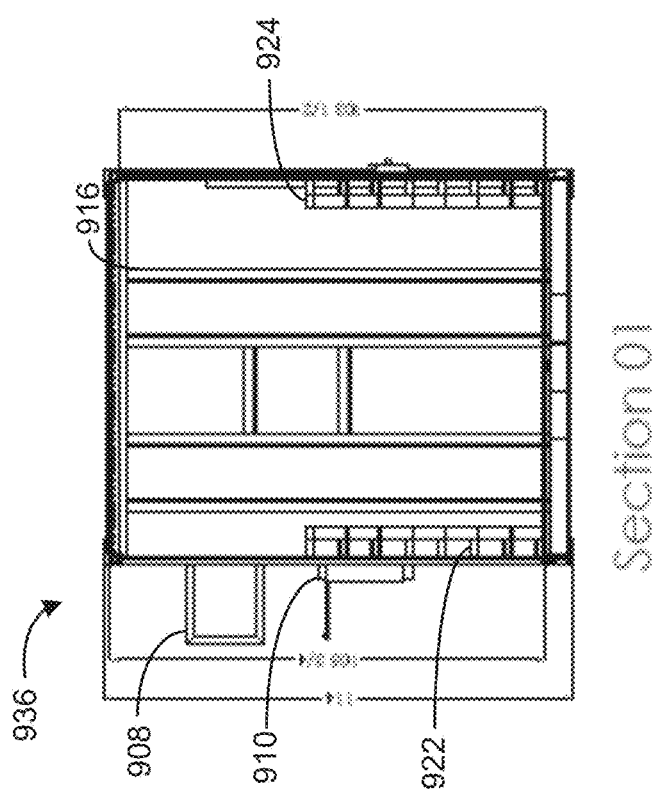

FIG. 9E illustrates a front cross-sectional view 936 of the portable container 900, according to some embodiments. As illustrated in the front cross-sectional view 936, the portable container 900 can include the air conditioning cage 908, the discharging ports 910, the frame 916, and the rails 922 and 924.

Figure 9F:
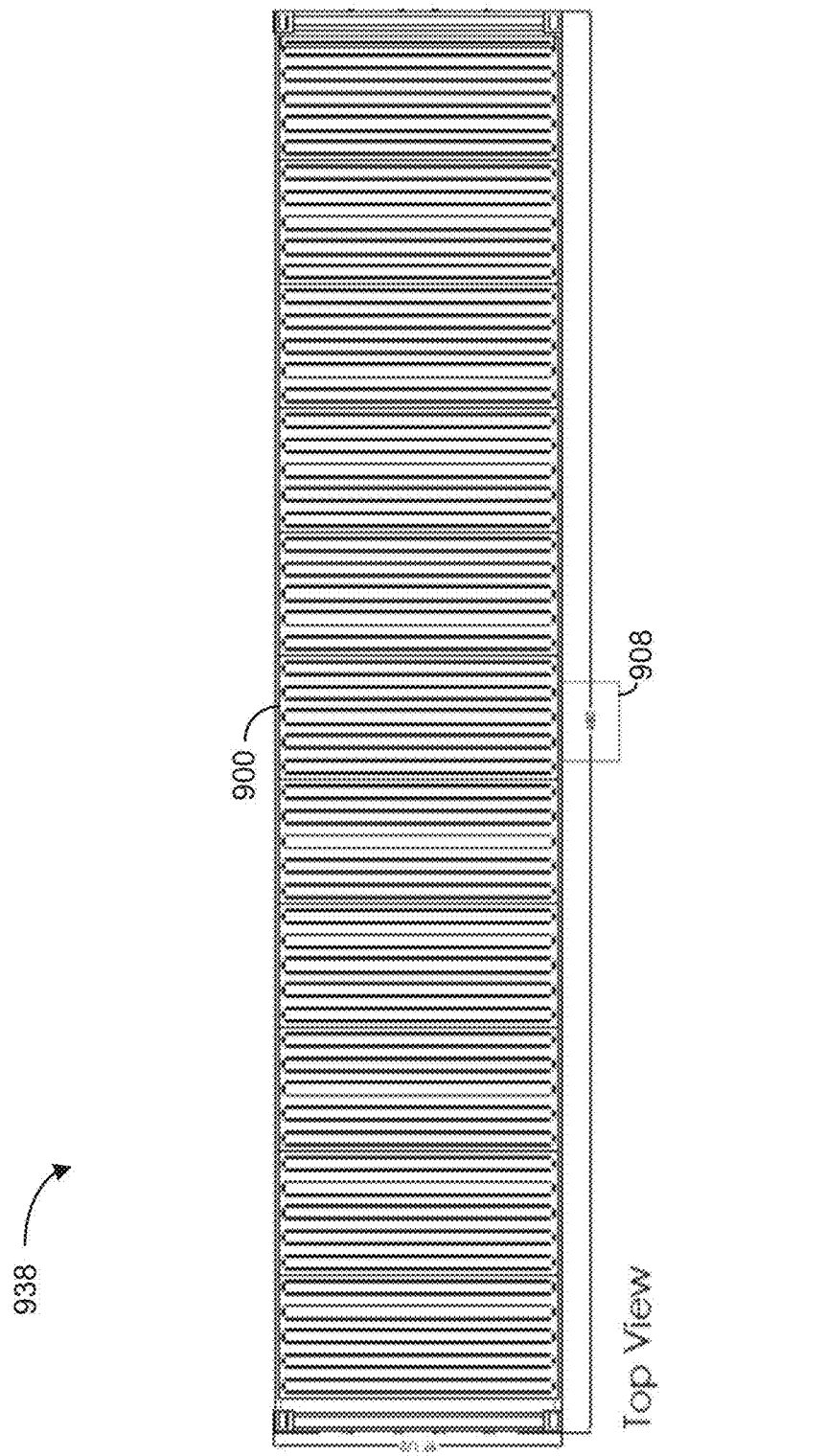

FIG. 9F illustrates a top view 938 of the portable container 900, according to some embodiments. As illustrated in the top view 938, the portable container 900 can include the air conditioning cage 908.

Figure 9G:
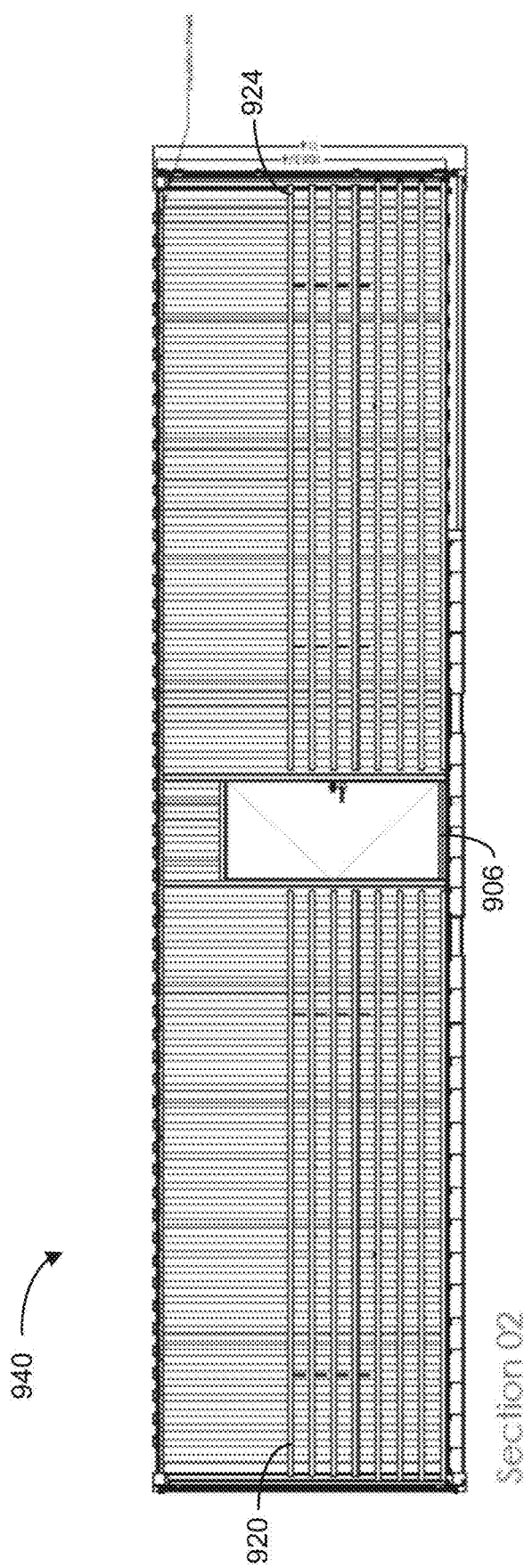

FIG. 9G illustrates a side cross-sectional view 940 of the portable container 900, according to some embodiments. As illustrated in the side cross-sectional view 940, the portable container 900 can include the rails 920 and 924 and the door 906.

Figure 9H:
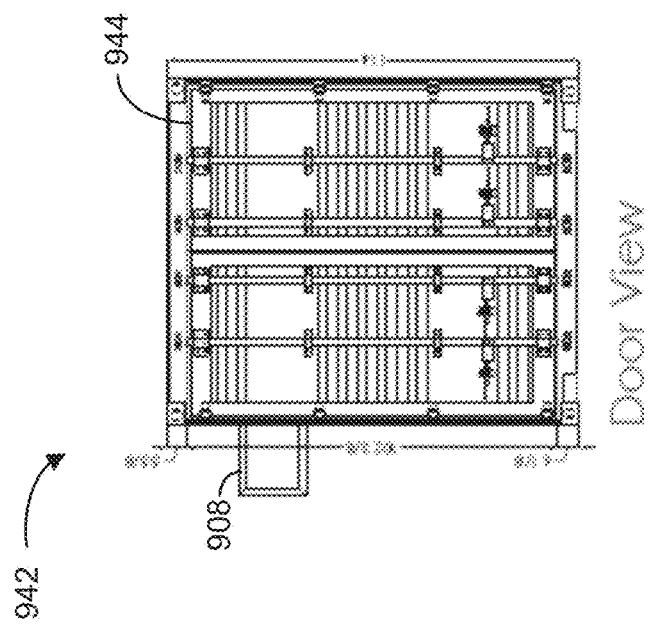

FIG. 9H illustrates a back view 942 of the portable container 900, according to some embodiments. As illustrated in the back view 942, the portable container 900 may include the air conditioning cage 908 and a door 944. The door 944 may open to facilitate loading portable solar panel structures into the portable container 900.

Figure 9I:
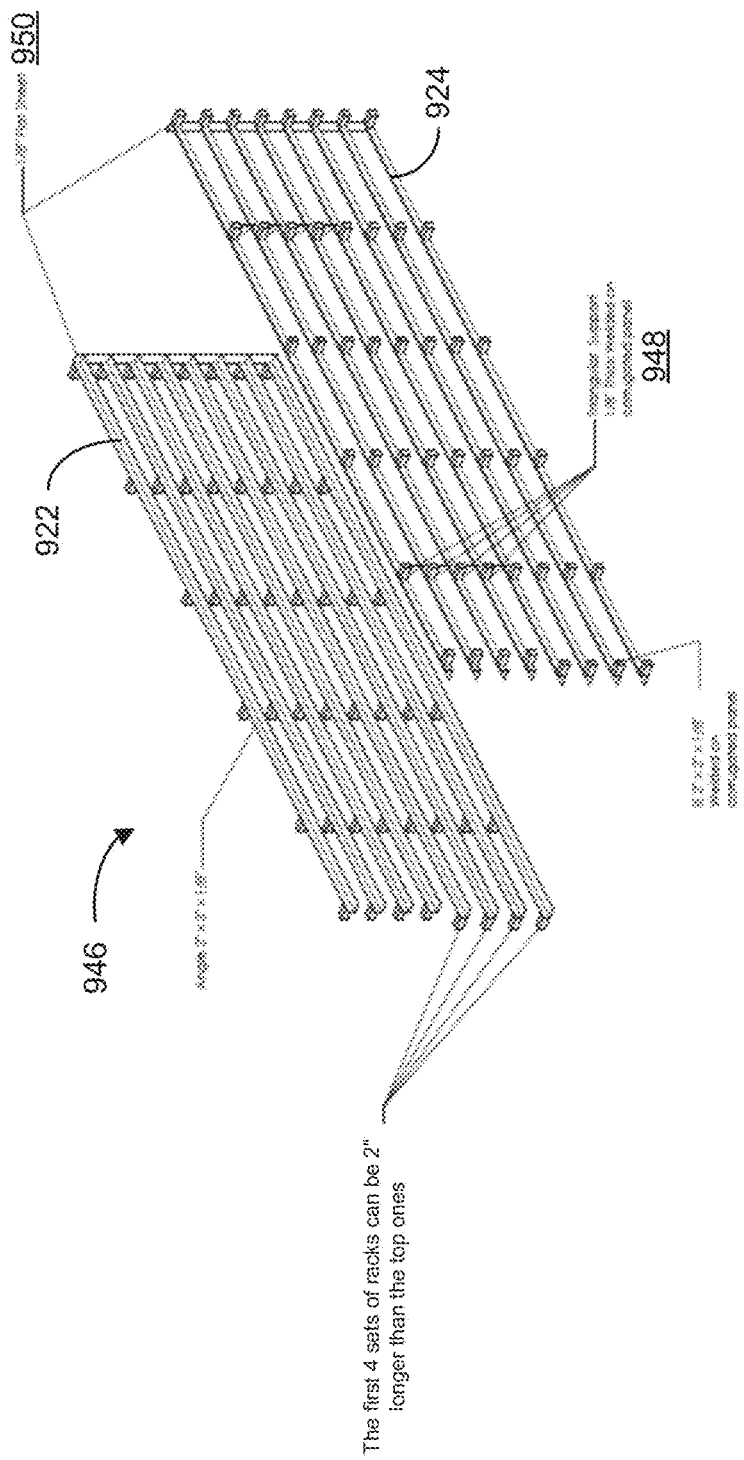

FIG. 9I illustrates a perspective view 946 of the rails 922 and 924, according to some embodiments. As illustrated, the rails 922 may include the same number of spaced apart (e.g., equally spaced apart) rails as the rails 924. The rails 922 and 924 (e.g., racks) may be fastened (e.g., welded) onto opposing sides of the portable container. The rails 922 and 924 may be fastened to the sides of the portable container 900 via a plurality of portions (e.g., pipes or transversely abutting portions) that extend from "L-shaped" portions of the rails 922 and 924 running parallel to the walls of the portable container 900. The rails 922 and 924 may be affixed to the walls of the portable container 900 as cantilevers. To support the cantilevers, triangular support portions 948 may be welded between the rails 922 and 924 and the walls at each of the locations the rails 922 and 924 are welded to the walls.

The ends of the rails 922 and 924 may be coupled with (e.g., welded to) flat sheets 950. The flat sheets 950 may be metal or another solid material. The flat sheets 950 may connect the rails 922 into place to provide support for the portable solar panel structures and avoid disfigurement. A lubricant (e.g., a dry graphite lubricant) may be spread onto the rails 922 and 924 (and the rails 918 and 920) to increase the ability to slide portable solar panel structures onto the rails 922 and 924.

Figure 9J:
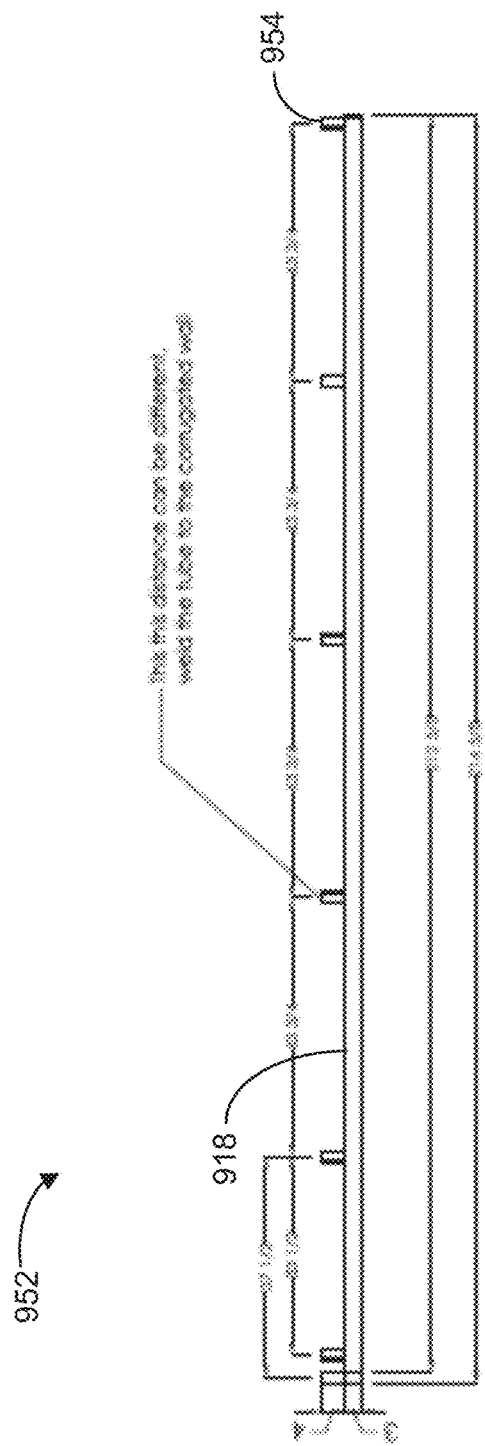

FIG. 9J illustrates a top view 952 of the rail 918, according to some embodiments. As illustrated, the rail 918 may include a plurality of spaced apart (e.g., equally spaced apart) portions 954.

Figure 9K:
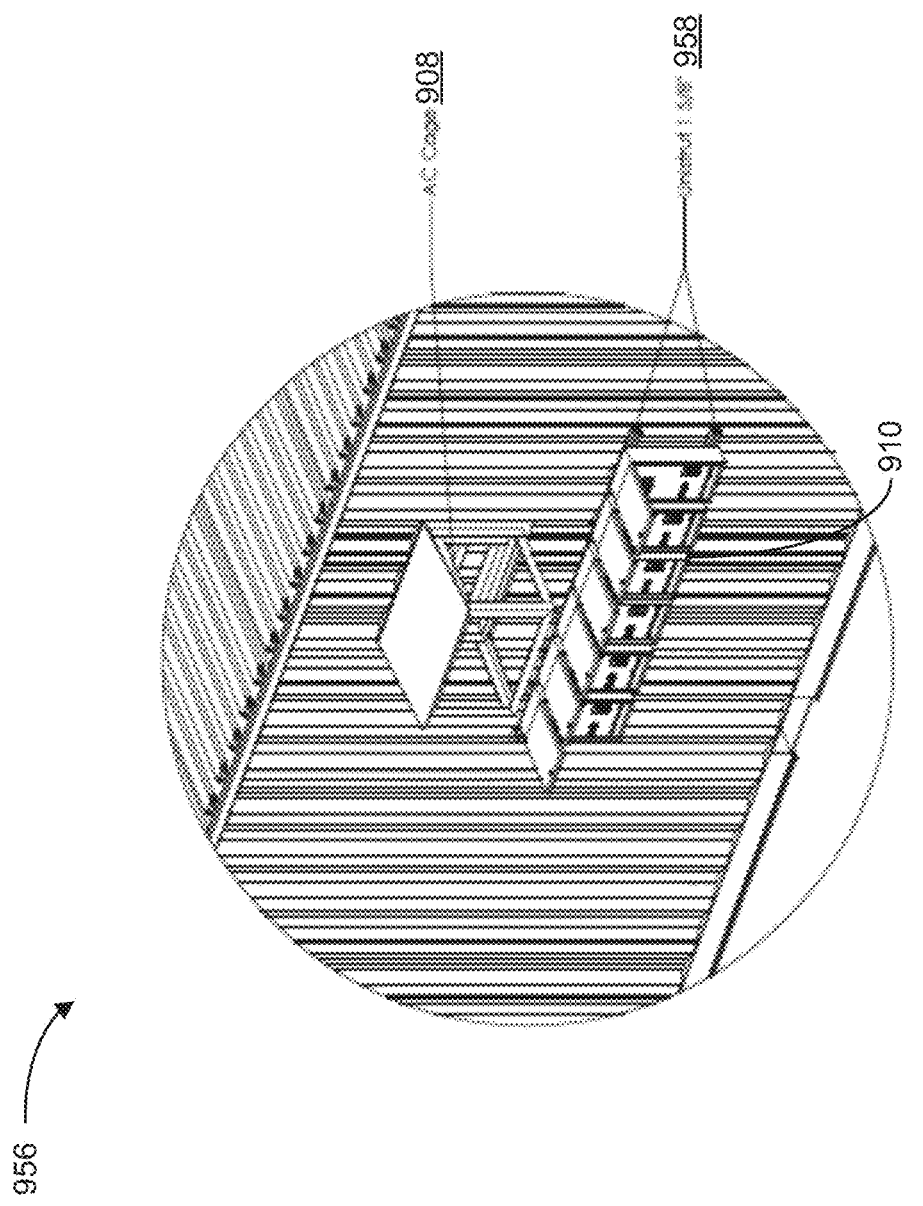

FIG. 9K illustrates a perspective view 956 of a side of the portable container 900, according to some embodiments. As illustrated in the perspective view 956, the portable container 900 can include the air conditioning cage 908 and the discharging ports 910. The discharging ports 910 can be fastened or otherwise affixed to an exterior surface of a wall of the portable container 900 by unistruts 958 (e.g., unistrut pipes).

Figure 9L:
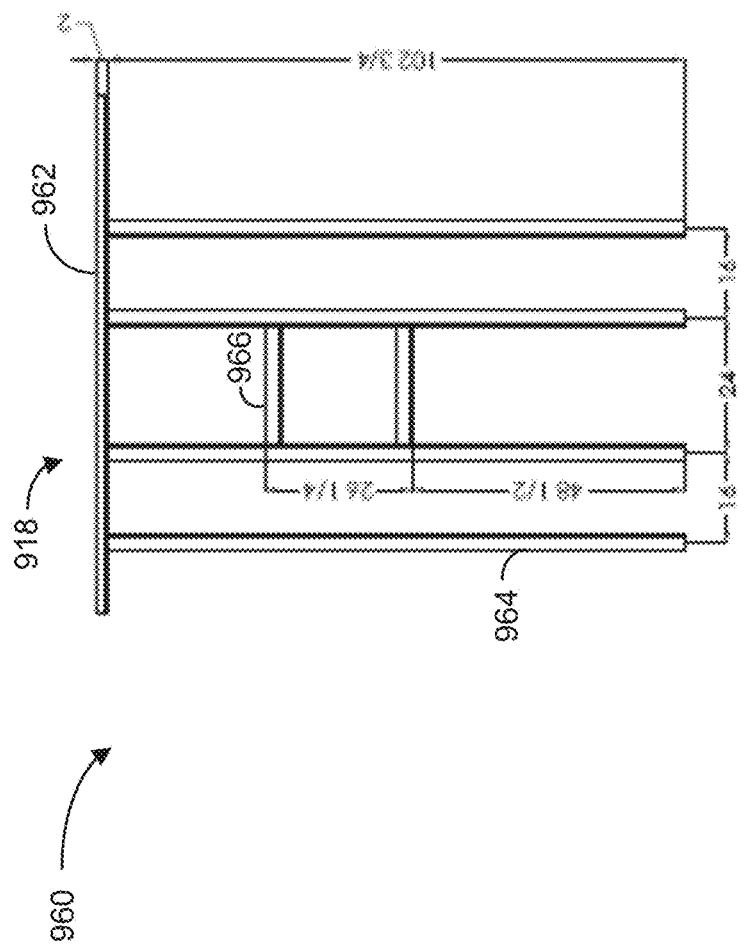

FIG. 9L illustrates a front view 960 of the frame 916, according to some embodiments. The frame 916 may include a top board 962, vertical boards 964, and horizontal boards 966. The vertical boards 964 may be connected or coupled to the top board 962. The top board 962 may be coupled or affixed to the portable container 900. The horizontal boards 966 may be coupled between two of the vertical boards 964. The top board 962, vertical boards 964, and the horizontal boards 966 may be coupled (e.g., welded) together or be molded as a single component or board. The vertical boards 964 may be spaced apart to increase airflow throughout the portable container 900. The horizontal boards 966 may provide support for the two vertical boards 964. The horizontal boards 966 may support inverters and/or controllers affixed to the vertical boards 964 and the horizontal boards 966.

Figure 10:
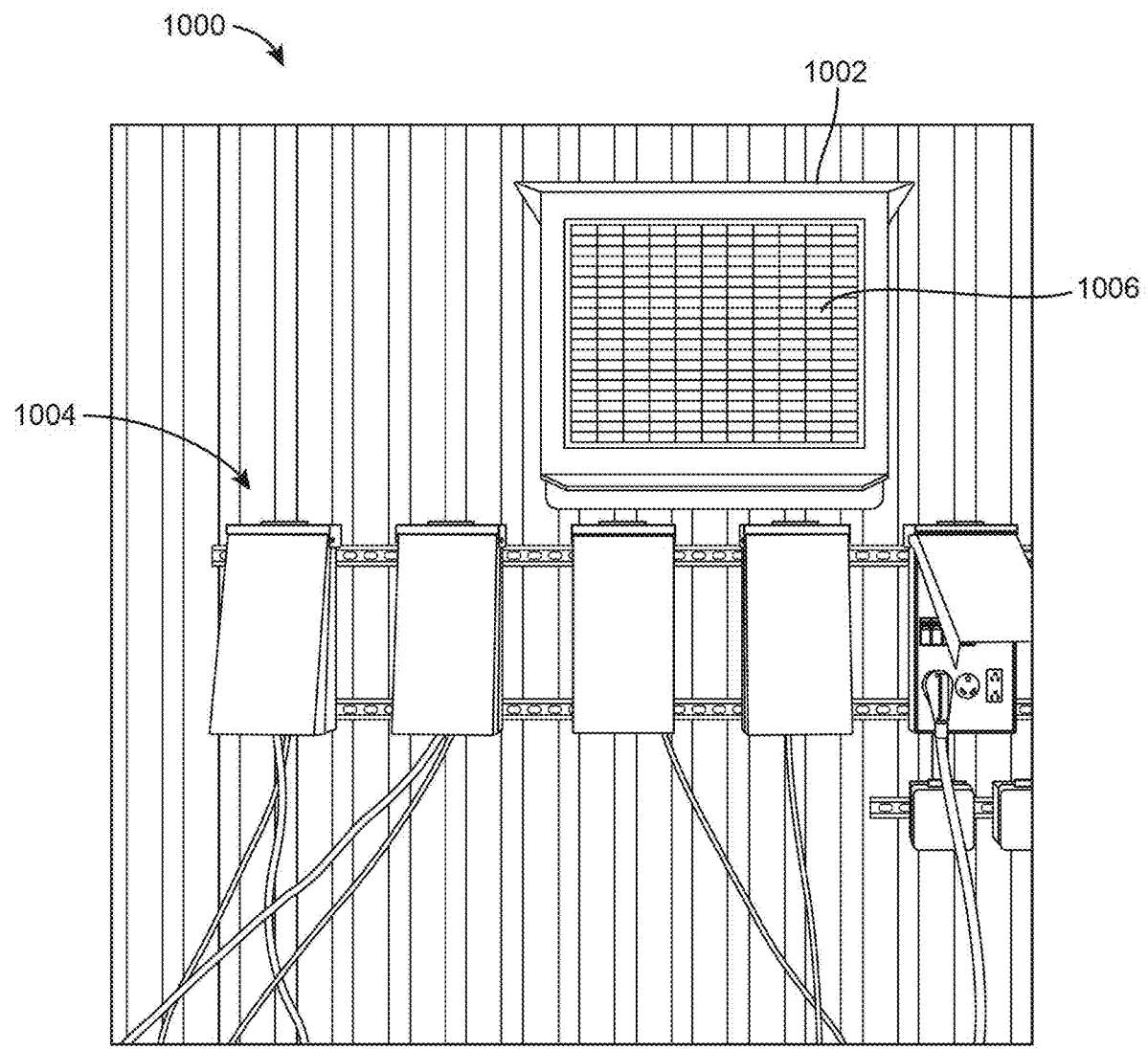
FIG. 10 illustrates a front view of a wall of a portable container, according to some embodiments.

FIG. 10 illustrates a front view 1000 of a wall of a portable container (e.g., the portable container 800 or the portable container 900), according to some embodiments. As illustrated in the front view 1000, an air conditioning cage 1002 and discharging ports 1004 can be affixed to the wall of the portable container. An air conditioning unit 1006 may be inside the air conditioning cage 1002.

Figure 11:
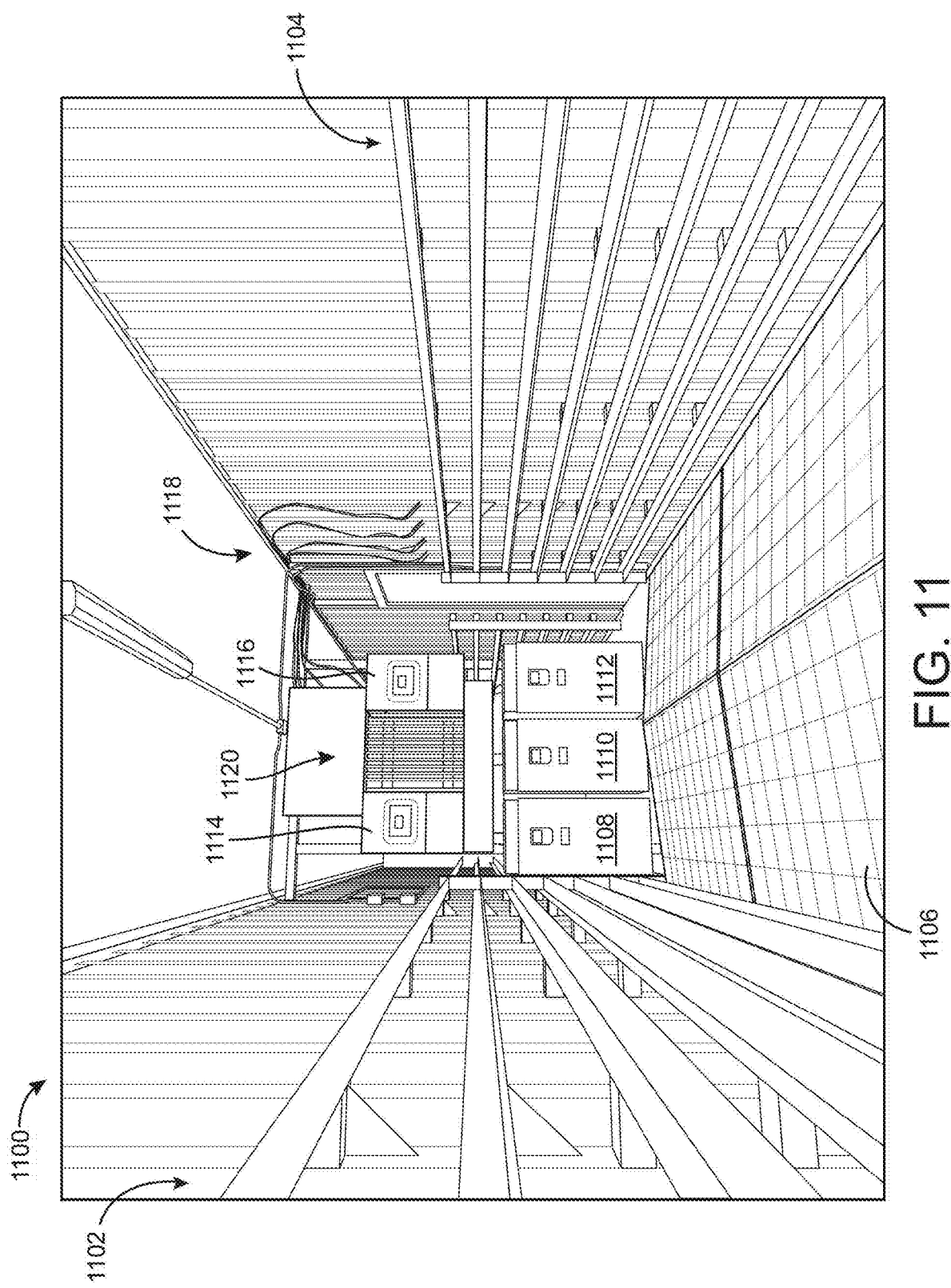
FIG. 11 illustrates an interior space of a portable container of a micro utility system, according to some embodiments.

FIG. 11 illustrates an interior space 1100 of a portable container (e.g., the portable container 800 of FIG. 8 or the portable container 900 of FIGS. 9A-9L), according to some embodiments. The interior space 1100 may include rails 1102 and 1104 affixed to opposing walls of the portable container. A solar panel structure 1106 may rest on a pair or set of the rails 1102 and 1104. The interior space 1100 may additionally include ESS units 1108, 1110, and 1112 of an ESS. The ESS units 1108, 1110, and 1112 may be electrically coupled to controllers 1114 and 1116. The controllers 1114 and 1116 may be or include inverters. Cables 1118 may run from a charging ports on an exterior face of a side of the portable container to the controllers 1114 and 1116. AC power generated by portable solar panel structures may flow through the cables 1118 to the controllers 1114 and 1116. The controllers 1114 and 1116 may convert the AC power into DC power and direct the converted DC power to the ESS units 1108, 1110, and 1112 to charge the ESS units 1108, 1110, and 1112. The controllers 1114 and 1116 may discharge the ESS units 1108, 1110, and 1112 through cables 1120 to power loads connected to discharging ports on an exterior wall (e.g., the exterior wall of a side opposite the wall to which the charging ports are attached) to power loads electrically connected to the discharging ports. In some embodiments, the controllers 1114 and 1116 may direct energy from the charging ports directly to the discharging ports. The controllers 1114 and 1116 such energy to the discharging ports instead of or in addition to any energy the controllers 114 and 1116 direct from the ESS units 1108, 1110, and 1112. The controllers 1114 and 1116 may direct such energy according to any energy allocations the controllers 1114 and 1116 make for the loads.

Figure 12:
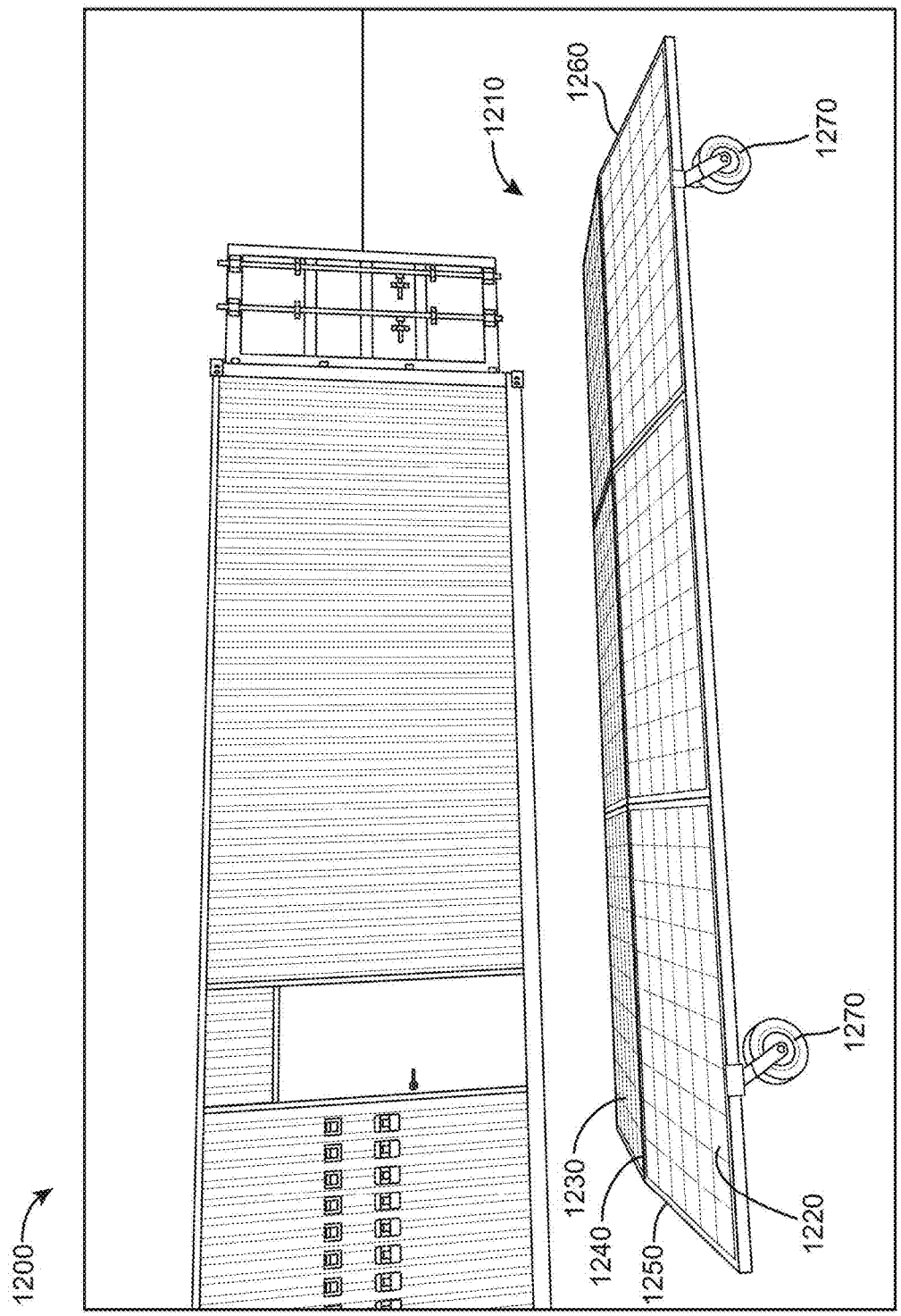
FIG. 12 illustrates a perspective view of a portable solar panel structure, according to some embodiments.

FIG. 12 illustrates a perspective view 1200 of a portable solar panel structure 1210 configured for use in the micro utility system 600 described with reference to FIG. 6, according to some embodiments. The portable solar panel structure 1210 may include two panel sides 1220 and 1230 coupled together at an end 1240 and forming a tent shape. The distal ends 1250 and 1260 of the panel sides 1220 and 1230 may be located proximate wheels 1270. The wheels 1270 may be configured to fold into a storing position when the portable solar panel structure 1210 is stored. In some embodiments, the portable solar panel structure 1210 can have panel sides 1220 and 1230 placed at an angle that optimizes exposure to sunlight. In some embodiments, the angle of the two panel sides 1220 and 1230 can be adjustable.

Figure 13A:
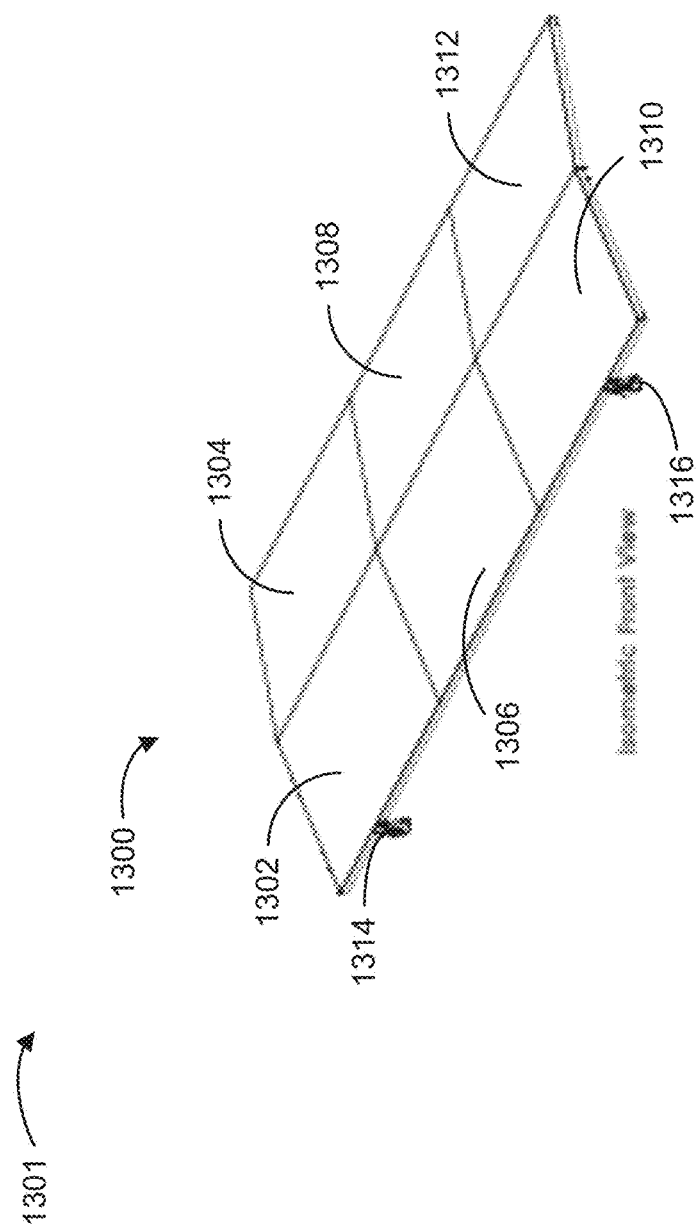
FIGS. 13A-13G illustrate views of a portable solar panel structure, according to some embodiments.

FIGS. 13A-13G illustrate views of a portable solar panel structure 1300, according to some embodiments. The portable solar panel structure 1300 may be the same as or similar to a portable solar panel structure described with reference to FIG. 6, FIGS. 9A-9L, and/or FIG. 12. FIG. 13A illustrates a perspective view 1301 of the top face of the portable solar panel structure 1300, according to some embodiments. As illustrated in the perspective view 1301, the portable solar panel structure 1300 may include multiple solar panels 1302-1312 configured in a solar array and coupled with wheels 1314 and 1316. Each of the solar panels 1302-1312 may include one or more solar cells configured to convert solar energy (e.g., light) into electric energy. The solar panels 1302-1312 may be electrically coupled with each other in series. The solar panels 1302-1312 may be coupled (e.g., one output of the solar panels 1302-1312 connected in series) with a charging port (e.g., one of the charging ports 904 of the portable container 900, shown and described with reference to FIGS. 9A-9L) to generate and provide power to a load or an ESS connected to the charging port. In operation, two portable solar panel structures 1300 may be connected in series with each other and inserted into one charging port to provide power to an ESS of a portable container.

The portable solar panel structure 1300 may include or be coupled with the wheels 1314 and 1316. The wheels 1314 and 1316 may be coupled with ends (e.g., distal ends) of one or more of the solar panels 1302-1316. The wheels 1314 and 1316 may be coupled with an end (e.g., a distal end) of the portable solar panel structure 1300. In some embodiments, the wheels 1314 and 1316 may be coupled with an end of a frame (e.g., a steel or other type of metal or material frame) that may hold or support the solar panels 1302-1316 in place. The wheels 1314 and 1316 may be hingedly (e.g., by a hinge) or foldably coupled to the portable solar panel structure 1300. For example, the wheels 1314 and 1316 may be attached to the portable solar panel structure 1300. The wheels 1314 and 1316 may be foldably coupled with the portable solar panel structure 1300 such that when the wheels 1314 and 1316 are folded away from the portable solar panel structure 1300, the wheels 1314 and 1316 may be in a position perpendicular or substantially perpendicular to the portable solar panel structure 1300 and when the wheels 1314 and 1316 are folded towards the portable solar panel structure 1300, the wheels 1314 and 1316 may be touching a bottom face of the portable solar panel structure 1300 and/or parallel or substantially parallel to the portable solar panel structure 1300. When the wheels 1314 and 1316 are folded away from or towards the portable solar panel structure 1300, a locking mechanism may lock the position of the wheels 1314 and 1316 in place (e.g., lock in place in either a transporting position in which the wheels 1314 and 1316 are positioned away from the portable solar panel structure 1300 or a storing position in which the wheels 1314 and 1316 are positioned towards the portable solar panel structure 1300). Accordingly, a user may transport the portable solar panel structure 1300 when the wheels 1314 and 1316 are folded away from the portable solar panel structure 1300 with the wheels 1314 and 1316 locked in place. The user may also store the portable solar panel structure 1300 when the wheels 1314 and 1316 are folded towards the portable solar panel structure 1300 and locked in place.

In some embodiments, the wheels 1314 and 1316 can be removably coupled with the portable solar panel structure 1300. The wheels 1314 and 1316 can be fastened to the portable solar panel structure 1300 with a fastener (e.g., a screw, bolt, nail, etc.). When storing the portable solar panel structure 1300. The wheels 1314 and 1316 can be removed or detached from the portable solar panel structure 1300. The portable solar panel structure 1300 can be placed onto rails of a portable container (e.g., the portable container 620 of FIG. 6 or the portable container 900 of FIGS. 9A-9L). The wheels 1314 and 1316 can be removed and inserted at a position below or beneath the portable solar structure 1300. The wheels 1314 and 1316 can be inserted into or onto a clip located at an underside of the portable solar panel structure 1300, such as to a bottom surface of a frame of the portable solar panel structure. In some embodiments, the wheels 1314 and 1316 can be inserted into or onto clips located below the rails of the portable container (e.g., clips affixed to rails of the portable container). As inserted, the wheels may be in an orientation substantially parallel to the portable solar panel structure 1300. The wheels may lock into position within a holder holding the wheels and then the holders may be inserted into or onto the clips. Such clips may be used to store each wheel coupled to the portable solar panel structure 1300. Clips may be similarly affixed to each portable solar panel structure stored in the portable container and/or below each rail of the portable container.

Folding the wheels 1314 and 1316 towards the portable solar panel structure 1300 may reduce the vertical space the portable solar panel structure 1300 requires for storage. For example, multiple portable solar panel structures 1300 may be stored in a portable container (e.g., the portable container 620 of FIG. 6 or the portable container 900 of FIGS. 9A-9L). The portable solar panel structures 1300 may be stored by sliding the portable solar panel structures 1300 onto rails (e.g., the rails 918-924 of FIGS. 9A-9L) within the portable container. The rails may be spaced apart within the portable container such that the portable solar panel structures 1300 may slide onto the rails with the wheels 1314 and 1316 folded towards the portable solar panel structures 1300, but not with the wheels 1314 and 1316 folded away from the portable solar panel structures 1300 (e.g., portable solar panel structures 1300 underneath other portable solar panel structures 1300 may block the wheels 1314 and 1316 from folding away from the portable solar panel structures 1300). By spacing the rails in this configuration, more solar panel structures 1300 may be loaded into the portable container.

Figure 13B:
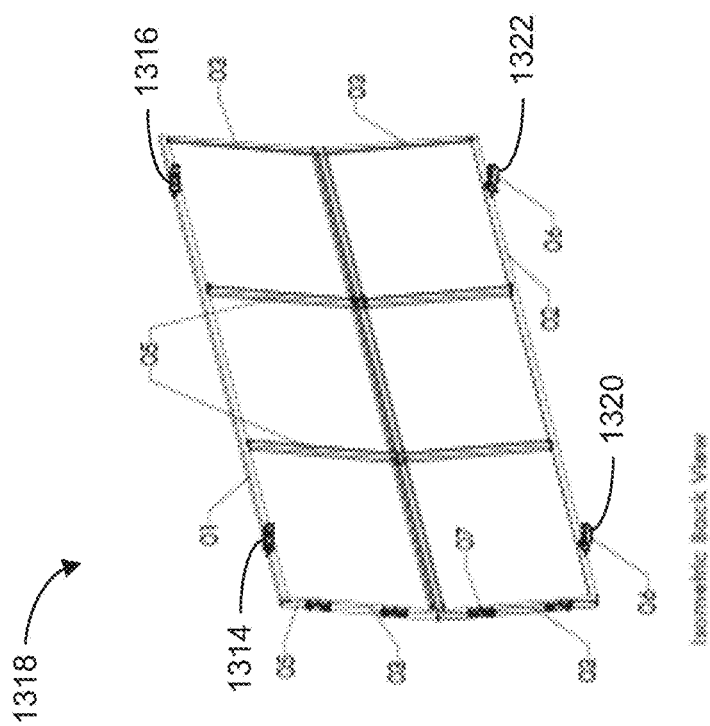

FIG. 13B illustrates a perspective view 1318 of the bottom face of the portable solar panel structure 1300, according to some embodiments. As illustrated in the perspective view 1318, the portable solar panel structure 1300 may include multiple solar panels 1302-1312 configured in a solar array and coupled with wheels 1314, 1316, 1320, and 1322. The wheels 1314, 1316, 1320, and 1322 may enable users to move the portable solar panel structure 1300 in a wagon style in which all four of the wheels 1314, 1316, 1320, and 1322 roll on the ground at the same time to move the portable solar panel structure 1300. In some embodiments, the portable solar panel structure 1300 may only include two wheels on one of the sides of the portable solar panel structure 1300. In such embodiments, a user may move the portable solar panel structure 1300 in a wheelbarrow style by lifting the end opposite the two wheels and pulling or pushing on the portable solar panel structure 1300. The portable solar panel structure 1300 may include any number of wheels.

Figure 13C:
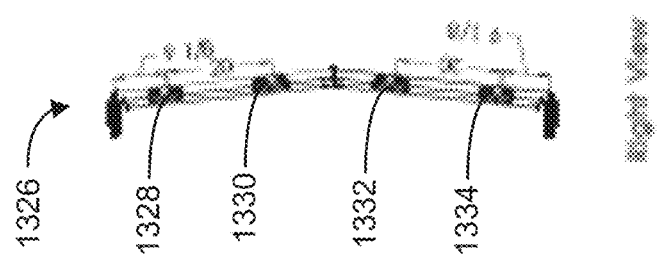

FIG. 13C illustrates a front view 1326 of the portable solar panel structure 1300, according to some embodiments. As illustrated in the front view 1326, the portable solar panel structure 1300 may include multiple discharging ports 1328-1334. The discharging ports 1328-1334 may discharge energy the solar panels 1302-1312 of the portable solar panel structure 1300 generate through cables connected to the discharging ports 1328-1334. The solar panels 1302-1312 may generate energy and discharge energy through the discharging ports 1328-1334 to a load or an ESS.

Figure 13D:
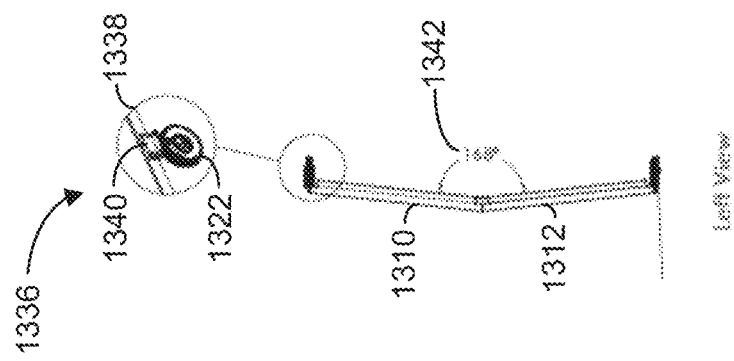

FIG. 13D illustrates a front view 1336 of the portable solar panel structure 1300, according to some embodiments. The front view 1336 includes a close up view 1338 of the wheel 1322 and a fastener 1340 fastening the wheel 1322 to a side of the portable solar panel structure 1300. The fastener 1340 may be or include a bracket connected to the side of the portable solar panel structure 1300 and the wheel 1322. Each wheel of the portable solar panel structure 1300 may be similarly coupled to the portable solar panel structure 1300. The portable solar panel structure 1300 may include the solar panels 1310 and 1312 coupled to each other at one end of each of the solar panels 1310 and 1312 in an angled configuration (e.g., at an angle 1342). The angle 1342 may be 168 degrees or any other angle. The solar panels 1310 and 1312 may be coupled together by a hinge. In some embodiments, the angle 1342 may be adjustable to optimize the amount of sunlight (e.g., reduce any shadow over one of the solar panels 1310 or 1312 caused by the angle 1342). The angle 1342 may be adjusted to optimize the amount of electricity produced without using a solar tracker, such as by having as many panels as perpendicular as possible for as long as possible for a particular time of year and longitude. The portable solar panel structure 1300 may include any number of solar panels that are similarly coupled together in an angled configuration.

Figure 13E:
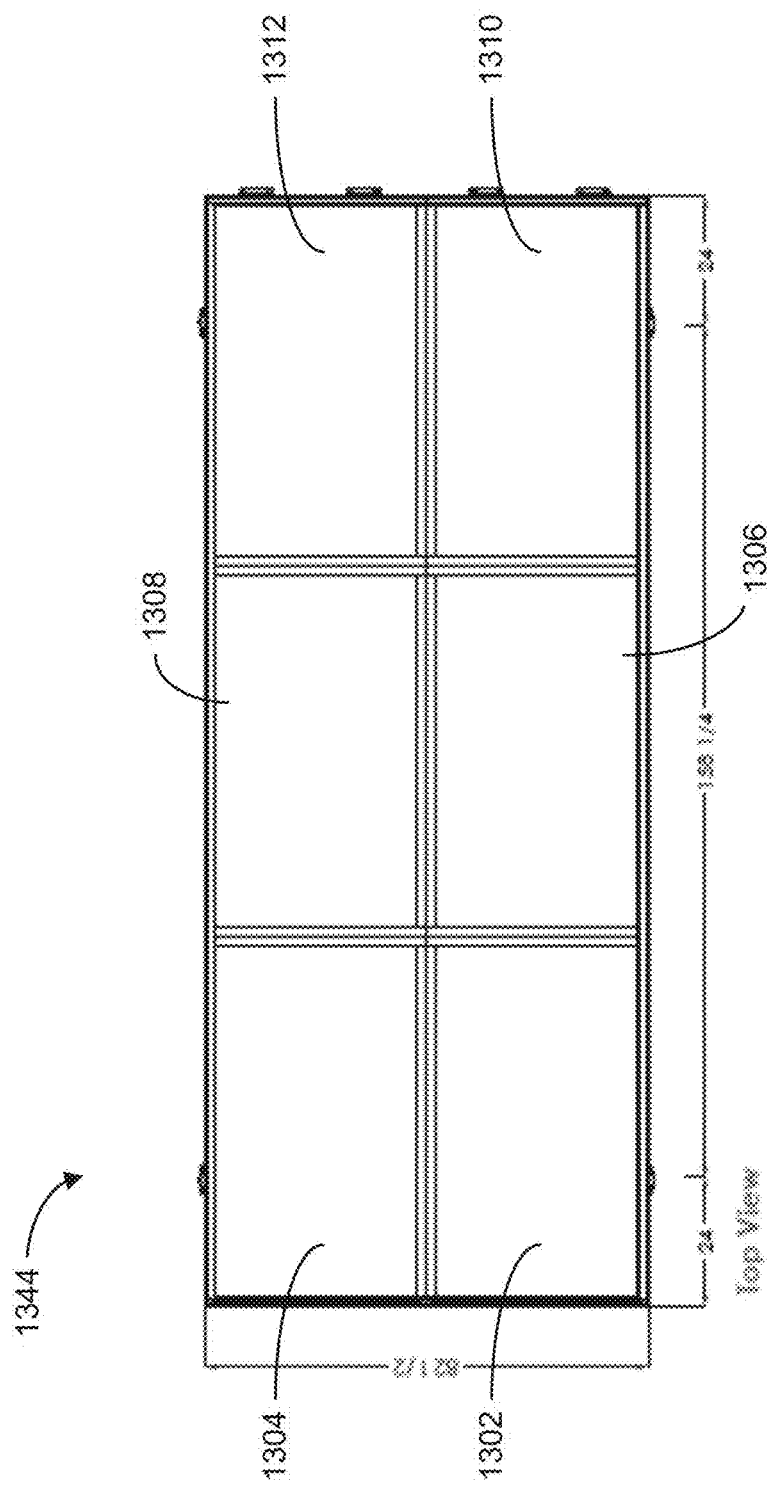

FIG. 13E illustrates a top view 1344 of the portable solar panel structure 1300, according to some embodiments.

Figure 13F:
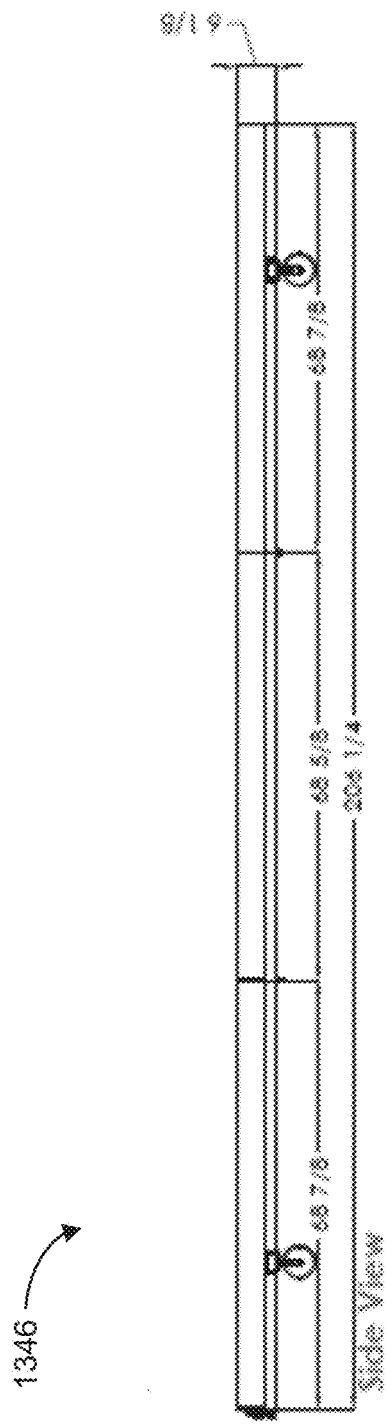

FIG. 13F illustrates a side view 1346 of the portable solar panel structure 1300, according to some embodiments.

Figure 13G:
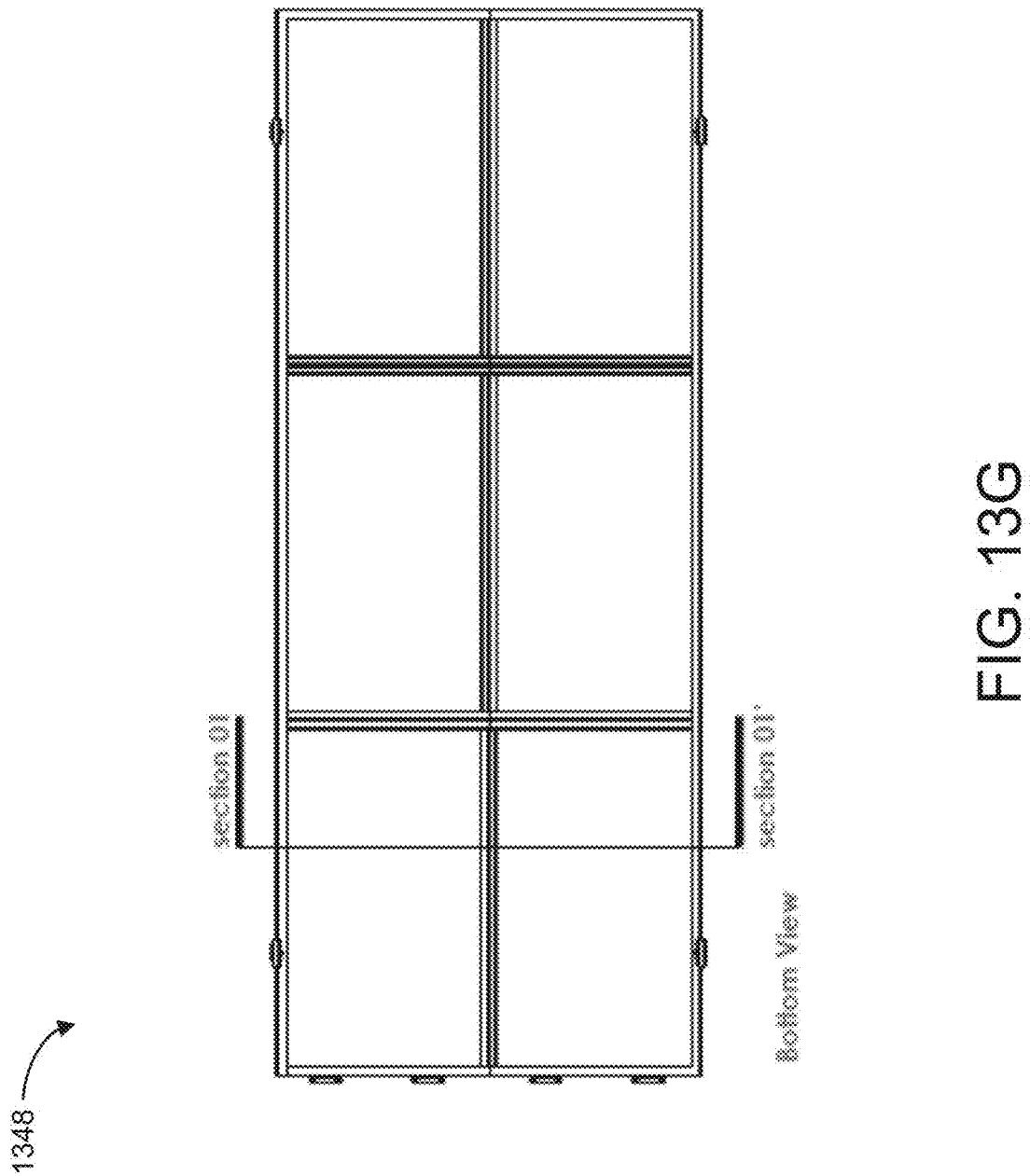

FIG. 13G illustrates a bottom view 1348 of the portable solar panel structure 1300, according to some embodiments.

Figure 14:
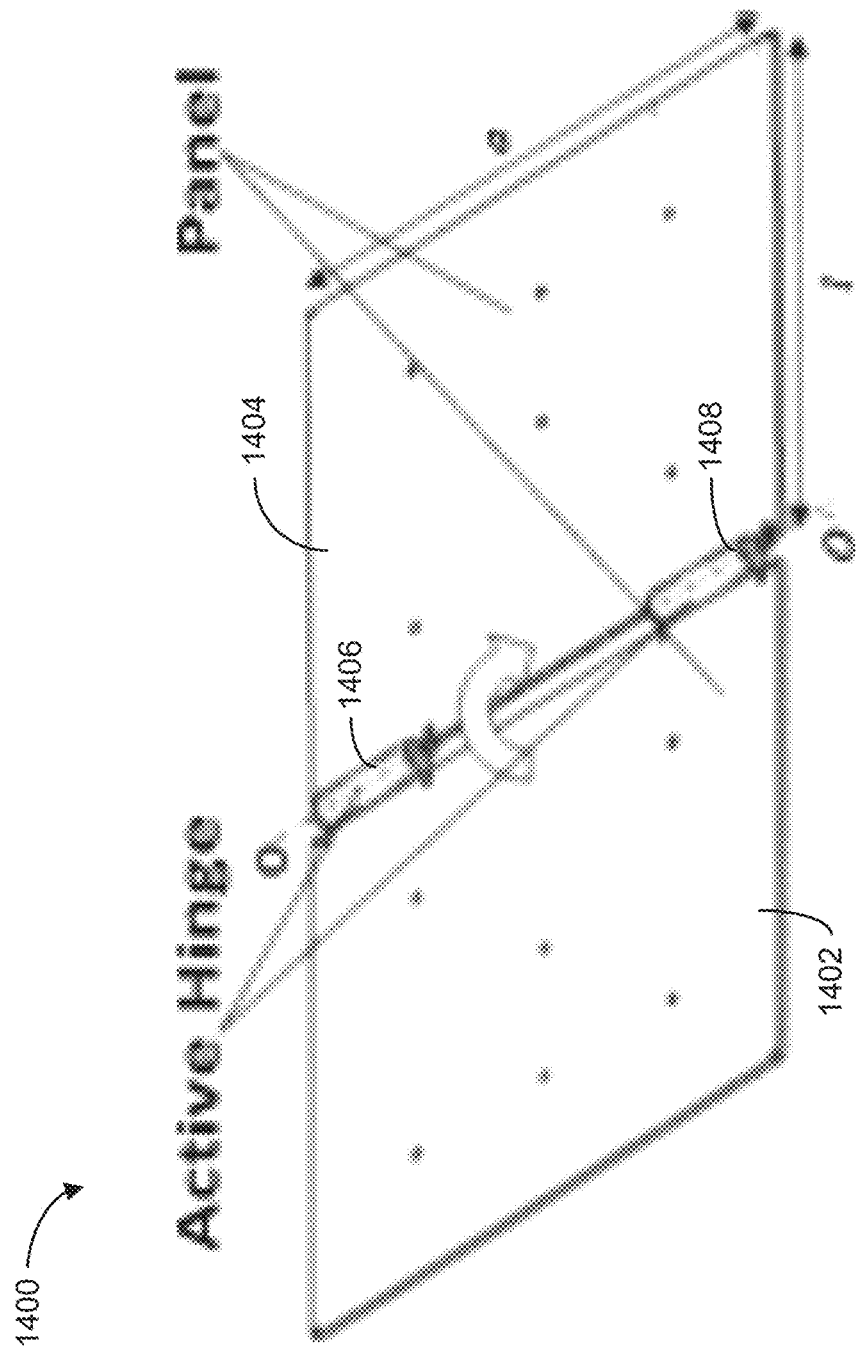
FIG. 14 illustrates a perspective view of two solar panels hingedly coupled together, according to some embodiments.

FIG. 14 illustrates a perspective view 1400 of two solar panels 1402 and 1404 hingedly coupled together, according to some embodiments. The two solar panels 1402 and 1404 may be solar panels of a portable solar panel structure (e.g., the portable solar panel structure 1300 of FIG. 13). The two solar panels 1402 and 1404 may be coupled together by hinges 1406 and 1408 between ends of the two solar panels 1402 and 1404. The hinges may rotate the two solar panels 1402 and 1404 and lock in place at different positions. Accordingly, the two solar panels 1402 and 1404 may maintain their shape in the angled configuration according to different angles to maximize light exposure and increase the amount of energy the solar panels 1402 and 1404 can generate.

FIGS. 15A-15B illustrate a clamp 1500 coupling two solar panels 1502 and 1504 together, according to some embodiments. The two solar panels 1502 and 1504 may be solar panels of a portable solar panel structure (e.g., the portable solar panel structure 1300). FIG. 15A illustrates a perspective view 1506 of the clamp 1500 coupling the two solar panels 1502 and 1504. The clamp 1500 may be a mid clamp configured to couple the two solar panels 1502 and 1504 together by exerting pressure against the top and bottom surfaces of the two solar panels 1502 at the same time using a screw system. FIG. 15B illustrates a perspective view 1508 of the clamp 1500.

Figure 16:
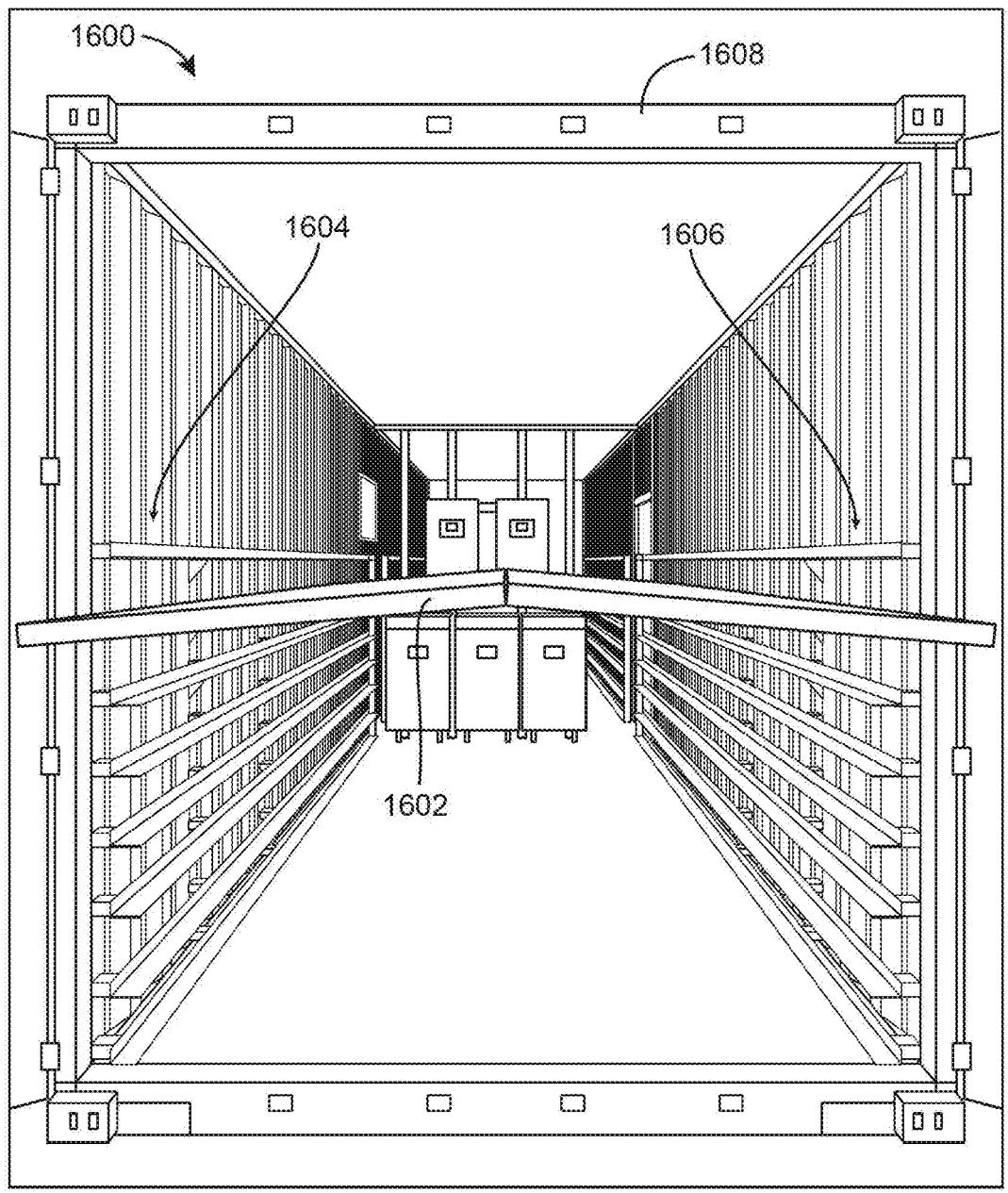
FIG. 16 illustrates a front view of a portable solar panel structure supported by sets of rails in a portable container, according to some embodiments.

FIG. 16 illustrates a front view 1600 of a portable solar panel structure 1602 supported by rails 1604 and 1606 in a portable container 1608, according to some embodiments. The portable solar panel structure 1602 may be the same as or similar to the portable solar panel structure 1300, shown and described with reference to FIGS. 13A-13G. The portable container 1608 may be the same as or similar to the portable container 900, shown and described with reference to FIGS. 9A-9L. The rails 1604 and 1606 may be the same as or similar to the rails 918 and 920, shown and described with reference to FIGS. 9A-9L. The portable solar panel structure 1602 may slide onto the set of rails of the rails 1604 and 1606.

Figure 17A:
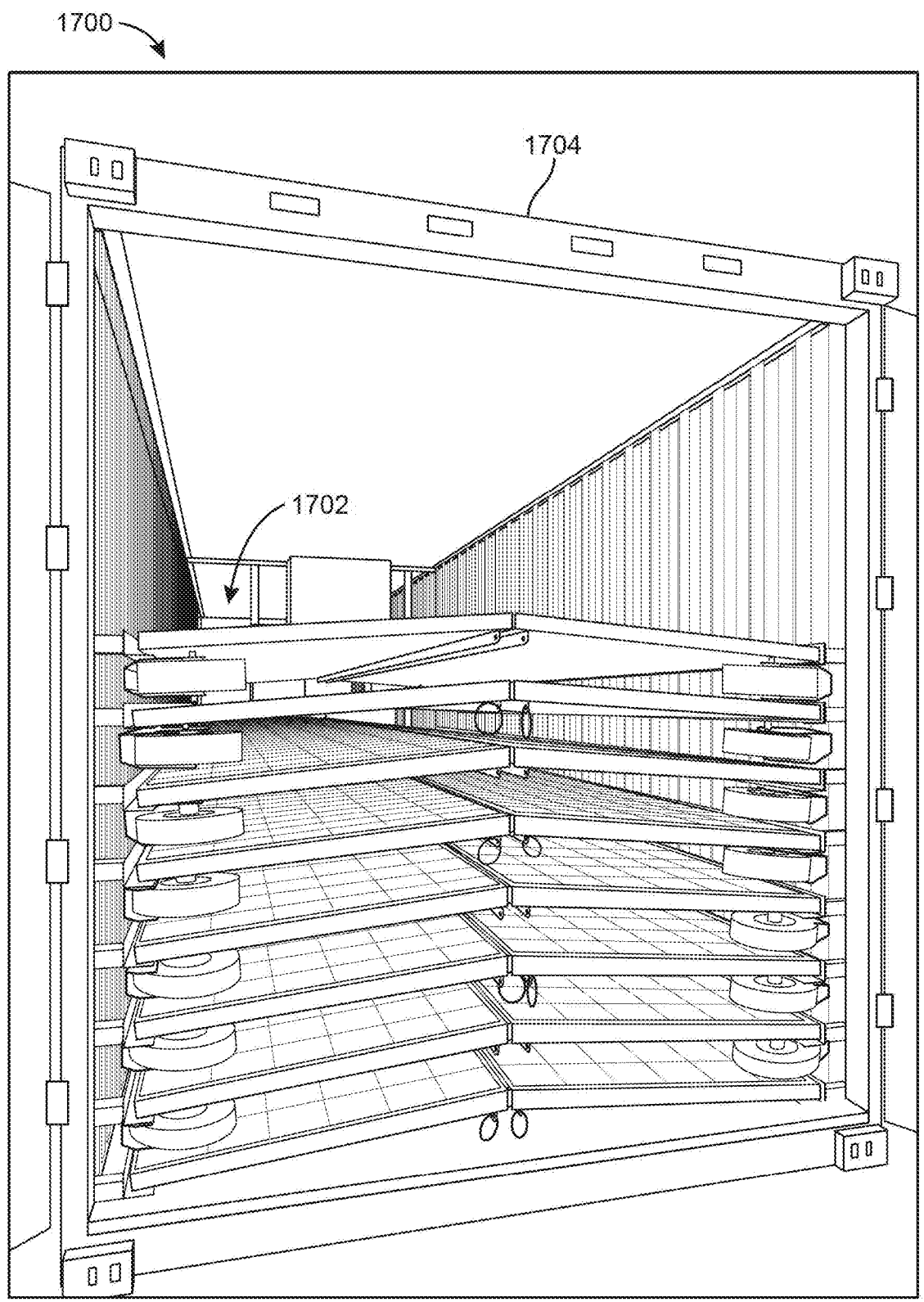
FIG. 17A illustrates a front view of a stack of portable solar panel structures stored in a portable container, according to some embodiments.

FIG. 17A illustrates a front view 1700 of a stack 1702 of portable solar panel structures stored in a portable container 1704, according to some embodiments. The stack 1702 may include multiple portable solar panel structures each similar to or the same as the portable solar panel structure 1300, shown and described with reference to FIGS. 13A-13L. The portable container 1704 may be the same as or similar to the portable container 900, shown and described with reference to FIGS. 9A-9L. The portable solar panel structures of the stack 1702 may be stored on sets of rails (e.g., the sets of rails 1604 and 1606, shown and described with reference to FIG. 16). Wheels on each of the portable solar panel structures may be folded inwards towards the respective solar panel structures such that each of the portable solar panel structures may be stored on the racks of the portable container 1704. The racks may be spaced apart to accommodate such storage to maximize the number of portable solar panel structures that may be stored in the portable container 1704. The height of the stack 1702 may be limited within the portable container 1704 to avoid any accidents that may occur while storing the portable solar panel structures in the portable container 1704 (e.g., avoid overhead lifting of portable solar panel structures into the portable container 1704).

Figure 17B:
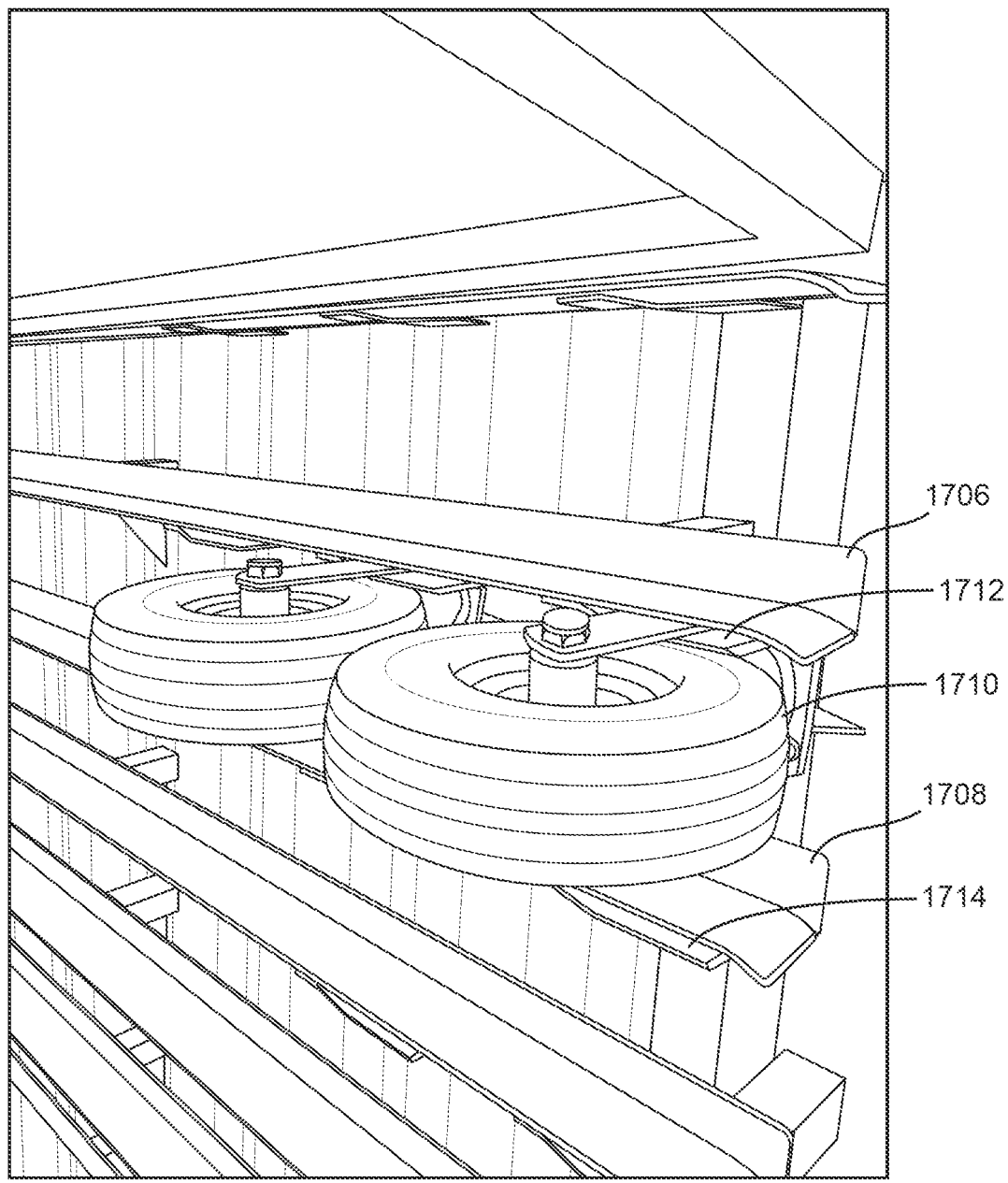
FIG. 17B illustrates wheels clipped to a rail of the portable container of FIG. 17A, according to some embodiments.

FIG. 17B illustrates wheels 1710 clipped to a rail 1706 of the portable container 1704, according to some embodiments. The wheels 1710 may be removed from a portable solar panel structure of the stack 1702. The wheels 1702 may slide onto clips 1712. The clips 1712 may be coupled to (e.g., welded to) a bottom face of the rail 1706. Brackets of the wheels 1710 may slide onto the clips 1712. Single wheels may slide onto individual clips 1712. Wheels from the solar panel structure may additionally slide onto clips of a rail on an opposing side of the portable container 1704 (e.g., a rail level with the rail 1706). The solar panel structure from which the wheels 1710 were removed may slide onto the rail 1706. Another solar panel structure may slide onto a rail 1708 such that the wheels 1710 may slide onto the clips 1710 between the two solar panel structures. Wheels from the solar panel structure that slides onto the rail 1708 may be removed and slide onto the clips 1714 of the rail 1708. The rails of the portable container 1704 may be configured and/or spaced apart in this way to increase the number of solar panel structures that may be stored in the portable container 1704.

Figure 18:
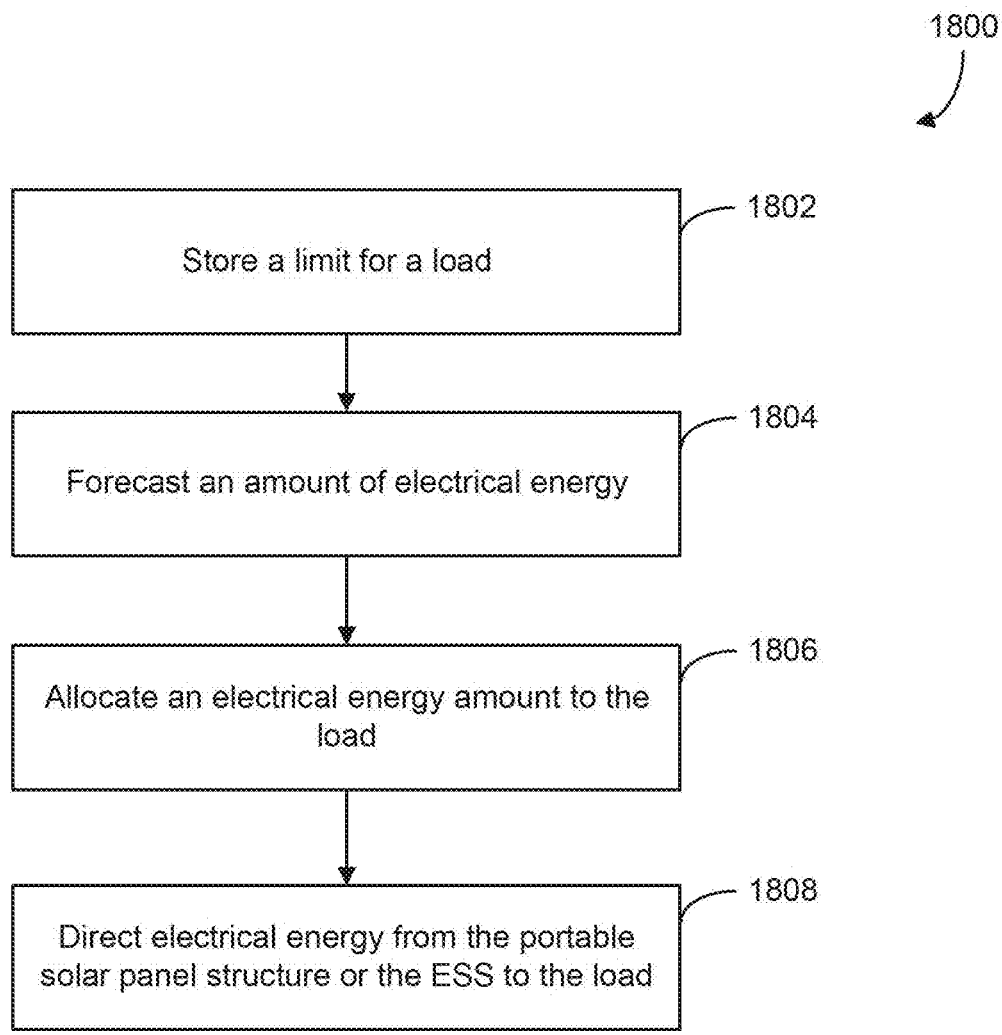
FIG. 18 illustrates a method for micro utility energy allocation, according to some embodiments.

FIG. 18 illustrates a method 1800 for micro utility energy allocation, according to some embodiments. Method 1800 can be performed by a data processing system (e.g., a controller, a computer of computer system 201, shown and described with reference to FIG. 2, one or both of the controllers 824 or 826, shown and described with reference to FIG. 8, etc.). The data processing system can perform the method 1800 in the same manner or in conjunction with the methods 500 and 518, shown and described with reference to FIGS. 5A and 5B. At operation 1802, the data processing system stores in a memory an energy limit for a load. The load is coupled to a portable container configured to house an energy storage system (ESS) and portable solar panel structures. At operation 1804, the data processing system forecasts an amount of electrical energy available from a portable solar panel structure and the ESS for a time period. The portable solar panel structure includes two or more solar panels coupled to each other at one end in an angled configuration. The two or more solar panels are coupled to at least two wheels at a distal end. At operation 1806, the data processing system allocates an electrical energy amount to the load based on the energy limit and for the time period. At operation 1808, the data processing system directs electrical energy from the portable solar panel structure or the ESS to the load according to the allocated electrical energy amount.

Figure 19:
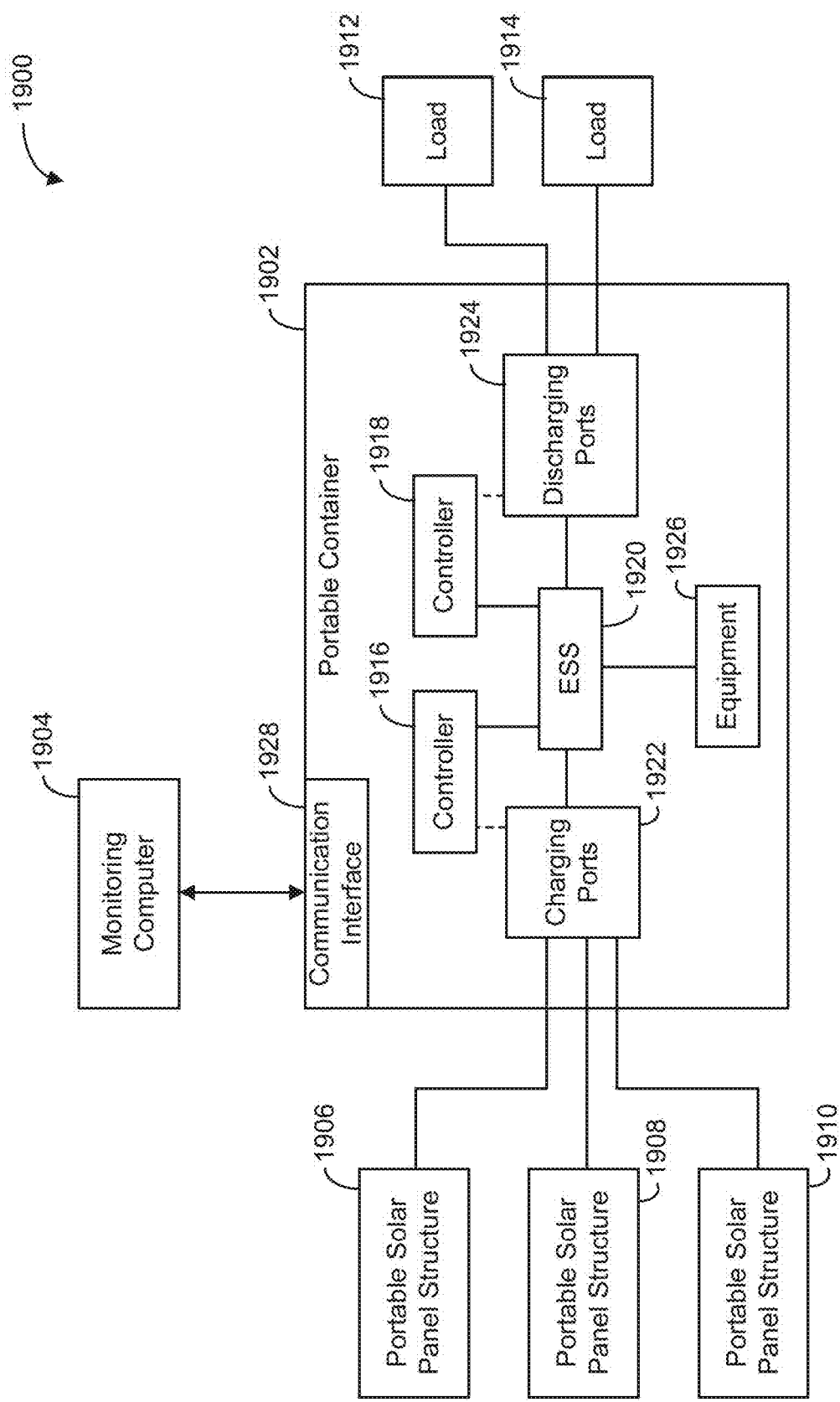
FIG. 19 illustrates a system for micro utility energy allocation, according to some embodiments.

FIG. 19 illustrates a system 1900 for micro utility energy allocation, according to some embodiments. The system 1900 may be the same as or similar to the system 600, shown and described with reference to FIG. 6. The system 1900 may include a portable container 1902, a monitoring computer 1904, portable solar panel structures 1906, 1908, and 1910, and loads 1912 and 1914. The portable container 1902 may include controllers 1916 and 1918, an ESS 1920, charging ports 1922, discharging ports 1924, equipment 1926, and a communication interface 1928. Each of the components 1906-1924 may correspond to or be the same as similar and/or similarly named components shown and described with reference to FIGS. 6-18. The monitoring computer 1904 may be any computing device or client device. The communication interface 1928 may communicate with the monitoring computer 1904 over a LAN network, a Wi-Fi network, a cellular network, a wide area network, a telephone network, a wireless link, a satellite link, a device-to-device mesh network, an intranet, the Internet, or a combination thereof.

In operation, the portable solar panel structures 1906-1910 may be stored on rails within the portable container 1902. The portable container 1902 may be transported and dropped off at a particular location. At the location, the portable solar panel structures 1906-1910 may be removed from the portable container 1902 and set up on the ground (or other surface) proximate to the portable container 1902. The portable solar panel structures 1910 may be electrically coupled to the charging ports 1922 located on a wall of the portable container 1902. The portable solar panel structures 1910 may generate and direct energy to the charging ports 1922. The charging ports 1922 may receive the energy and direct the energy to the ESS 1920. In some embodiments, the charging ports 1922 may direct the energy to the ESS 1920 through the controllers 1916 and/or 1918 to the ESS 1920. The charging ports 1922 may do so because the controllers 1916 and 1918 may operate as inverters to invert the AC power generated by the portable solar panel structures 1906-1910 into DC power for storage in the ESS 1920. The controllers 1916 and 1918 may allocate the energy forecast to be generated by the portable solar panel structures 1906-1910 to the loads 1912 and 1914. The controllers 1916 and 1918 may control the ESS 1920 to direct energy to the loads 1912 and 1914 according to the allocations. The ESS 1920 may discharge energy to the loads 1912 and 1914 through the discharging ports 1924. In this way, the components of the system 1900 can operate to generate and provide energy to loads as a portable system.

The ESS 1920 may power the equipment 1926. The equipment 1926 may be or include lights, an air conditioning unit, the communication interface 1928, and/or any other device within or otherwise associated with the portable container 1902. By using the ESS 1920 to power the equipment 1926, the system 1900 may operate as an islanded system without any connection to a grid or any non-renewable energy resource.

The monitoring computer 1904 may monitor characteristics of the portable container 1902 via the communication interface 1928. The monitoring computer 1904 may do so by communicating with one or both of the controllers 1916 and 1918. The monitoring computer 1904 may request and/or receive information about the current state of charge of the ESS and/or any other operating conditions of the portable container, such as the health of the ESS, the current temperature within the portable container, the current weather outside of the portable container, and/or any other operating characteristics of the system 1900. The monitoring computer 1904 may receive such information as information generated by sensors within or coupled with the portable container 1902. In some embodiments, the monitoring computer 1904 may be remote from the portable container 1902. The communication interface 1928 may facilitate communication with the monitoring computer 1904 via a satellite link that connects the computers of the portable container with the Internet. Accordingly, the monitoring computer 1904 may communicate with the computers of the portable container 1902 while located in a city while the portable container 1902 is an isolated area (e.g., a desert) far away from a direct connection to any network, for example.

Computer Systems

Figure 2:
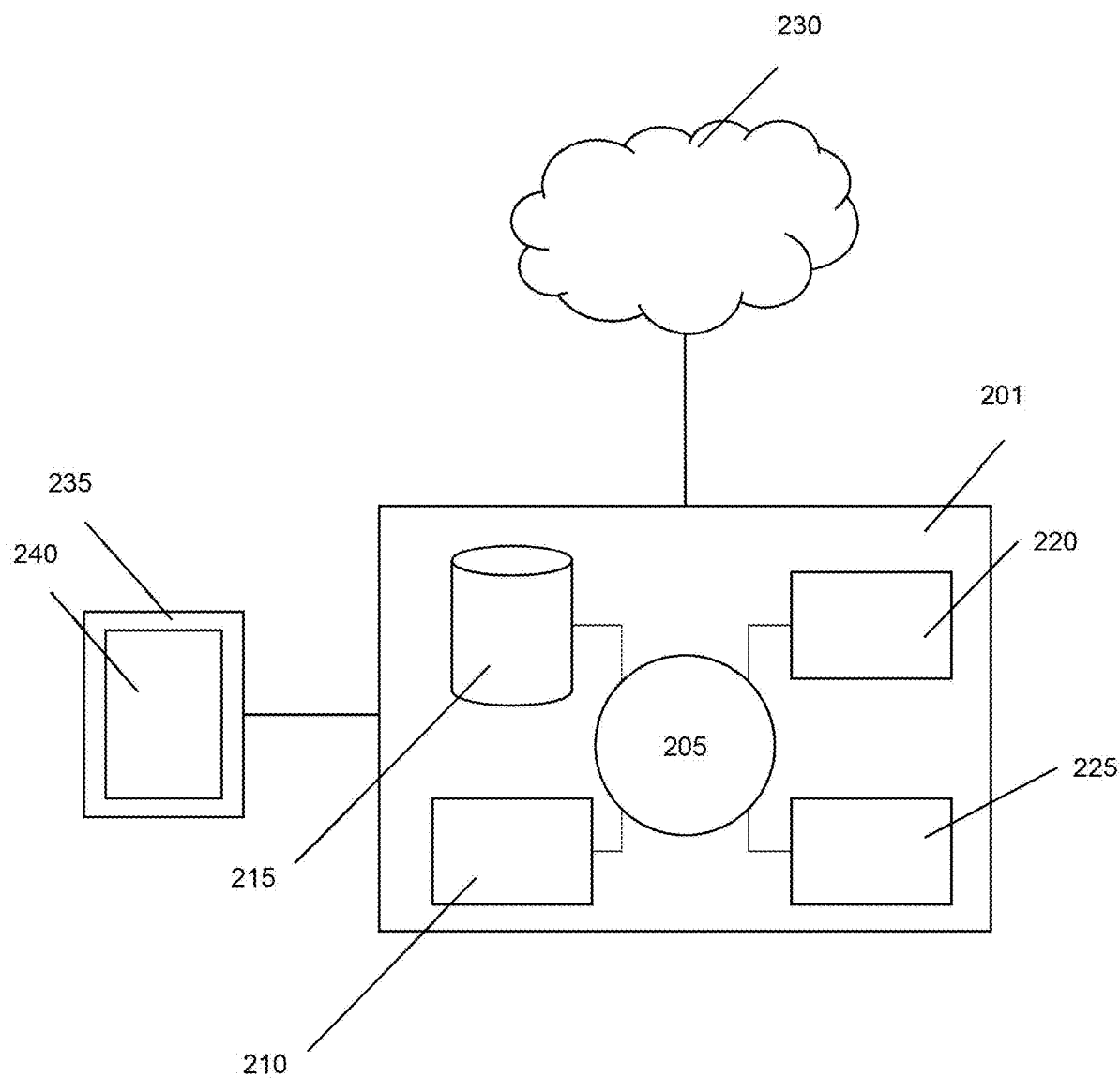
FIG. 2 shows a computer system that is programmed or otherwise configured to implement methods provided herein, in accordance with some embodiments.

The present disclosure provides computer systems that are programmed to implement methods of the disclosure. FIG. 2 shows a computer system 201 that is programmed or otherwise configured to manage electrical energy generated by a renewable micro utility, as described herein. The computer system 201 can be an electronic device of a user or a computer system that is remotely located with respect to the electronic device. The electronic device can be a mobile electronic device.

The computer system 201 includes a central processing unit (CPU, also "processor" and "computer processor" herein) 205, which can be a single core or multi core processor, or a plurality of processors for parallel processing. The computer system 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The computer system 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 201, can implement a peer-to-peer network, which may enable devices coupled to the computer system 201 to behave as a client or a server.

The CPU 205 can execute a sequence of machine-readable instructions, which can be embodied in a program or software. The instructions may be stored in a memory location, such as the memory 210. The instructions can be directed to the CPU 205, which can subsequently program or otherwise configure the CPU 205 to implement methods of the present disclosure. Examples of operations performed by the CPU 205 can include fetch, decode, execute, and writeback.

The CPU 205 can be part of a circuit, such as an integrated circuit. One or more other components of the system 201 can be included in the circuit. In some cases, the circuit is an application specific integrated circuit (ASIC).

The storage unit 215 can store files, such as drivers, libraries and saved programs. The storage unit 215 can store user data, e.g., user preferences and user programs. The computer system 201 in some cases can include one or more additional data storage units that are external to the computer system 201, such as located on a remote server that is in communication with the computer system 201 through an intranet or the Internet.

The computer system 201 can communicate with one or more remote computer systems through the network 230. For instance, the computer system 201 can communicate with a remote computer system of a user (e.g., a database, an enterprise or extraprise system, an Internet-of-Things (IoT) device, a sensor, or the like). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 201 via the network 230.

Methods as described herein can be implemented by way of machine (e.g., computer processor) executable code stored on an electronic storage location of the computer system 201, such as, for example, on the memory 210 or electronic storage unit 215. The machine executable or machine-readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 201, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 201 can include or be in communication with an electronic display 235 that comprises a user interface (UI) 240 for providing, for example, a graphical representation of a renewable micro utility. For example, the graphical representation could be a graphical representation of a renewable micro utility system as illustrated in FIG. 1. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 205. The algorithm can, for example, assist the EMS in allocating energy from the RES and ESS to the renewable micro utility. The algorithm can also, for example, forecast an amount of electrical energy available from the RES and ESS for a plurality of time periods. The algorithm can also, for example, allocate the available electrical energy to the one or more consumer loads of the renewable micro utility. The algorithm can also, for example, forecast an energy consumption of the one or more consumer loads over a forecast period.

EXAMPLES

Figure 3A:
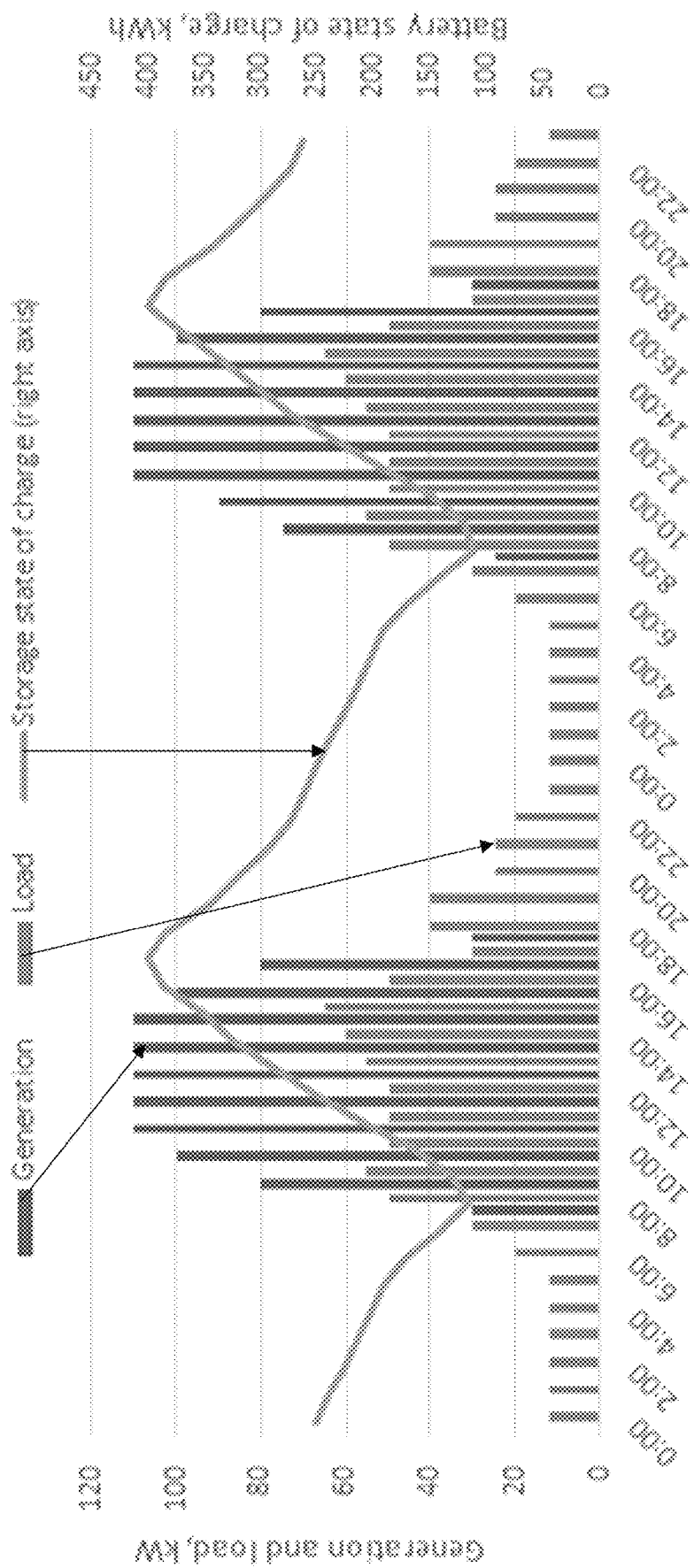
FIG. 3A is a graph illustrating the relationship of renewable energy generation, consumer loads, and a state of charge of an energy storage system in a renewable micro utility, in accordance with some embodiments.

Example 1: The Relationship of Renewable Energy Generation, Consumer Loads, and a State of Charge of an Energy Storage System in a Renewable Micro Utility FIG. 3A illustrates the relationship of renewable energy generation, consumer loads, and a state of charge of an energy storage system in a renewable micro utility.

In this example, the RES is a solar array. It generates energy daily between 8:00 am and 6:00 pm and generates no energy from 7:00 pm through 7:00 am.

There is at least some consumer load throughout the full day and night, with one peak load period occurring at 8:00 am, a second peak load period at 4:00 pm, and a third peak load period in the early evening. As shown, night-time energy demand is relatively low.

The ESS reaches its peak state of charge at approximately 5:00 pm on each day shown, after a long period when the RES electrical energy generation has exceeded the total level of consumer energy demand on the micro utility. At approximately 5:00 pm, the RES electrical energy generation falls to the level of the total consumer energy demand on the micro utility. The ESS then discharges through the night until it reaches a minimum state of charge at 8:00 am, when the instantaneous generation output of the RES begins to exceed the total consumer energy demand, causing the ESS to begin to charge again.

In this example, a natural forecast period would be from any starting time through 5am the following morning. Additionally, a second natural forecast period would be from any starting time through 5am the morning after that (to allow for day-of-week and short-term weather considerations).

Figure 3B:
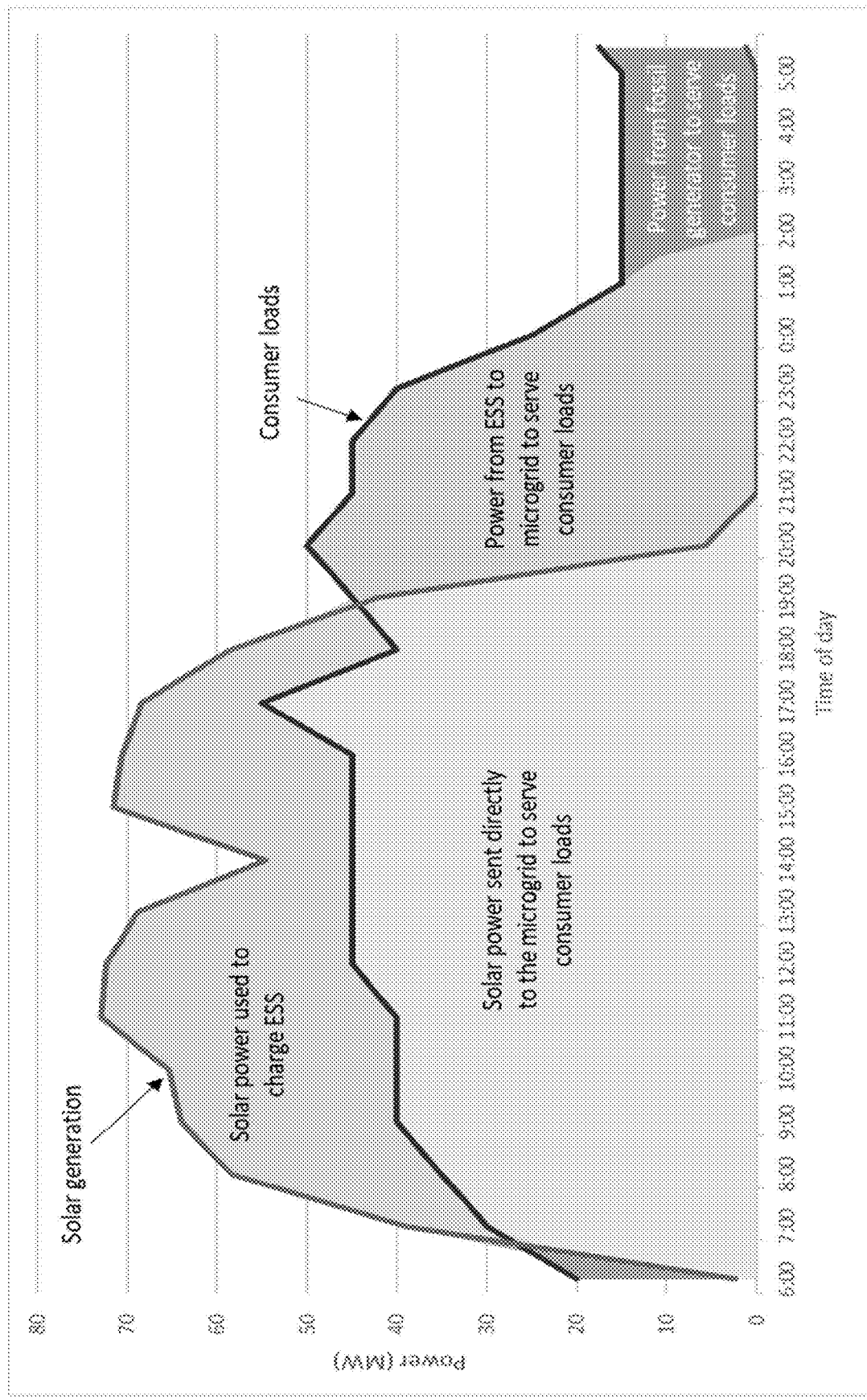
FIG. 3B shows an example of sources and uses of energy in a conventional micro utility system, in accordance with some embodiments.

FIG. 3B shows an example of sources and uses of power in a conventional micro utility system. In the example, a single representative 24-hour period, starting at 6 am and completing at 6 am the following morning is shown.

The solid green line ("solar generation") represents the power generated by the solar resource throughout the course of the day. The chart shows a dip in the output between 1 pm and 3 pm to represent a weather-related event that reduces output below its seasonal average for the day. The solid red line ("consumer loads") represents the aggregated electrical loads presented by consumers connected to the micro utility. The shaded areas in the chart shows: the yellow area below the (red) consumer load curve ("solar power sent directly to the micro utility to serve consumer loads") represents solar power, generated by the solar resource, that is used to serve consumer loads between 6 am and 8-9 pm. Between 7 am and 7 pm, the solar resource produces more power than is needed to serve the consumer loads, and this power is used to charge the ESS. The power is stored in the ESS ("solar power used to charge ESS"). From 7 pm until 2 am, power is discharged from the ESS to meet the electrical demands of the consumer loads ("power from ESS to micro utility to server consumer loads").

By shortly after 2 am, the power in the ESS has been exhausted. There is no solar resource available at night, thus between 2 am and 7 am the demands of the consumer loads is met by a fossil-fueled generator connected to the micro utility ("power from fossil generated to serve consumer loads"). This power may also be obtained through a connection to a larger electrical grid.

In the example of an islanded all-renewable micro utility, having neither fossil-fueled generation attached nor a connection to a larger electrical grid, the area shaded grey ("power from fossil generated to serve consumer loads") may represent times during the early morning when the micro utility may be unable to meet the needs of the electrical loads connected to it. Instead, it may stop providing power to the loads.

Figure 3C:
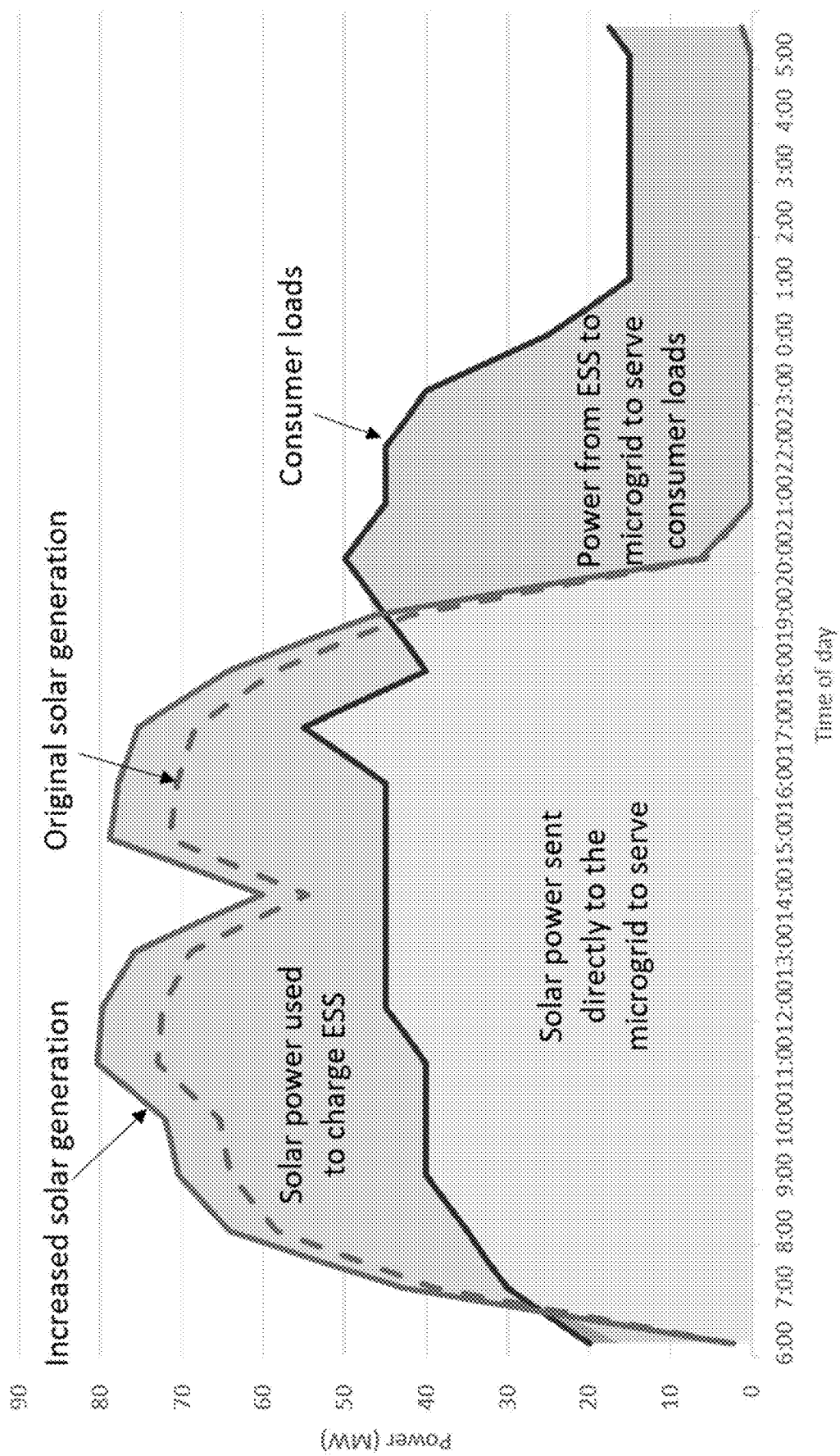
FIG. 3C shows an example of an "islanded" micro utility that relies only on renewable energy, in accordance with some embodiments.

FIG. 3C shows an example of "islanded" micro utility (i.e., micro utility with no connection to a larger electrical grid) that relies only on renewable energy (e.g., does not have a fossil-fueled source of power). Such micro utility may address the problem of lower-than-expected power production by the solar resource (e.g., due to weather). In this example, power capacity of the renewable (e.g., solar) resource is increased, so that on an average day it may produce more power than is required, and on days of poor weather the resource may produce enough energy to serve the needs of the loads on the micro utility. This is achieved by oversizing the renewable source. However, as described above, relying on oversizing the resource alone may not achieve satisfactory results. For example, such approach may not guarantee that the loads can be served. For instance, if the weather is worse than planned, or the underproduction by the renewable source is more severe than planned, the renewable source may fail to produce enough power to serve the loads. In practice, the micro utility designer has to determine how often it is acceptable for the system to fail to serve the load, in order to determine the required oversizing of the renewable source. Additionally, as the requirement for the load-service percentage increases, the required degree of oversizing increases, thus increasing the cost of the micro utility.

Figure 3D:
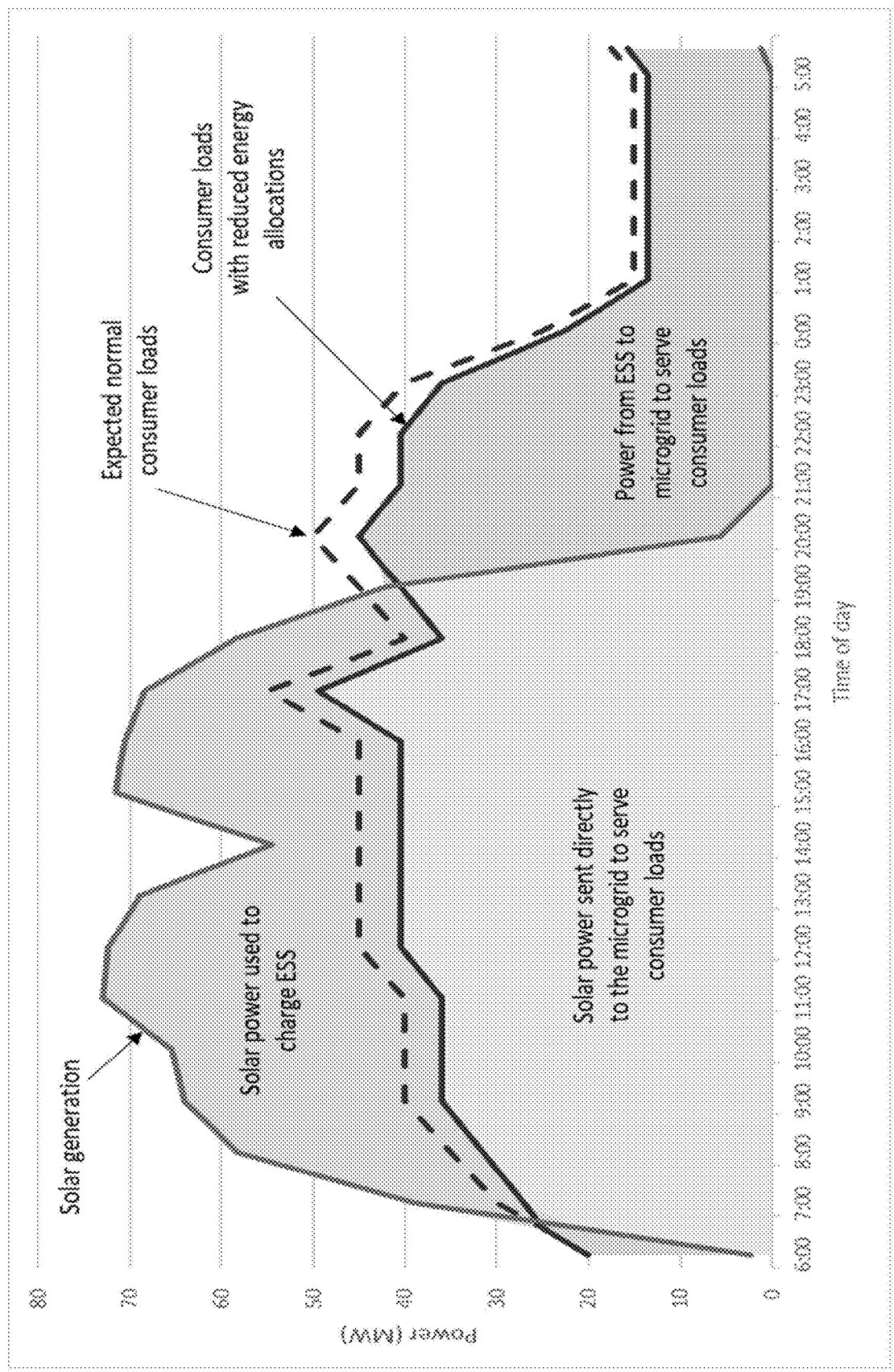
FIGS. 3D-3F show examples of an all-renewable islanded micro utility improved by the systems and methods herein, in accordance with some embodiments.
Figure 3E:
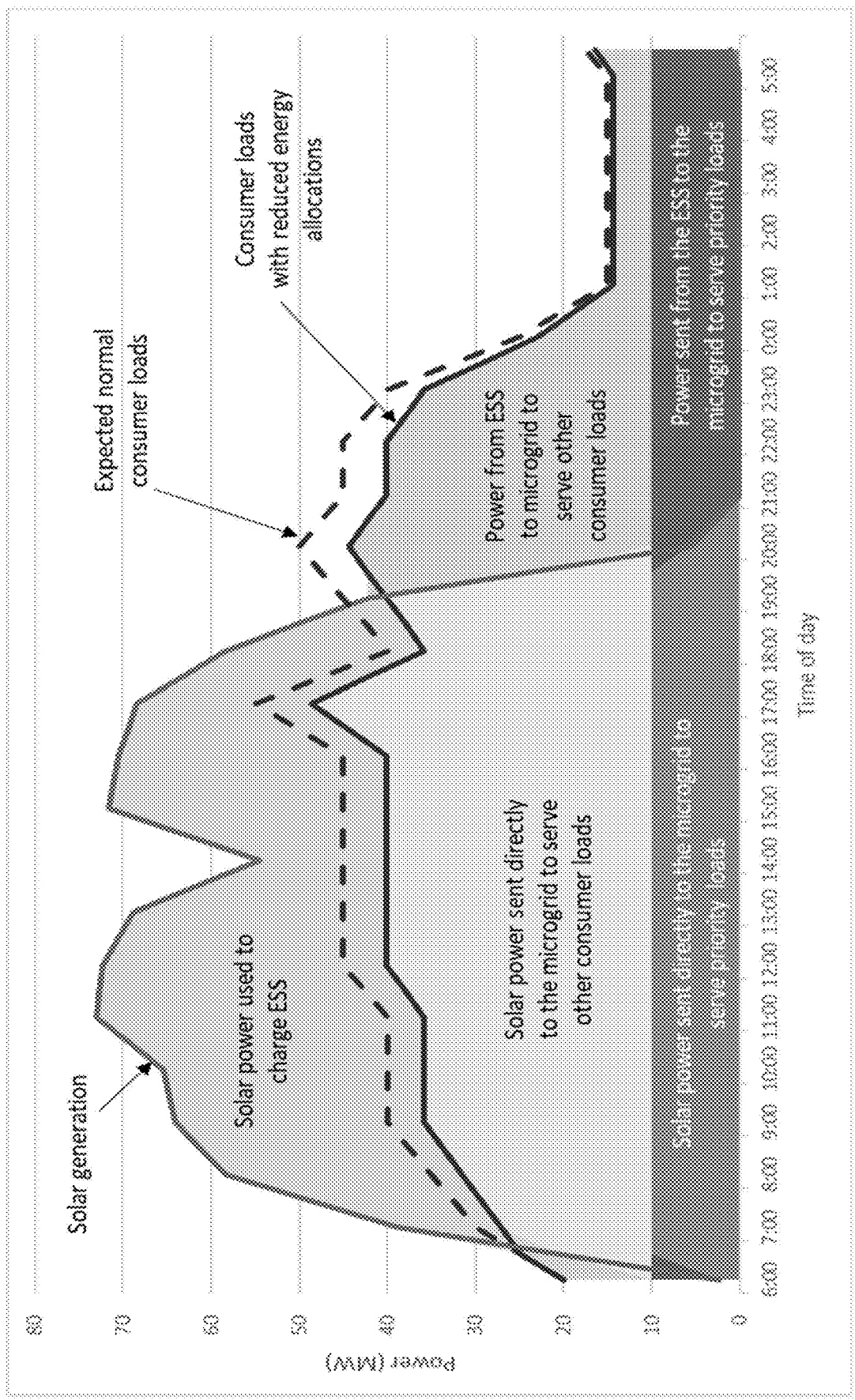
Figure 3F:
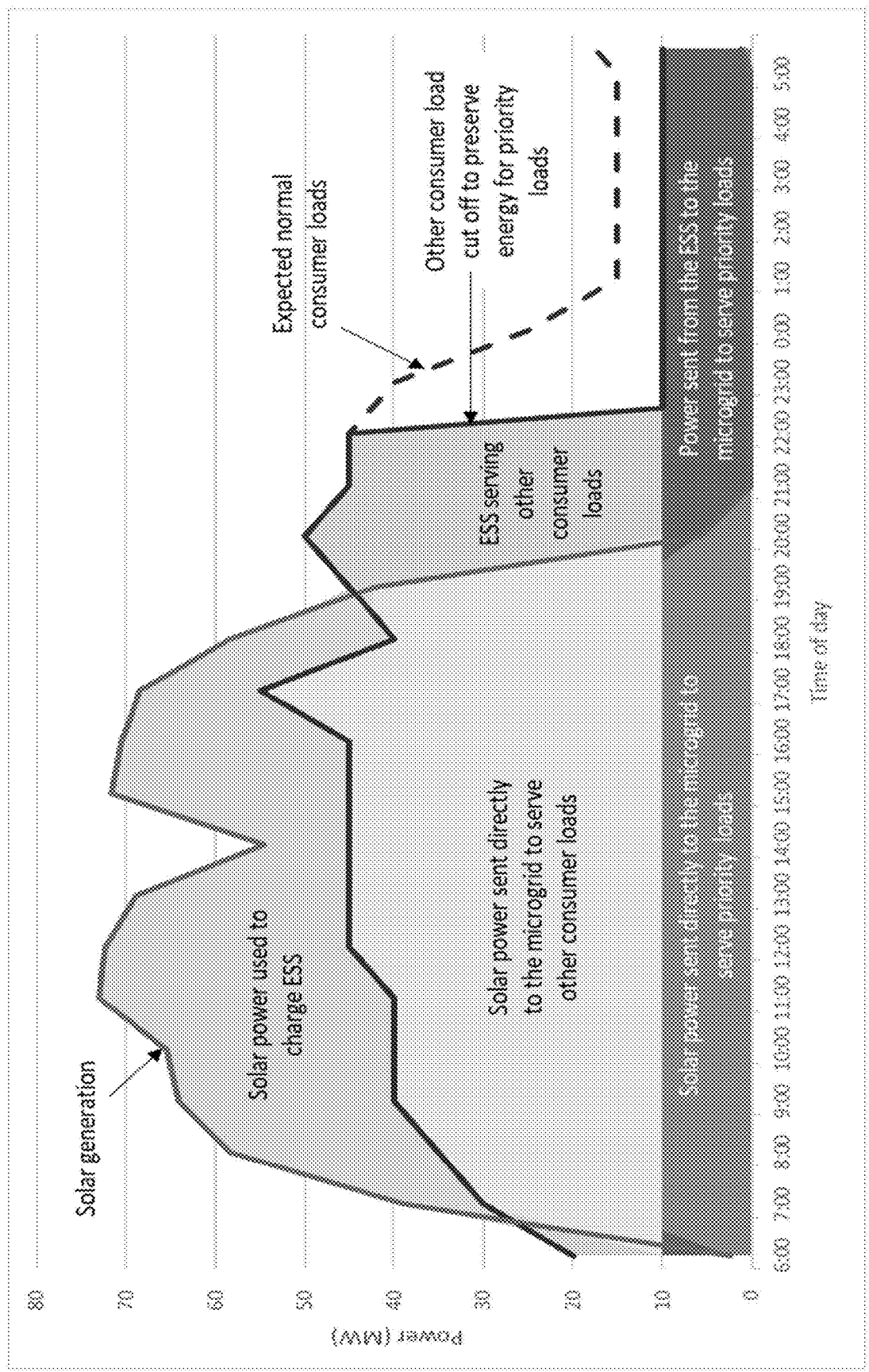

FIGS. 3D-F show examples of all-renewable islanded micro utility improved by the systems and methods herein. As described above, the system may reduce the degree of oversizing the renewable source and reduce the degree of consumer power consumption curtailment by at least including the active meters and EFAS. FIG. 3D shows an all-renewable islanded micro utility (e.g., micro utility with no fossil-fueled generator and no connection to a larger electrical grid). The dashed red line ("expected normal consumer load") represents the normally expected consumer loads on the micro utility, given the particular time of year, day of week, forecast temperature, and the like. There is a weather event expected in the early afternoon, which may reduce the total power production of the solar resource below its typical level. The system herein may provide the benefit of the forecast for under-production by the solar resource. For example, early in the day the EFAS of the system may notify consumers to reduce their power consumption moderately, providing them with guidance on how much they should reduce their consumption such as in absolute terms, relative to normal consumption, or a combination of both.

Upon receiving the notification, the consumers may reduce their power consumption in the forecast period, the micro utility's solar resource may produce enough power to meet the reduced consumer demand throughout the forecast period while portions of the power may be time-shifted using the ESS (i.e., solar power used to charge ESS). The solid red line ("consumer loads with reduced energy allocation") represents the realized consumer loads, after consumers have responded to the notification from the EFAS.

Compared to the scenario illustrated in FIG. 3B, consumers are able to receive power from the micro utility throughout the course of the day even without any fossil-fueled generation or connection to a larger electrical grid. Compared to the scenario illustrated in FIG. 3C which relying only on oversizing the solar resource, the provided system and method beneficially ensures electrical service at all times at a lower cost.

FIG. 3E shows an example of all-renewable islanded micro utility with some of the connected loads are designated as priority loads. For example, the priority loads may be a medical facility and/or a food storage refrigeration facility. It may be highly undesirable to reduce the power delivered to a priority load below its desired levels. The EFAS may allocate projected power production among consumers, while prioritizing some consumers over others. The EFAS of the system may direct power to the priority loads so that they receive a constant power level throughout the day. Even when an early afternoon weather event is expected to reduce the power produced by the solar resource during the forecast period, the EFAS may not request a reduction in the total power consumed by, or delivered to the priority loads. The EFAS may also notify the other consumers (e.g., non-priority, or lower-priority consumers) to make a proportionally larger reduction in their power consumption, relative to the normal consumption level. As shown in the example, upon receiving the notification, the consumers may reduce the consumption, the solar resource and ESS may be controlled to supply power and power to meet the reduced consumer load throughout the day.

In the cases when consumers (e.g., non-priority consumers) fail to comply with the notification or fail to reduce their electrical power consumption below normal level to meet the reduced energy allocations, the EFAS may disconnect the non-priority loads to reserve enough power in the ESS to serve the priority loads throughout a period of time. FIG. 3F shows an example of the EFAS automatically disconnect the non-priority loads to provide an optimal energy allocation throughout the micro utility and the times of the day. In the illustrated example, between 10 pm and 11 pm the EFAS may disconnect the non-priority loads (e.g., when the non-priority consumers fail to comply with the notification), to reserve enough power in the ESS to serve the priority loads throughout the night, until the next morning. The EFAS may disconnect consumers who are about to exceed their energy allocations, to preserve power to serve higher-priority consumers. The EFAS may be capable to distinguish non-priority consumers who are on a trajectory to stay within their (reduced) energy allocations from others who are not, the EFAS may then disconnect those consumers who are about to exhaust their energy allocations to reserve energy in the ESS to serve both the priority loads and the consumers who are remaining within their energy allocations.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A micro utility system comprising:
    a portable container configured to house an energy storage system (ESS) and a portable solar panel storage structure;
    wherein the portable solar panel structure has two or more solar panels coupled to each other, wherein the two or more solar panels are coupled to at least two wheels at distal ends of the two or more solar panels; and
    circuitry configured to receive electrical power from the portable solar panel structure, wherein the circuitry includes a processor configured by machine-readable instructions to direct electrical energy from the portable solar panel structure or the ESS to a load;
    wherein the portable container comprises one or more charging ports or one or more discharging ports located on an exterior face of a wall of the portable container, a charging port of the one or more charging ports electrically connecting the portable solar panel structure to the ESS to facilitate charging of the ESS with the two or more solar panels of the portable solar panel structure, and a discharging port of the one or more discharging ports electrically connecting the ESS to the load and facilitating discharge of electrical energy from the ESS to the load.

2. The micro utility system of claim 1, wherein the portable container includes rails mounted to interior faces of walls of the portable container, wherein the rails are configured to receive the portable solar panel structure.

3. The micro utility system of claim 2, further comprising:
a plurality of portable solar panel structures including the portable solar panel structure, each respective portable solar panel structure of the plurality of portable solar panel structures coupled to two or more wheels at a distal end of the respective portable solar panel structure, the two or more wheels coupled to the respective portable solar panel structure.

4. The micro utility system of claim 3, wherein the rails mounted to the interior faces of the walls of the portable container comprise a plurality of sets of rails, each set of rails comprising a pair of rails located across from each other on opposing interior faces of the walls of the portable container, and each set of rails spaced apart from another set of rails by a distance set such that each of the plurality of portable solar panel structures can be inserted into the portable container with the two or more wheels of the respective portable solar panel structure removed or folded towards the portable solar panel structure but cannot be inserted into the portable container with the two or more wheels attached to the portable solar panel structure in a position substantially perpendicular to the portable solar panel structure.

5. The micro utility system of claim 4, wherein a clip is coupled to a bottom face of a rail of one of the sets of rails.

6. The micro utility system of claim 1, wherein the portable container is a shipping container.

7. The micro utility system of claim 1, wherein the portable container includes wheels and a connector configured for attachment to a vehicle.

8. The micro utility system of claim 1, wherein the circuitry is configured to:
store in a memory an energy limit for the load;
forecast an amount of electrical energy available from the portable solar panel structure and the ESS for a time period; and
allocate an electrical energy amount to the load based on the energy limit and for the time period,
wherein the circuitry is configured to direct the electrical energy from the portable solar panel structure or the ESS to the load according to the allocated electrical energy amount.

9. The micro utility system of claim 8, wherein the allocated electrical energy amount indicates to direct the electrical energy from the portable solar panel structure or the ESS to the load 24 hours per day.

10. The micro utility system of claim 8, wherein the processor is further configured by the machine-readable instructions to:
determine the forecast amount of electrical energy is not enough to allocate electrical energy to a second energy limit to a second load for the time period; and
responsive to the determination, allocate an electrical energy amount of zero to each load of one or more loads with a priority lower than a priority of the second load.

11. The micro utility system of claim 8, wherein the processor is configured by the machine-readable instructions to allocate the electrical energy amount to the load by storing an indication of the electrical energy amount in the memory.

12. The micro utility system of claim 8, wherein the processor is further configured by the machine-readable instructions to:
determine the forecast amount of electrical energy is not enough to allocate enough electrical energy to a second load for the time period; and
reduce a previously assigned energy limit for each of one or more loads responsive to the determination.

13. The micro utility system of claim 12, wherein the processor is configured by the machine-readable instructions to reduce the previously assigned energy limit for each of the one or more loads based on one or more priorities for the one or more loads.

14. The micro utility system of claim 8, wherein the processor is configured by the machine-readable instructions to:
during the time period:
determine an amount of energy that has been directed to the load has reached the allocated electrical energy amount; and
terminate distribution of energy to the load responsive to the determination.

15. The micro utility system of claim 8, wherein the processor is configured by the machine-readable instructions to:
during the time period:
determine an amount of energy that has been directed to the load is within a threshold of the allocated electrical energy amount; and
responsive to the determination, transmit a message to a device associated with a user of the load, the message comprising a indication to utilize less energy for a remainder of the time period.

16. The micro utility system of claim 1, wherein the portable solar panel structure is coupled to a first set of two wheels at a distal end of the portable solar panel structure and a second set of two wheels at a proximal end of the portable solar panel structure.

17. A method comprising:
storing in a memory an energy limit for a load, wherein the load is coupled to a portable container configured to house an energy storage system (ESS) and portable solar panel structures;
forecasting an amount of electrical energy available from a portable solar panel structure and the ESS for a time period, wherein the portable solar panel structure includes two or more solar panels coupled to each other at one end, wherein the two or more solar panels are coupled to at least two wheels at a distal end;
allocating an electrical energy amount to the load based on the energy limit and for the time period; and
directing electrical energy from the portable solar panel structure or the ESS to the load according to the allocated electrical energy amount.

18. One or more non-transitory computer storage media storing instructions that are operable, when executed by one or more computers, to cause said one or more computers to perform operations comprising:
storing in a memory an energy limit for a load, wherein the load is coupled to a portable container configured to house an energy storage system (ESS) and portable solar panel structures;
forecasting an amount of electrical energy available from a portable solar panel structure and the ESS for a time period, wherein the portable solar panel structure includes two or more solar panels coupled to each other at one end, wherein the two or more solar panels are coupled to at least two wheels at a distal end;
allocating an electrical energy amount to the load based on the energy limit and for the time period; and directing electrical energy from the portable solar panel structure or the ESS to the load according to the allocated electrical energy amount.

* * * * *